US012411588B2

(12) United States Patent
Murata et al.

(10) Patent No.: US 12,411,588 B2
(45) Date of Patent: Sep. 9, 2025

(54) INFORMATION PROCESSING DEVICE, INFORMATION PROCESSING METHOD, AND PROGRAM

(71) Applicant: Sony Group Corporation, Tokyo (JP)

(72) Inventors: Yuki Murata, Tokyo (JP); Ayako Chiba, Tokyo (JP); Haruka Kawata, Kanagawa (JP); Chihiro Fukiage, Kanagawa (JP); Hideki Shiro, Kanagawa (JP); Masaru Iki, Kanagawa (JP); Yo Nonoyama, Kanagawa (JP); Sho Kobayashi, Tokyo (JP)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 18/044,280

(22) PCT Filed: Sep. 9, 2021

(86) PCT No.: PCT/JP2021/033167
§ 371 (c)(1),
(2) Date: Mar. 7, 2023

(87) PCT Pub. No.: WO2022/070825
PCT Pub. Date: Apr. 7, 2022

(65) Prior Publication Data
US 2023/0333709 A1 Oct. 19, 2023

(30) Foreign Application Priority Data
Sep. 30, 2020 (JP) .................. 2020-166281

(51) Int. Cl.
G06F 3/0482 (2013.01)
G06F 3/01 (2006.01)
G06F 3/0488 (2022.01)
G06F 3/14 (2006.01)

(52) U.S. Cl.
CPC ............ *G06F 3/0482* (2013.01); *G06F 3/013* (2013.01); *G06F 3/0488* (2013.01); *G06F 3/14* (2013.01)

(58) Field of Classification Search
CPC ...... G06F 3/0482; G06F 3/013; G06F 3/0488; G06F 3/14
See application file for complete search history.

(56) References Cited

U.S. PATENT DOCUMENTS

2011/0193972 A1* 8/2011 Zacks .................. G06V 40/174
348/222.1
2017/0075993 A1* 3/2017 Matsushita ............ G06V 10/96
2020/0150832 A1* 5/2020 Winn ................ A61K 39/39566

FOREIGN PATENT DOCUMENTS

| JP | 2016081173 A | 5/2016 |
| JP | 2017054493 A | 3/2017 |
| WO | 2019126723 A1 | 6/2019 |

OTHER PUBLICATIONS

International Search Report (PCT/ISA/210), International Application No. PCT/JP2021/033167, dated Nov. 22, 2021.

* cited by examiner

Primary Examiner — Stephen S Hong
Assistant Examiner — Darrin Hope
(74) Attorney, Agent, or Firm — Michael Best & Friedrich LLP

(57) ABSTRACT

An information processing device performs: processing of executing list display and individual display as display in which an image can be selected from an image group captured in a specific event, and processing of detecting an archive operation on the image displayed; and processing of storing archive information indicating that an archive setting has been performed in association with the image targeted for the archive operation.

19 Claims, 47 Drawing Sheets

EVENT VIEW

EVENT VIEW

TIME VIEW

FIG. 33
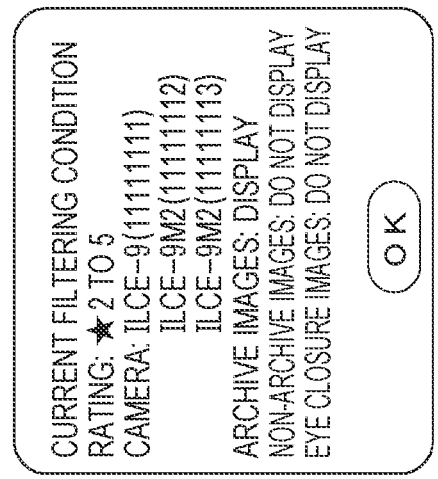
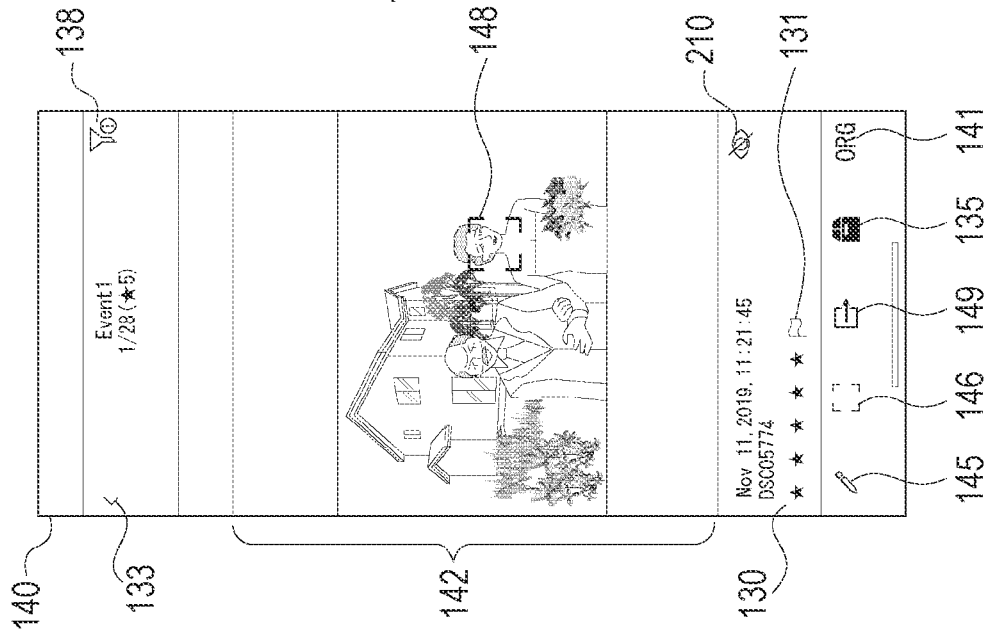

FIG. 43
A 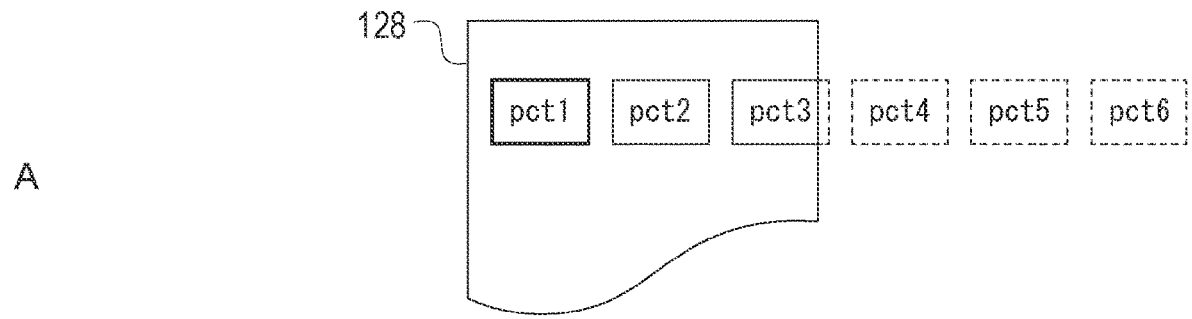
B 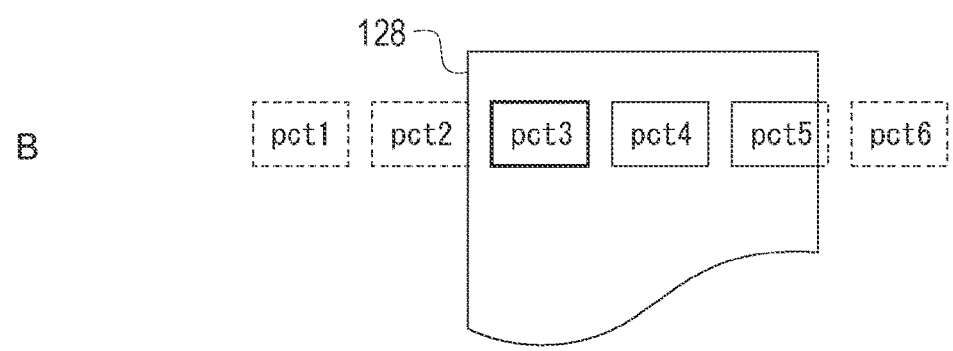
C 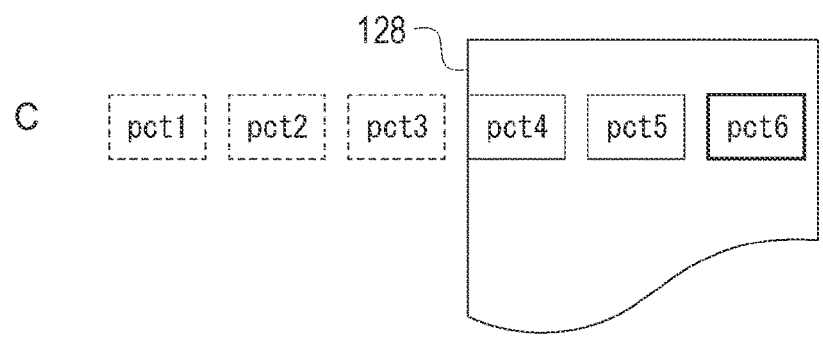

INFORMATION PROCESSING DEVICE, INFORMATION PROCESSING METHOD, AND PROGRAM

TECHNICAL FIELD

The present technology relates to an information processing device, an information processing method, and a program, and particularly relates to a technology suitable for creating an image collection of an event.

BACKGROUND ART

For example, there are services in which camera operators photograph an event related to marriage such as a wedding, a reception, a post-party, or the like, create a photo album as an image collection, and provide the photo album to participants or the like.

In this case, the camera operators or the like take in images captured by imaging devices in a personal computer, a smartphone, or the like after the end of the event, and edits the images using editing software or the like to create an image collection. Then, the image collection can be assumed to be provided by a social networking service (SNS), a cloud service, an e-mail, a message application, or the like.

Patent Document 1 below describes a technique for transferring images captured by cameras to smartphones or the like and sharing the images.

CITATION LIST

Patent Document

Patent Document 1: Japanese Patent Application Laid-Open No. 2016-81173

SUMMARY OF THE INVENTION

Problems to be Solved by the Invention

Meanwhile, an image collection of an event is fun for participants, and they often want to view the image collection as soon as possible after the end of the event.

For example, it is considered that the bride and groom and the participants can feel a greater excitement if the captured images can be viewed while the afterglow remains immediately after the end of the wedding or reception.

However, for example, in a case where a large number of photos are taken at a wedding, it is troublesome for the viewers to simply browse the photos in order, which is not appropriate.

Therefore, it is considered that an image collection edited using images selected from among a large number of images is created and can be browsed by the related parties. However, also in this case, for people who create an image collection such as camera operators or the like, it is a troublesome work to determine and select which image is added to the image collection among a large number of images.

Therefore, an object of the present disclosure is to provide an information processing function that assists creators in creating such an image collection.

Solutions to Problems

An information processing device according to the present technology includes: a user interface control unit that performs processing of executing list display and individual display as display in which an image can be selected from an image group captured in a specific event, and processing of detecting an archive operation on the image displayed; and an event data management unit that performs processing of storing archive information indicating that an archive setting has been performed in association with the image targeted for the archive operation.

For example, a use case is assumed in which images (photos) are selected for creating an image collection or the like with respect to an image group which is a plurality of pieces of image data captured in an event such as a wedding or the like. In this case, images can be arbitrarily archived among a large number of images.

In the information processing device described above according to the present technology, it is conceivable to include a filter processing unit that performs filtering on the basis of the archive information, and the user interface control unit performs control such that images extracted by filtering are displayed in a list as the list display.

For example, filtering such as extraction of archived images, extraction of unarchived images, or the like is performed.

In the information processing device described above according to the present technology, it is conceivable that whether or not to perform the filtering based on the archive information or a filtering condition can be selected.

For example, it is made possible to select whether or not to perform filtering or a filtering condition, for example, extraction of images that can be set as archive, extraction of images that are not set as archive, or the like.

In the information processing device described above according to the present technology, it is conceivable that the user interface control unit performs control to provide a user interface capable of setting operation of selection information for creating an image collection by selectively using image data included in the image group, and the event data management unit performs processing of storing the archive information and the selection information as separate information.

The selection information includes information indicating that an image is selected as an image to be used for the image collection, and the like. This is associated with the image as information different from the archive information.

In the information processing device described above according to the present technology, it is conceivable that the user interface control unit enables the archive operation for a display image at a time of the individual display.

In a state where one image is displayed, a user can perform an archive operation on the image.

In the information processing device described above according to the present technology, it is conceivable that the user interface control unit detects a swipe operation in a predetermined direction with respect to a display image as an archive operation with respect to the image.

For example, an operation of touching the image portion and swiping upward on the screen or the like is detected as the archive operation.

In the information processing device described above according to the present technology, it is conceivable that the user interface control unit performs control to execute display that enables cancellation of the archive operation for a predetermined time when the archive operation is detected.

For example, an undo instruction is enabled as a toast display at the time of the archive operation.

In the information processing device described above according to the present technology, it is conceivable to include an image analysis unit that performs image analysis on each image of the image group and determines eye closure of a subject person, and the event data management unit performs processing of storing eye closure information in association with an image determined to be of eye closure.

For example, an image group, which is a plurality of pieces of image data captured in an event such as a wedding or the like, is analyzed for each image, it is determined whether or not the subject person is in a state of closing eyes, and the determination result is stored as eye closure information.

In the information processing device described above according to the present technology, it is conceivable that the user interface control unit performs control to execute display indicating an image determined to be of eye closure on the basis of the eye closure information at a time of the list display or the individual display.

For example, an eye closure icon is displayed corresponding to an image.

In the information processing device described above according to the present technology, it is conceivable to include a filter processing unit that performs filtering on the basis of the eye closure information, and the user interface control unit performs control such that images extracted by the filtering are displayed in a list as the list display.

For example, images excluding eye closure images are displayed in a list.

In the information processing device described above according to the present technology, it is conceivable that whether or not to perform the filtering based on the eye closure information can be selected.

Whether or not to perform filtering of eye closure images, that is, whether or not to perform display can be selected.

In the information processing device described above according to the present technology, it is conceivable that the user interface control unit performs control to provide a user interface capable of setting operation of selection information for creating an image collection by selectively using image data included in the image group, and the event data management unit performs processing of storing the eye closure information and the selection information as separate information.

For example, similarly to the archive information, the eye closure information is also managed as information separate from the selection information.

In the information processing device described above according to the present technology, it is conceivable to include a filter processing unit that performs filtering on the basis of information of an imaging device that has captured an image, and the user interface control unit performs control such that images extracted by the filtering are displayed in a list as the list display.

For example, images captured by an imaging device of a specific model or a specific serial number are displayed in a list.

According to an information processing method of the present technology, an information processing device performs: processing of executing list display and individual display as display in which an image can be selected from an image group captured in a specific event, and processing of detecting an archive operation on the image displayed; and processing of storing archive information indicating that an archive setting has been performed in association with the image targeted for the archive operation.

These are support processing for improving the efficiency of the work of creating an image collection by camera operators or the like.

A program according to the present technology is a program that causes an information processing device to execute processing corresponding to such an information processing method.

BRIEF DESCRIPTION OF DRAWINGS

FIG. 33 is an explanatory diagram of display of a setting state of a filter function according to the embodiment.

FIG. 43 is an explanatory diagram of image arrangement at the time of view switching according to the embodiment.

MODE FOR CARRYING OUT THE INVENTION

Figure 1:
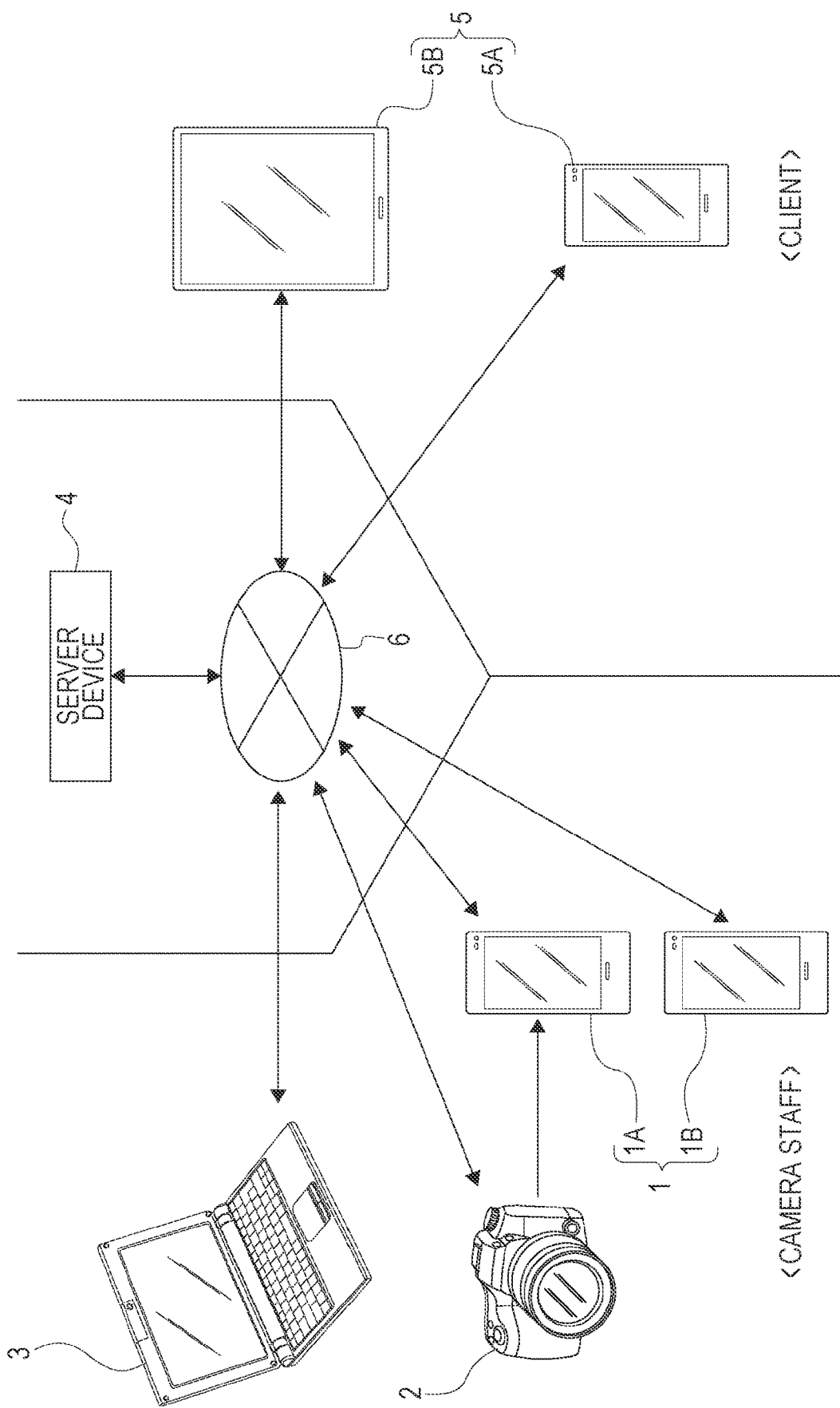
FIG. 1 is an explanatory diagram of a system configuration for providing a service according to an embodiment of the present technology.

Hereinafter, embodiments will be described in the following order.
<1. System Configuration and Work Procedure for Image Collection Providing Service>
<2. Configuration of Information Processing Device>
<3. Presetting Processing>
<4. Transfer/Editing Processing>
<5. Selection Processing>
[5-1 Flow of Entire Selection]
[5-2 Filter Processing Based on Archive and Eye Closure]
[5-3 Cover and Highlight Selection]
<6. Server Processing>
<7. Web Gallery Delivery Processing>
<8. Actual Delivery Processing>
<9. Event View>
<10. Conclusion and Modifications>
<1. System Configuration and Work Procedure for Image Collection Providing Service>

In the embodiment, for example, a case is assumed that a camera operator performs still image capturing (photographing) at an event such as a wedding or the like, generates content as an image collection by captured images, and provides the content to a client for a fee or free of charge.

Note that not only still images but also moving images with audio or moving images without audio may be captured, and an image collection including these moving images or an image collection by a plurality of moving images may be generated.

For the sake of description, camera operators and assistants thereof are collectively referred to as camera staff.

In addition, the client is a generic term for not only the orderer but also users who can browse the image collection provided. For example, related parties such as the bride and groom, relatives, friends, and the like are collectively referred to as clients.

The image collection broadly refers to content in which images (still images and moving images) are collected such as a photo album, and the provision form thereof is not limited. However, in the present embodiment, as an example, an image collection as a web gallery and an image collection of actual delivery can be provided.

Here, the image collection of web gallery is, for example, an electronic image collection in which photos of an event can be quickly browsed on a website after the end of the event such as a wedding or the like.

Note that, in the description, a website is used as an example, but this is merely an example, and a provision form in which a content file as an image collection can be transmitted to a terminal device of a client by using, for example, an e-mail, an electronic message, an SNS, or the like may be adopted.

In addition, the image collection of the actual delivery is, for example, an image collection of an event that the camera staff officially creates as a photo album and provides to the client at a later date. The image data captured in the event may be edited to form an electronic image collection as image album content, slide show content, or the like, or for example, an image collection by a paper medium may be created. The electronic image collection may be provided by download, streaming, or the like, or may be provided by being stored in a portable storage medium such as a disk-shaped storage medium, a card-shaped storage medium, a tape-shaped storage medium, or a flash memory medium.

In the present embodiment, as an image collection of web gallery, an image collection that can be quickly browsed by a client can be generated before an image collection of the actual delivery. In addition, the image collection of web gallery is not merely a simple arrangement of a large number of captured images, but is selected images and can have a quality that the viewer can enjoy.

On the other hand, the image collection of the actual delivery is regarded as being able to be created by the camera staff taking time to perform more creative editing.

FIG. 1 illustrates terminal devices 1A and 1B, an imaging device 2, a personal computer 3, a server device 4, terminal devices 5A and 5B, and a network 6.

Note that the terminal devices 1A and 1B indicate terminal devices used by the camera staff, and these terminal devices are collectively referred to as a staff terminal 1 for distinction in description.

The terminal devices 5A and 5B indicate terminal devices used by the users as the above-described clients, and these terminal devices are collectively referred to as a client terminal 5 for the sake of description.

Here, as the staff terminal 1 and the client terminal 5, a portable terminal device such as a smartphone, a tablet device, and the like is exemplified.

For example, the terminal device 1A is assumed to be a smartphone used by a camera operator, and the terminal device 1B is assumed to be a smartphone or the like used by an assistant.

In addition, the terminal device 5A is assumed to be a smartphone used by the bride, and the terminal device 5B is assumed to be a tablet device or the like used by a friend in the venue.

The staff terminal 1 and the client terminal 5 may be so-called information processing devices, and as specific examples thereof, various examples such as a personal computer device, a mobile phone device, a game device, an audio device, a video device, a communication device, a television device, and the like are assumed. That is, the staff terminal 1 or the client terminal 5 of the present disclosure can be an information processing device capable of performing information processing calculation, for example, a device incorporating a microcomputer.

However, since use in an event venue or the like is assumed, a portable terminal such as a smartphone, a tablet device, or the like is preferable.

As the imaging device 2, various imaging devices as a video camera or a still camera are assumed. The imaging device 2 illustrated in the drawing is assumed to be a camera used by a camera operator in a venue of a wedding.

The imaging device 2 and the staff terminal 1 (for example, the terminal device 1A) can perform data communication. For example, data communication is performed by file transfer protocol (FTP) communication.

Specifically, it is conceivable that the terminal device 1A serves as an FTP server, and image files (including image data and metadata) captured by the imaging device 2 are sequentially or collectively uploaded by FTP communication.

Therefore, it is assumed that FTP settings for performing data transfer to the terminal device 1A are set in the imaging device 2.

The content of the FTP setting information includes a host name, a save destination path, a user name, a password, a connection type, and the like of the FTP server.

However, the imaging device 2 and the terminal device 1A are not necessarily limited to the FTP, and other protocols may be used.

In addition, it is sufficient that an image or metadata can be transferred between the imaging device 2 and the terminal device 1A by any communication method. For example, mutual information communication may be performed by short-range wireless communication such as Bluetooth (registered trademark), wireless fidelity (WI-FI: registered trademark), near field communication (NFC: registered trademark), or the like, infrared communication, or the like.

Furthermore, the imaging device 2 and the terminal device 1A may be communicable with each other by wired connection communication such as a wired LAN or the like.

The personal computer 3 is exemplified as an information processing device used by a camera staff to create an image collection content of the actual delivery, for example.

The personal computer 3 is used for work of acquiring data related to images of the event from the server device 4 and creating an image collection content of the actual delivery by an image editing application or the like.

The server device 4 provides and manages various types of information in order for the camera staff to create a web gallery and an image collection of the actual delivery.

For example, the staff terminal 1 has installed an application program for the image collection providing service, and performs processing to be described later according to the application program. Correspondingly, the server device 4 manages data related to the event, generates a web gallery, and the like.

For example, the staff terminal 1 and the server device 4 are always connected during activation of the application program described above, and event data is synchronized. Examples of the event data will be described later, and include image data captured in the event, data used for generating a web gallery, and the like.

In the present disclosure, "synchronization" means that at least a part of the content of the event data stored in the staff terminal 1 and the content of the event data stored in the server device 4 are maintained so as to have the same data content. In particular, the data to be synchronized includes image data, rating information, selection information, editing information, archive information, eye closure information, and the like. The respective contents will be described later.

As the network 6, for example, the Internet, a home network, a local area network (LAN), a satellite communication network, and various other networks are assumed.

The staff terminal 1 can upload image data and the like to the server device 4 via the network 6 and can transmit information for synchronization.

The client terminal 5 can access a web page provided by the server device 4 via the network 6 and browse the web gallery.

The personal computer 3 can acquire an image file for creating the image collection content of the actual delivery from the server device 4 via the network 6.

Note that the imaging device 2 includes, for example, a display device such as a display panel, a viewfinder, or the like provided on a device back surface, and can perform operation input with functions of various operators, a touch panel, and the like. That is, it has a sufficient function as a user interface. In addition, the imaging device 2 is equipped with a microcomputer, and can perform various types of information processing and communication.

Therefore, it is also assumed that the imaging device 2 functions as the information processing device referred to in the present disclosure, communicates with the server device 4 without passing through the terminal devices 1A and 1B, and executes processing performed by the terminal devices 1A and 1B as described later.

In the embodiment, processing of the staff terminal 1 and the server device 4 will be mainly described, but an example in which the imaging device 2 performs all or part of the processing of the staff terminal 1 described below is also conceivable.

A schematic procedure of image collection provision implemented by the system as illustrated in FIG. 1 will be described with reference to FIG. 2. This is a work procedure in the staff terminal 1 based on an operation of a camera staff as a service provider.

Presetting is performed as step S1. For example, the camera staff performs communication setting between the staff terminal 1 and the imaging device 2, event setting, image retouch setting, and the like. This presetting is performed before the start of the wedding.

In step S2, imaging/transfer/automatic editing during the wedding is performed.

The image file captured by the camera operator with the imaging device 2 is sequentially transferred to the staff terminal 1 (for example, the terminal device 1A).

The staff terminal 1 takes in the image file, transfers the image file and the like to the server device 4, automatically edits the images according to the presetting, and the like.

Step S3 illustrates a work that can be performed on the day after the end of the wedding or the like.

The camera staff performs selection operation using the staff terminal 1. The selection includes selection of images to be posted on the web gallery, selection of cover images and highlight images, further editing of images, and the like. The staff terminal 1 performs update processing or the like of event data according to an operation of the camera staff. Processing for synchronizing the event data with the server device 4 side is also sequentially performed.

Note that the selection in step S3 may be performed while the wedding or the like is in progress.

In step S4, web gallery delivery processing is performed. In the server device 4, a web gallery is created on the basis of the event data. The camera staff confirms the content of the web gallery on the staff terminal 1 and then performs an operation to make the content browsable to the client. Therefore, for example, on the day after the end of the wedding or the like, the client can browse the web gallery that is an image collection of the wedding.

Step S5 illustrates creation of an image collection of the actual delivery and actual delivery processing.

The camera staff creates the image collection content of the actual delivery at a later date using, for example, the personal computer 3 and provides the image collection content to the client.

As a result, the client can receive the image collection content as the actual delivery.

<2. Configuration of Information Processing Device>

Figure 3:
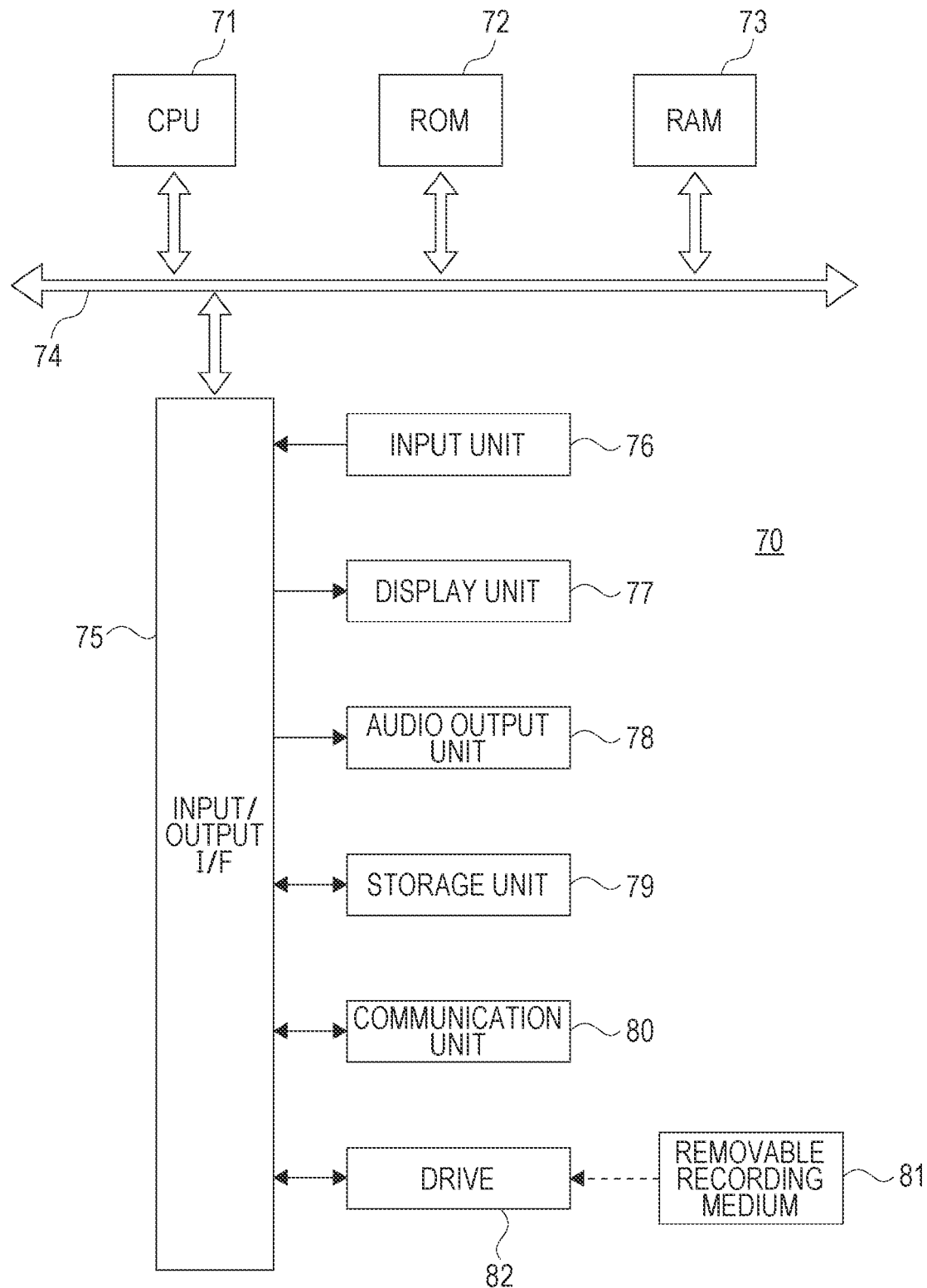
FIG. 3 is a block diagram of a configuration of a terminal device and a server device according to the embodiment.

FIG. 3 illustrates a configuration example of an information processing device 70 that can be configured as the staff terminal 1, the client terminal 5, the server device 4, or the personal computer 3. The staff terminal 1, the personal computer 3, or the server device 4 can execute processing to be described later by having the following configuration of the information processing device 70. In addition, the imaging device 2 can also execute processing similar to that of the staff terminal 1 described later by including the following configuration of the information processing device 70.

A central processing unit (CPU) 71 of the information processing device 70 executes various types of processing in accordance with a program stored in a read only memory (ROM) 72 or a program loaded from a storage unit 79 into a random access memory (RAM) 73. The RAM 73 also appropriately stores data and the like necessary for the CPU 71 to execute various processes.

The CPU 71, the ROM 72, and the RAM 73 are connected to one another via a bus 74. An input/output interface 75 is also connected to the bus 74.

An input unit 76 including an operator and an operation device is connected to the input/output interface 75.

For example, as the input unit 76, various operators and operation devices such as a keyboard, a mouse, a key, a dial, a touch panel, a touch pad, a remote controller, and the like are assumed.

An operation of the user is detected by the input unit 76, and a signal corresponding to the input operation is interpreted by the CPU 71.

In addition, a display unit 77 including a liquid crystal display (LCD), an organic electro-luminescence (EL) display, or the like, and an audio output unit 78 including a speaker or the like are integrally or separately connected to the input/output interface 75.

The display unit 77 is a display unit that performs various displays, and includes, for example, a display device provided in a housing of the information processing device 70, a separate display device connected to the information processing device 70, or the like.

The display unit 77 executes display of an image for various types of image processing, an image to be processed, and the like on a display screen on the basis of an instruction from the CPU 71. In addition, the display unit 77 displays various operation menus, icons, messages, and the like, that is, displays as a graphical user interface (GUI) on the basis of an instruction from the CPU 71.

The input/output interface 75 may be connected with the storage unit 79 including a hard disk, a solid-state memory, or the like, and a communication unit 80 that performs communication using various communication methods.

The communication unit 80 performs communication processing via a transmission path such as the Internet, wired/wireless communication with various devices, bus communication, and the like.

In a case where the information processing device 70 is assumed as the staff terminal 1, the communication unit 80 has a function of FTP communication with the imaging device 2 and a function of performing communication with the server device 4 via the network 6. Alternatively, the communication unit 80 may have a function of performing communication by short-range wireless communication such as Bluetooth, Wi-Fi, NFC, or the like, infrared communication, wired connection communication, or the like. In addition, the communication unit 80 may have a function of performing communication through a communication line for mobile phones such as long term evolution (LTE) or the like.

In a case where the information processing device 70 is assumed as the server device 4 or the personal computer 3, the communication unit 80 has at least a function of performing communication via the network 6.

A drive 82 is also connected to the input/output interface 75 as necessary, and a removable recording medium 81 such as a magnetic disk, an optical disk, a magneto-optical disk, a semiconductor memory, or the like is appropriately mounted.

By the drive 82, a data file such as an image file, various computer programs, and the like can be read from the removable recording medium 81. The read data file is stored in the storage unit 79, and images and sounds included in the data file are output by the display unit 77 and the audio output unit 78. In addition, the computer program and the like read from the removable recording medium 81 are installed in the storage unit 79 as necessary.

In the information processing device 70, for example, software for processing of the present disclosure can be installed via network communication by the communication unit 80 or the removable recording medium 81. Alternatively, the software may be stored in advance in the ROM 72, the storage unit 79, or the like.

Figure 4:
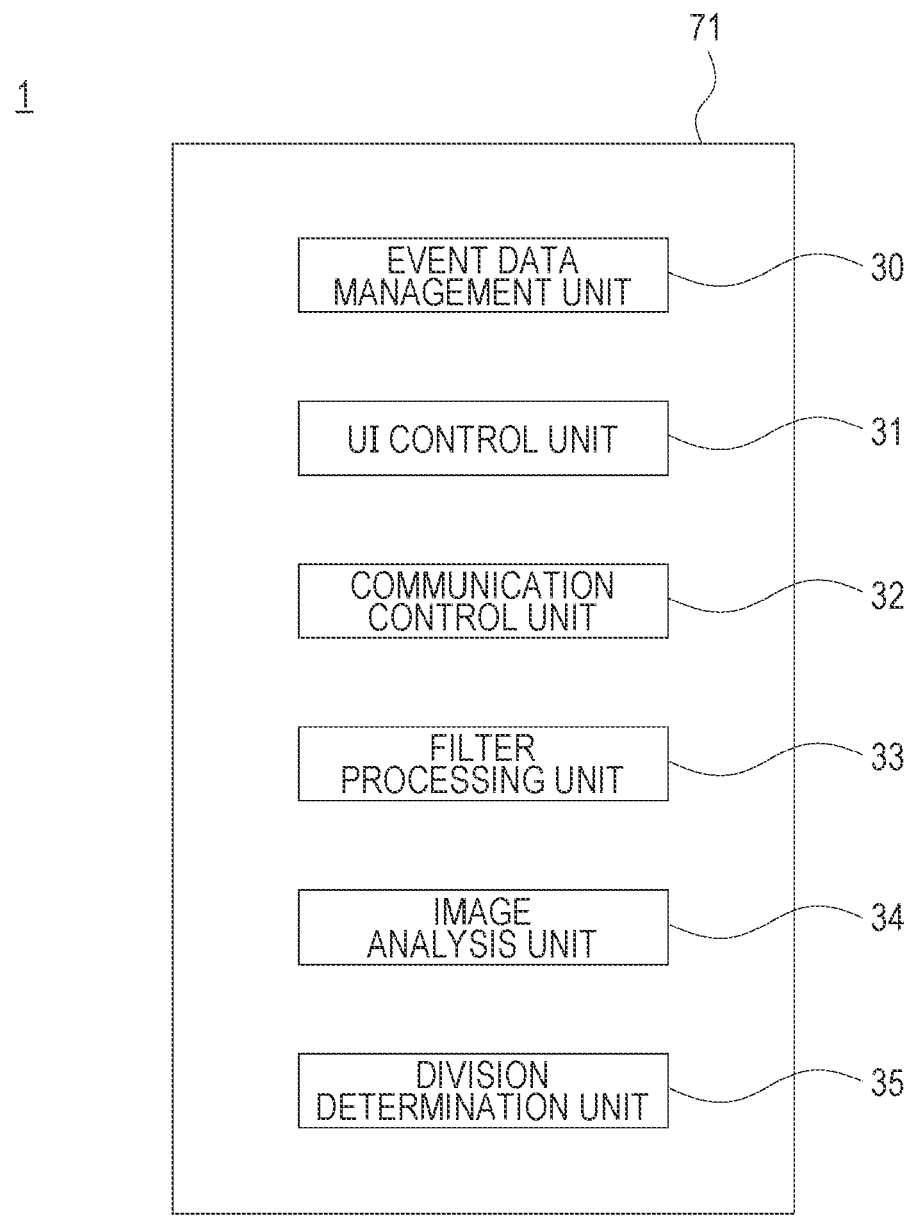
FIG. 4 is an explanatory diagram of a functional configuration of the terminal device according to the embodiment.

In a case where the staff terminal 1 is assumed as the information processing device 70, in the information processing device 70, the functional configuration as illustrated in FIG. 4 is constructed in the CPU 71 by the application program.

FIG. 4 illustrates an event data management unit 30, a user interface (UI) control unit 31, a communication control unit 32, a filter processing unit 33, an image analysis unit 34, and a division determination unit 35 as functions provided in the information processing device 70 serving as the staff terminal 1.

The event data management unit 30 is a processing function of storing additional information including image data received through communication with the imaging device 2, rating information corresponding to the image data, and the like as event data regarding a specific event. In addition, the event data management unit 30 also performs update processing of the event data according to the operation input of the camera staff.

Figure 5:
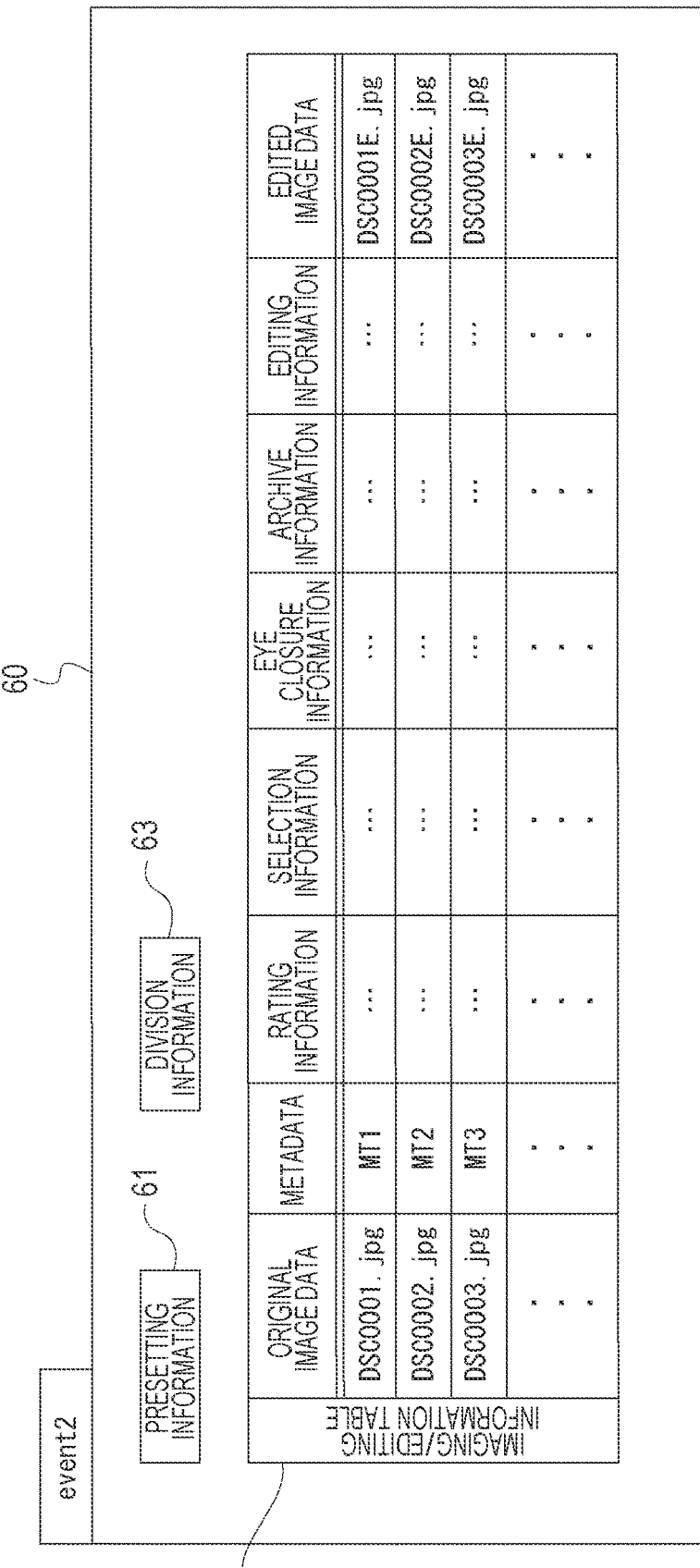
FIG. 5 is an explanatory diagram of event data on the terminal device side according to the embodiment.

An example of the content of the event data is schematically illustrated in FIG. 5.

The event data is a data group including images and various contents regarding one event registered by the camera staff operating the staff terminal 1. FIG. 5 illustrates event data 60 for an event named "event2".

In this example, the event data 60 includes presetting information 61, imaging/editing information table 62, and division information 63.

Figure 2:
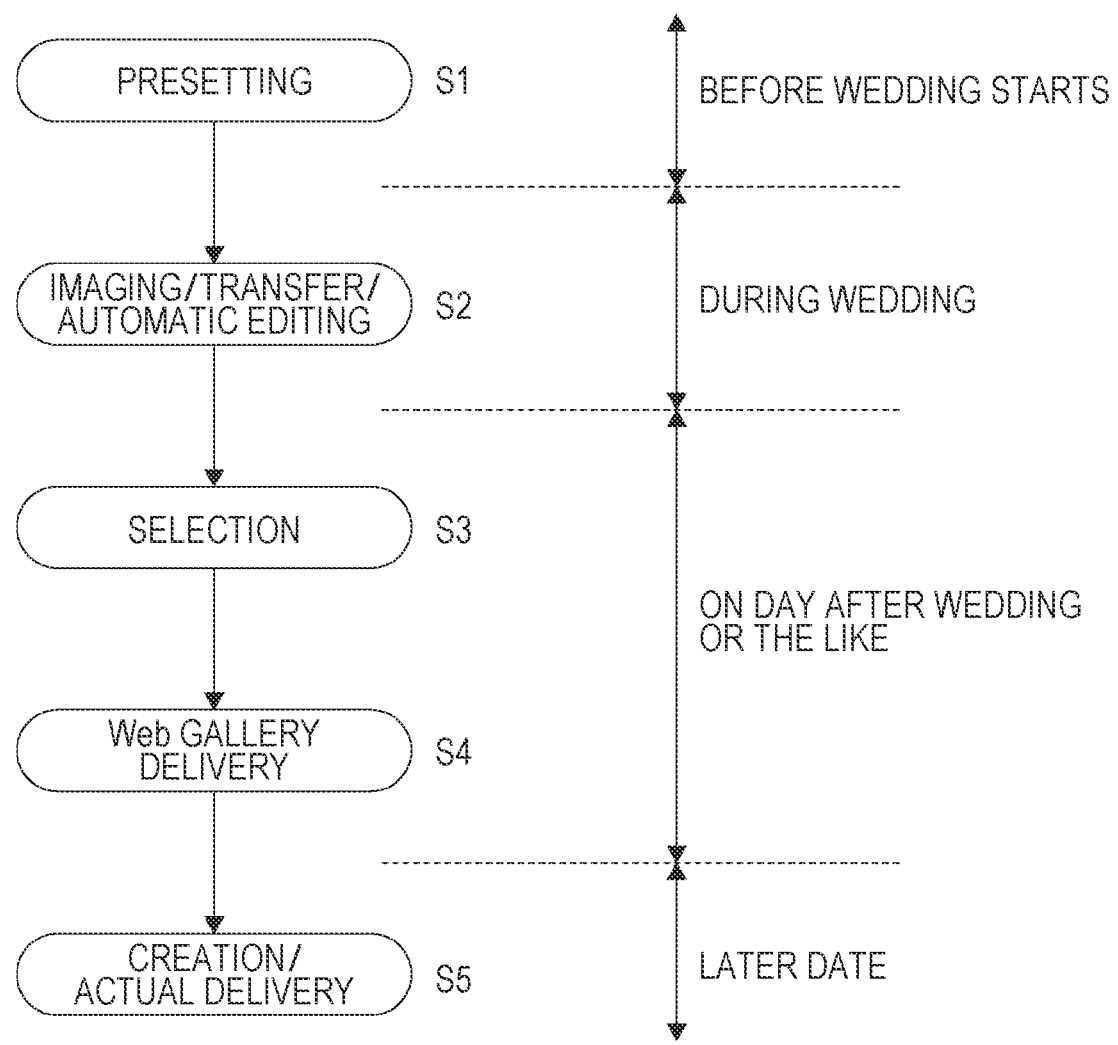
FIG. 2 is an explanatory diagram of a work procedure for providing a service according to the embodiment.

The presetting information 61 is information set by the camera staff through the presetting in step S1 of FIG. 2. For example, editing information such as a retouch parameter or the like is included.

The imaging/editing information table 62 is a table in which information is sequentially added and updated in the processing of steps S2 and S3 of FIG. 2.

In the imaging/editing information table 62, various types of information are described corresponding to the image file transferred from the imaging device 2.

The image file transferred from the imaging device 2 includes image data and metadata (MT1, MT2 . . . ). This image data is managed as original image data, and added metadata is also managed.

The image data includes, for example, row (RAW) data, data compressed by the JPEG method, and the like, and the data format is not limited, but here, data compressed by the JPEG method such as "DSC0001.jpg" or the like is exemplified.

The metadata (MT1, MT2 . . . ) includes imaging date and time of the image data, camera information such as a model, a manufacturer, a serial number, or the like of the imaging device 2, a data format, a data size, angle of view information, focus point information, and various other information added by the imaging device 2.

The imaging/editing information table 62 stores rating information corresponding to image data. The rating information is information indicating an evaluation value obtained by evaluating an image by a camera operator or the like, and is, for example, evaluation information of six stages such as "no star", "1 star", "2 stars", "3 stars", "4 stars", and "5 stars" in the number of star marks. For example, the larger the number of stars, the higher the evaluation. Of course, such evaluation information is an example. Since such rating information serves as a reference for the camera staff to select an image, for example, when setting a selection flag (setting of used image information) to be described later, it can be said that an image having a higher evaluation indicated by the rating information is an image having a high possibility to be used for the web gallery or the actual delivery.

This rating information can be given by confirming the captured image when the camera operator captures the image. The imaging device 2 is provided with a user interface for inputting rating information. It is conceivable that this rating information is transferred to the staff terminal 1 together with image data included in metadata corresponding to the image data, for example. Alternatively, it is also conceivable that the image file is written in the XMP region of Exif.

The staff terminal 1 extracts and manages rating information from metadata (or Exif data).

This rating information can be added or updated in association with the image data by an operation on the staff terminal 1 side.

The imaging/editing information table 62 stores selection information corresponding to image data.

As one of the selection information, there is used image information indicating whether or not the image is posted on the web gallery. This is a "selection flag" (which may be simply described as a "flag") described later, and the flag-off indicates that the image is not used in the web gallery, and the flag-on indicates that the image is selected as the image to be used in the web gallery.

In addition, as one of the selection information, there is front cover image information indicating that the image is selected as a cover image to be arranged as a front cover at the top of the web gallery.

In addition, as one of the selection information, there is emphasized display image information indicating the image selected as an image to be emphasized (highlighted) in the web gallery. The highlight display is to be displayed larger than other images. Alternatively, a normal image may be a monochrome image, but a highlight image may be displayed in color. Conversely, in the sense of emphasis, it is also conceivable that the normal image is a color image, but the highlight image is an image displayed in monochrome. Furthermore, the normal image may be displayed without borders, and the highlight image may be displayed with borders, or the like. There are various ways of emphasized display.

The eye closure information is information indicating the eye closure state of the subject person obtained by the image analysis processing executed by the function of the image analysis unit 34. For example, most simply, flag information of "0" and "1" indicating whether or not an image is an eye closure image can be considered.

The archive information is information indicating that archiving is set by the user. The archive operation and the like will be described later. For example, most simply, it is conceivable to use flag information of "0" and "1" indicating whether or not the image is an archived image.

The editing information includes various image processing parameters such as retouch parameters, inclination correction parameters, and the like. Examples of the retouch parameter include image quality adjustment parameters such as a luminance adjustment value, a color adjustment value, a contrast adjustment value, a sharpness adjustment value, and the like.

The retouch parameters can be set in presetting, but can also be set for individual images. Furthermore, the inclination correction parameters are individually set. For these reasons, editing information corresponding to image data is stored so that parameters set for individual images can be stored.

Note that, as illustrated, edited image data corresponding to the image data may be stored in the imaging/editing information table 62.

The edited image data is image data in which image editing is performed on the original image data on the basis of editing information determined in presetting or editing information individually set. In addition, not only the image data retouched by the editing information but also the image data edited image data in which the quality of the image is changed may be used. The change in quality includes, for example, a change in image size, a change in resolution, cutout, a change in frame rate in a moving image, and the like.

In the drawing, the edited image data is distinguished from the original image data by adding "E" to the file name such as "DSC0001E.jpg" or the like. The edited image data is used for display on a user interface in the staff terminal 1 or the like.

Such edited image data is not necessarily created and stored, and for example, at the time of image display, the display may be performed by applying the editing information each time. Therefore, in the imaging/editing information table 62, the editing information may be updated and managed, and the edited image data may not be stored. However, as a matter of course, the edited image data is generated and stored as needed as illustrated in the drawing, which is effective in terms of reduction of a processing load at the time of display processing and the like.

The division information 63 is information on division of sub-events or scenes set as a result of division determination processing to be described later. The division information 63 is updated every time the division determination processing is performed.

The CPU 71 of the information processing device 70 serving as the staff terminal 1 executes the additional storage and update of the information regarding the event data 60 as described above by the function of the event data management unit 30 in FIG. 4.

Note that the format of the event data 60 and the format of the imaging/editing information table 62 are merely examples, and any format may be used as long as at least the above contents are managed for each event.

For example, the original image data, the metadata, the rating information, the selection information, the eye closure information, the archive information, the editing information, and the edited image data included in the imaging/editing information table 62 are not limited to being collectively stored as a table. Metadata, rating information, selection information, eye closure information, archive information, editing information, and edited image data may be stored in any format and form as long as the metadata, rating information, selection information, eye closure information, archive information, editing information, and edited image data are associated with at least one piece of original image data.

The UI control unit 31 of FIG. 4 is a function of performing presentation control of an image, rating information, and the like related to the event data 60 of a specific event and performing processing of detecting an operation input. That is, it is a function of performing user interface processing.

Examples of the user interface processing include presentation of various types of information, provision of an environment in which an operation can be input, processing of detecting an operation by the user, processing of detecting/estimating an intention of the user, and the like.

Specifically, the UI control unit 31 performs control processing of providing an operation input environment or presenting information to the user by causing the display unit 77 or the audio output unit 78 to execute output such as display output, audio output, or the like to the user, for example.

Alternatively, the UI control unit 31 performs processing of detecting an operation by the user, for example.

Alternatively, the UI control unit 31 performs, for example, both processing of providing an operation input environment to the user and processing of detecting an operation by the user.

Of course, the UI control unit 31 may perform other user interface processing.

The communication control unit 32 is a function of controlling communication for synchronizing event data with the external server device 4 in accordance with storage or update of the event data 60.

For example, when receiving an image transfer from the imaging device 2, the communication control unit 32 performs control of processing of transferring the image data from the communication unit 80 to the server device 4, and performs control of notifying the server device 4 of the update content according to the update of the content of the event data 60.

The filter processing unit 33 is a function of performing processing of filtering images in an image group captured for an event and extracting images to be displayed according to a user's operation. The filter condition is set by a user operation. Specifically, an archive setting state, an eye closure state, metadata, or the like is set as the filter condition.

The image analysis unit 34 has a function of setting the above-described eye closure information. For example, image analysis is performed on image data received by communication with the imaging device 2 to sense a person who is a subject and determine the eye closure state of the person. In a case where the image is in the eye closure state, eye closure information is generated. Such analysis is performed for each image, and the eye closure information is managed in the event data 60.

The division determination unit 35 is a function of performing processing of determining division in chronological order for an image group as a series of images captured for an event.

For example, division of sub-events in an event such as a wedding or the like, scenes obtained by subdividing sub-events, or the like is determined. For example, in a case where a wedding and a reception are set as one event, chronological-order division includes various events such as ceremony, reception, greeting, cake cut, cheers, bouquet toss, and the like. Although the contents of division are arbitrary, for example, in a case where a series of wedding is defined as an event, an event obtained by dividing the event is referred to as a "sub-event" for the sake of explanatory distinction. In addition, there is also a case where two-stage division determination is performed such that one sub-event is further subdivided. In this case, the subdivided one is referred to as a "scene".

What kind of event, matter, action, or the like is defined as a "sub-event" or a "scene" is arbitrary, and each division when the whole is defined as one "event" is defined as a "sub-event", and a further subdivided unit is defined as a "scene". For example, in some cases, "cake cut" may be one of "sub-events" or one of "scenes".

The above functions of FIG. 4 are merely examples. Since the information processing device 70 includes at least the event data management unit 30, the UI control unit 31, and the communication control unit 32, the information processing device 70 performs processing as the staff terminal 1 of the present embodiment.

Such functions are implemented, for example, when the information processing device 70 installs an application program for image collection content creation.

Figure 6:
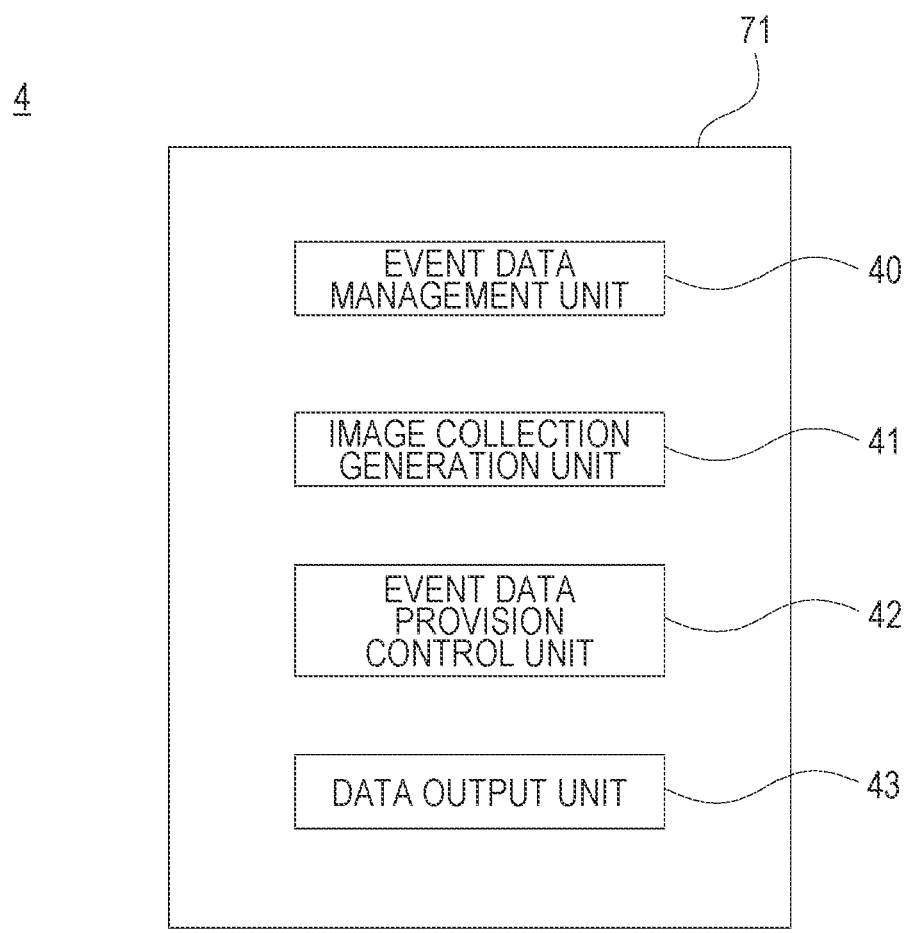
FIG. 6 is an explanatory diagram of a functional configuration of the server device according to the embodiment.

Next, in a case where the server device 4 is assumed as the information processing device 70 as illustrated in FIG. 3, in the information processing device 70, the functional configuration as illustrated in FIG. 6 is constructed in the CPU 71 by the application program.

FIG. 6 illustrates an event data management unit 40, an image collection generation unit 41, an event data provision control unit 42, and a data output unit 43 as functions provided in the information processing device 70 as the server device 4.

The event data management unit 40 is a processing function that performs storage/update management of event data in the server device 4.

Figure 7:
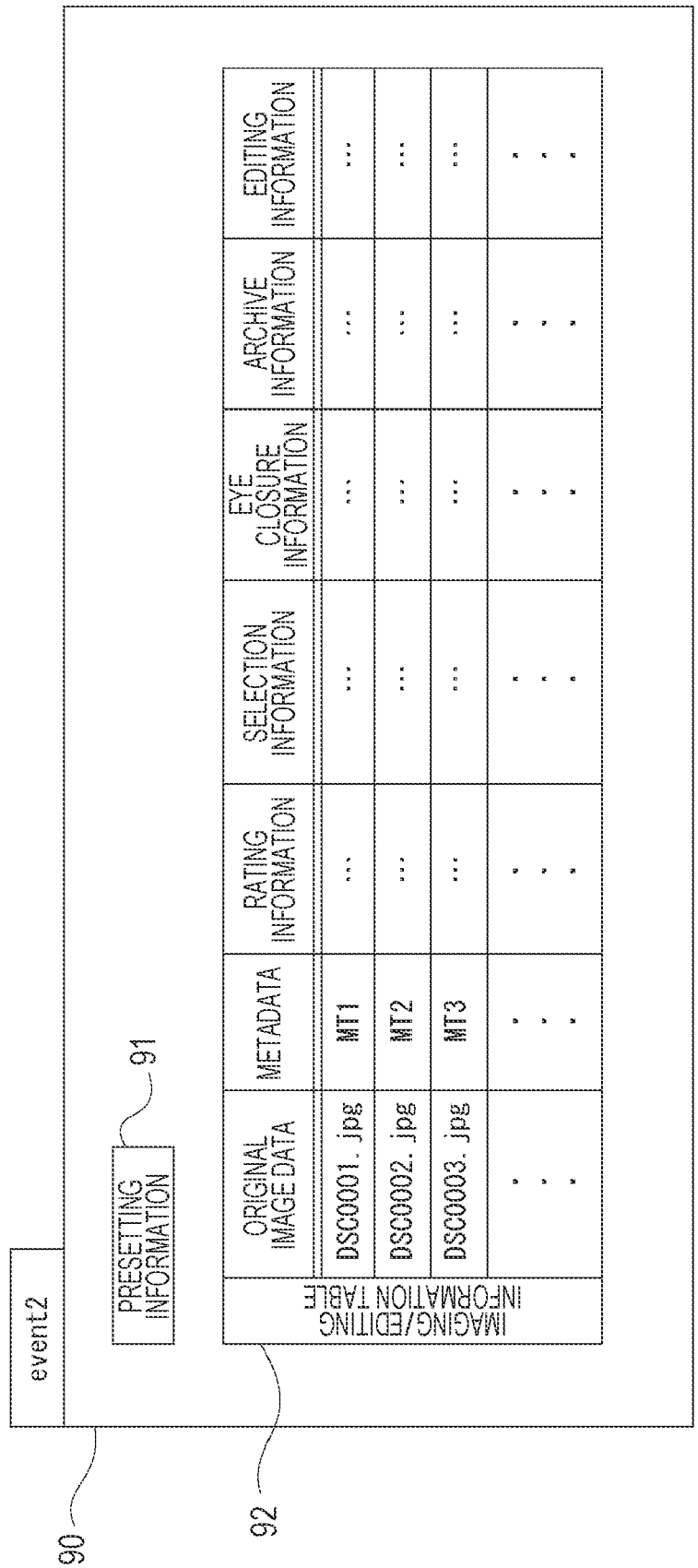
FIG. 7 is an explanatory diagram of event data on the server device side according to the embodiment.

The contents of the event data 90 on the server device 4 side are schematically illustrated in FIG. 7. Similarly to FIG. 5, the event data 90 is the event data for the event named "event2".

In this example, it is assumed that the event data 90 includes presetting information 91 and an imaging/editing information table 92.

The presetting information 91 is the same information as the presetting information 61 in the staff terminal 1. For example, the contents set in presetting in step S1 in FIG. 2 are similarly managed in the server device 4.

Note that, in the event data 90, the division information 63 in FIG. 5 may be managed in synchronization.

The imaging/editing information table 92 has substantially the same contents of information as the imaging/editing information table 62. That is, the original image data, the metadata, the rating information, the selection information, the eye closure information, the archive information, and the editing information can be managed for each image.

Note that edited image data is not associated in the imaging/editing information table 92, but this is because an edited image is created at the time of generating the web gallery. Of course, the server device 4 may sequentially generate edited image data and associate the edited image data with the original image data in the imaging/editing information table 92.

The CPU 71 of the information processing device 70 serving as the server device 4 executes the additional storage and update of the information regarding the event data 90 as described above by the function of the event data management unit 40 in FIG. 6.

The image collection generation unit 41 in FIG. 6 is a function of generating image collection content as a web gallery of a specific event. In particular, the image collection generation unit 41 generates image collection data, that is, web page data as a web gallery, with reference to selection information and editing information in the event data 90.

Figure 8:
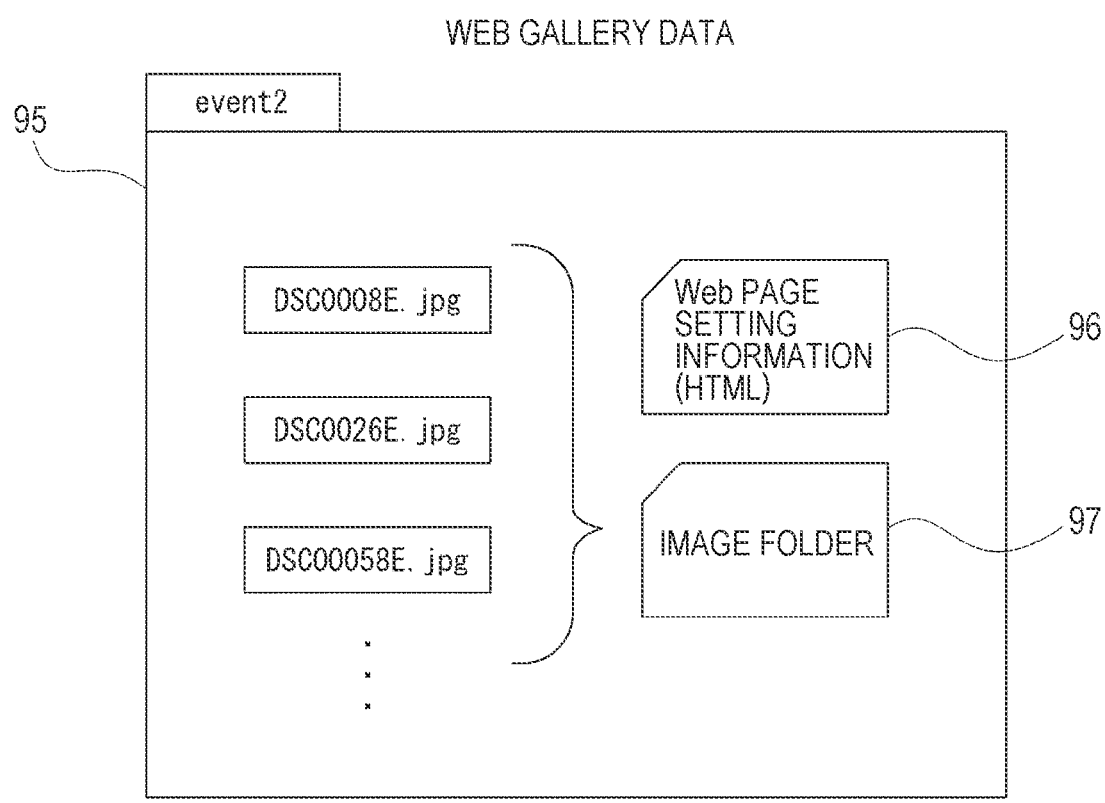
FIG. 8 is an explanatory diagram of web gallery information generated by the server device according to the embodiment.

An example of the web gallery data to be generated is illustrated in FIG. 8.

The server device 4 generates page information in a hypertext markup language (HTML) format or an extensible markup language (XML) format as web page setting information 96 as web gallery data, for example, and generates an image folder 97 in which images called from the web page setting information 96 and displayed in a page are collected.

The image folder 97 includes edited image data of images adopted as the web gallery.

The event data provision control unit 42 in FIG. 6 is a function of performing control to cause the staff terminal 1 to execute transmission for providing the event data 90.

For example, in response to the staff terminal 1 logging in to the server device 4 and designating an event, all or part of the event data 90 of the event is transmitted to the staff terminal 1. The staff terminal 1 sets the received content as the event data 60 under its own management. As a result, for example, the assistant can perform an operation using the event data 60 on the terminal device 1B side.

Of course, a case is also assumed where the event data provision control unit 42 performs the event data provision control on the terminal device 1A or the personal computer 3.

The data output unit 43 performs control to transmit a part or all of data included in the event data, for example, metadata, rating information, selection information, eye closure information, archive information, editing information, or image data (for example, original image data) as a file of a predetermined format to the terminal device (for example, the personal computer 3).

That is, it is a processing function of providing data necessary for creating the image collection content of the actual delivery to the camera staff side.

The functions of FIG. 6 described above are merely examples. Since the information processing device 70 includes the event data management unit 40, event data synchronization can be performed between the staff terminal 1 and the server device 4. In addition, since the server device 4 includes the image collection generation unit 41, it is possible to quickly generate the web gallery.

Each function of FIG. 6 is implemented, for example, when the information processing device 70 installs an application program for image collection content creation.

<3. Presetting Processing>

Hereinafter, a specific processing example will be described.

First, a processing example of presetting in the staff terminal 1 illustrated as step S1 in FIG. 2 will be described with reference to FIGS. 9 and 10.

Note that the processing of the staff terminal 1 described below is processing performed by the CPU 71 of the information processing device 70 having the function of FIG. 4.

In addition, in each screen example described below together with the flowchart, for example, it is assumed that the information processing device 70 as the staff terminal 1 is a smartphone, and is an example of display contents on a display formed on a housing thereof.

Figure 9:
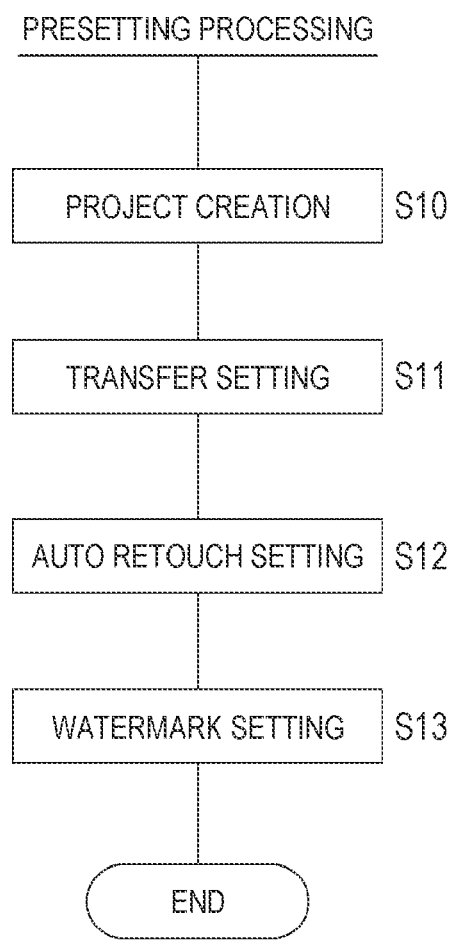
FIG. 9 is a flowchart of presetting processing of the terminal device according to the embodiment.

FIG. 9 illustrates processing of the staff terminal 1.

For example, the camera staff activates the application program using the staff terminal 1 and performs an operation for preparation processing. In response to the operation, in the staff terminal 1, the CPU 71 executes the processing in and after step S10.

In step S10, the staff terminal 1 performs project creation processing. This is processing of setting a target event for creating an image collection.

For example, on the display unit 77 of the staff terminal 1 that has activated the application program, a project list screen 110 is displayed as illustrated in FIG. 10A.

The project list screen 110 is provided with a list area 111 in which event names as individual project targets are displayed in a list. In addition, an addition icon 112, a communication icon 134, a menu icon 127, and the like are displayed.

On such a project list screen 110, the camera staff creates a target project for image collection creation. For example, an operation of creating one project is performed by inputting an event name or the like.

For example, by operating the addition icon 112, a project setting screen (not illustrated) is displayed, and the title of the project (for example, an event name), the date and time of the event, the place, whether or not the auto retouch setting is applied, and the like can be set.

The camera staff appropriately inputs items and performs an operation of setting project contents. In response to this, the staff terminal 1 creates one project and displays it in the list area 111.

FIG. 10B illustrates an example in which two projects with names "event1" and "event2" are displayed. For example, information such as an event name, a date and time, a place, and the like is presented for each project.

In step S10 of FIG. 9, the staff terminal 1 performs control to provide a user interface of such a screen by the function of the UI control unit 31, and performs the project creation processing according to the operation of the camera staff.

Note that this project creation processing is performed, for example, in an online connection state between the staff terminal 1 and the server device 4. In this case, the staff terminal 1 transmits information for the synchronization processing to the server device 4 according to the operation content of the user by the function of the communication control unit 32.

As a result, the server device 4 can also enter information as one project in synchronization.

In step S11 of FIG. 9, the staff terminal 1 performs transfer setting. The transfer setting is a setting of FTP transfer with the imaging device 2, and is, for example, a setting of a file format to be transferred, an FTP connection server, or the like.

The staff terminal 1 executes screen display for transfer setting for the camera staff by the function of the UI control unit 31, and performs necessary transfer setting according to the operation of the camera staff.

In step S12, the staff terminal 1 performs auto retouch setting. The auto retouch setting is processing of setting a parameter of image editing processing to be commonly applied to each image.

The staff terminal 1 executes screen display for auto retouch setting for the camera staff by the function of the UI control unit 31, and performs necessary auto retouch setting according to the operation of the camera staff. The parameter of the auto retouch setting is described in the event data 60 of the created project as the presetting information 61.

In addition, this auto retouch setting is also performed, for example, in a state where the staff terminal 1 and the server device 4 are connected online, and the staff terminal 1 transmits the parameter information set to the auto retouch setting to the server device 4 for synchronization processing.

As a result, the server device 4 can also store the presetting information 91 having the same content as the presetting information 61 of the event data 60 as the event data 90 of the project.

In step S13, the staff terminal 1 performs watermark setting. For example, a camera operator's name or the like can be inserted as a watermark (electronic watermark) into the image of the web gallery. The watermark setting is processing of setting the presence or absence and contents of the watermark.

The staff terminal 1 executes screen display for watermark setting for the camera staff by the function of the UI control unit 31, and performs necessary watermark setting according to the operation of the camera staff. The information of this watermark setting is also described in the event data 60 of the created project as the presetting information 61.

In addition, this watermark setting is also performed in a state where the staff terminal 1 and the server device 4 are connected online, and the staff terminal 1 transmits the information of the watermark setting to the server device 4 for synchronization processing.

As a result, the server device 4 can also store the presetting information 91 synchronized with the presetting information 61 in the event data 90 of the project.

Note that the order of steps S11, S12, and S13 described above may be different. In addition, the processing of each step may not be performed as a series of processing, and for example, may be performed each time during activation according to a user's operation.

In addition, each processing may be skipped if it is not necessary. For example, the transfer setting in step S11 may be performed every time a project is created in step S10. However, if the setting does not need to be particularly changed after the FTP transfer setting is performed once, step S11 may be skipped after the project is created in step S10, and the process may proceed to step S12. Of course, the same applies to the processing of steps S12 and S13, and these may be skipped in a case where it is not particularly necessary to change the setting after the setting.

In addition, the communication with the server device 4 for synchronization may be performed at the timing of each processing, but the information may be collectively transmitted at the time when some settings are made so that the presetting information 61 and 91 are synchronized.

Moreover, in a case where there is content set under an environment in which the online connection with the server device 4 cannot be established, the set information may be transmitted and the presetting information 61 and 91 may be synchronized when the online connection state is established.

<4. Transfer/Editing Processing>

Next, a specific processing example of the staff terminal 1 in step S2 in FIG. 2 will be described with reference to FIG. 11. That is, the processing is processing executed by the staff terminal 1 mainly by the functions of the event data management unit 30, the communication control unit 32, and the image analysis unit 34 in FIG. 4 when a wedding is being held.

Figure 11:
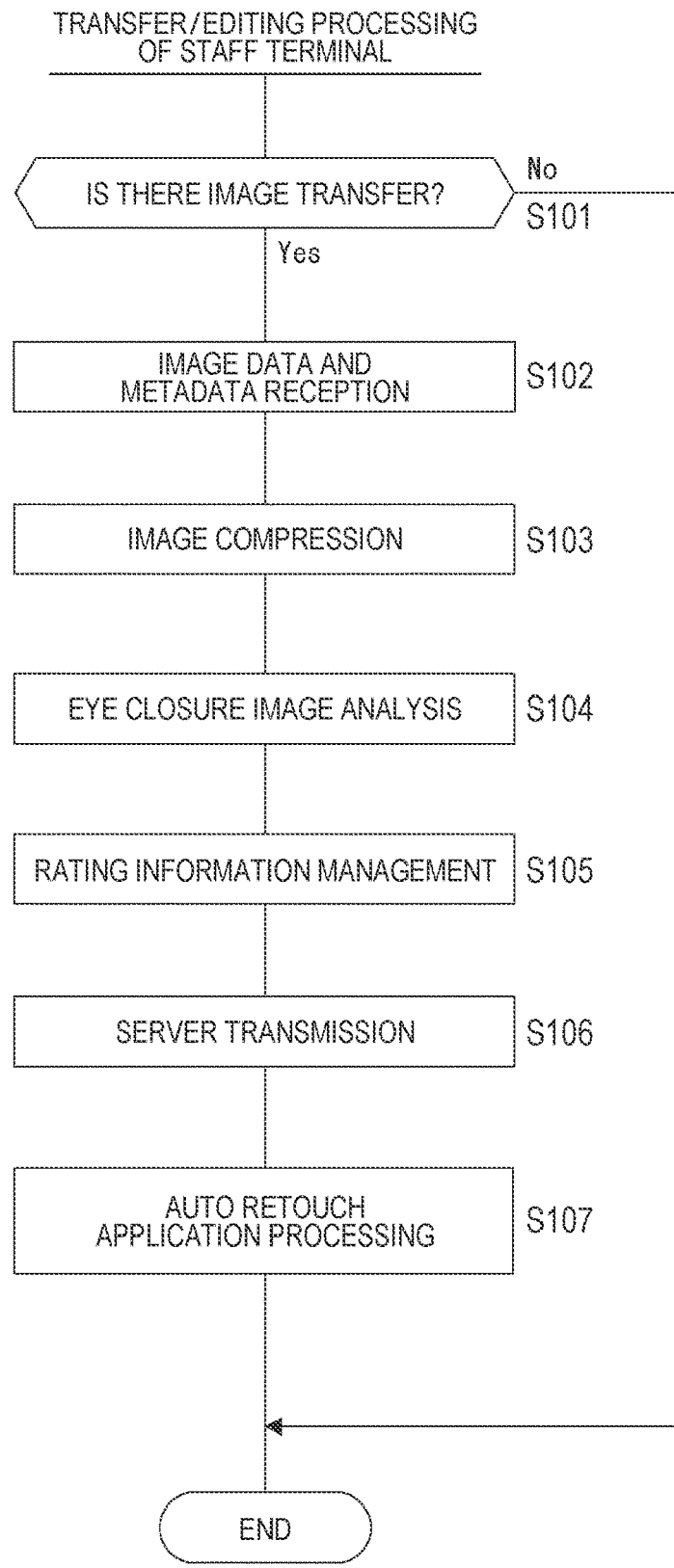
FIG. 11 is a flowchart of transfer/editing processing of the terminal device according to the embodiment.

In step S101 of FIG. 11, the staff terminal 1 checks whether or not image file transfer from the imaging device 2 has been started. In a period in which no image transfer is performed, the processing of FIG. 11 is not particularly performed.

For example, during a wedding, a camera operator captures an image of a scene of a ceremony or a reception by the imaging device 2. For example, after a still image is captured, the imaging device 2 sequentially transfers an image file to the staff terminal 1 automatically or according to an operation of a camera operator. Note that the transfer timing is an example. Transfer may be performed every time one image is captured, or a plurality of images may be transferred together.

In addition, in the case of moving image capturing, transfer may be performed in a period in which recording is not performed in units of recording start/stop, or transfer may be performed during a recording period after recording is started. All the recorded videos may be transferred, or only a first predetermined period may be transferred.

In addition, the camera operator can add rating information to the captured image by an operation on the imaging device 2 side. For example, an image is confirmed immediately after imaging, and rating information is input. This rating information is described in metadata.

The transfer of the image file including the image data and the metadata may be executed, for example, in response to the camera operator confirming the captured image and inputting the rating information.

In the staff terminal 1, when it is detected that the transfer of such an image file is started, the process proceeds from step S101 to step S102, and the reception processing of the image data and the metadata is performed. In this case, the received image data is managed as original image data in the imaging/editing information table 62 of the event data 60. In addition, the received metadata is also managed correspondingly.

The staff terminal 1 performs image compression processing in step S103. For example, the compression processing is performed so as to increase the compression rate of the received image data. This is processing of generating image data to be transmitted to the server device 4.

In step S104, the staff terminal 1 performs processing of eye closure image analysis. That is, image analysis processing is performed on the received image or the image compressed in step S103, and sensing of person as a subject, pupil sensing, and eye closure determination are performed. Then, in a case where it is determined that it is an image where the person of the subject is in the eye closure state, eye closure information indicating the eye closure state is generated for the image. The eye closure information is registered in the imaging/editing information table 62 of the event data 60.

In step S105, the staff terminal 1 performs rating information management. This is processing of confirming the metadata of the received image file, extracting the rating information given by the imaging device 2 side, and managing the rating information updatably in the imaging/editing information table 62 of the event data 60.

In step S106, the staff terminal 1 transmits information to the server device 4 for synchronization of the event data 60 and 90. In this case, the staff terminal 1 transmits the image data compressed in step S103, the metadata, the rating information, and the eye closure information to the server device 4. The server device 4 side updates the event data 90 in response to the reception, and maintains the synchronization state with the event data 60.

In step S107, the staff terminal 1 performs auto retouch application processing. That is, the original image data is automatically subjected to image processing by the preset retouch parameter to generate edited image data, and is managed in the imaging/editing information table 62.

This edited image data is generated for use in UI display on the staff terminal 1.

Note that, in this example, the auto retouch application processing is performed as the processing at the time of receiving the image file, but the auto retouch application processing may be performed as necessary at another time point, for example, when display of one image is requested or the like.

Furthermore, it is also conceivable to perform image processing on the compressed image data generated in step S103. In that case, for example, the order of the processing in step S106 and step S107 may be changed, image processing of applying auto retouch to the compressed image data may be performed, and then the compressed image data may be transmitted to the server.

By performing the processing of FIG. 11 described above, in the staff terminal 1, an image is taken in in accordance with imaging of the camera operator, and information corresponding to the image is managed by the event data 60. For example, all the captured images are in a state of being managed by the event data 60 at the time point when the wedding is ended.

In addition, by performing sequential transmission for synchronization, the event data 90 on the server device 4 side is synchronized with the event data 60 on the staff terminal 1 side during and at the end of the wedding.

Furthermore, also in the process of the processing of FIG. 11, the list of images transferred from the imaging device 2 and the communication status are displayed in a time view 120 and the like to be described later, so that the camera staff can confirm the image taking-in status and the like to the staff terminal 1.

<5. Selection Processing>
[5-1 Flow of Entire Selection]

Next, a detailed processing example as the selection in step S3 in FIG. 2 will be described with reference to the flowcharts in FIGS. 12 to 18 and the screen examples in FIGS. 19 to 35.

Note that FIGS. 12 to 18 illustrate a series of flowchart separately, and "c1", "c2", "c3", "c4", "c5", "c6", "c7", and "c8" indicate connection relationships.

The processing in these flowcharts is processing by the functions of the event data management unit 30, the UI control unit 31, the communication control unit 32, the filter processing unit 33, and the division determination unit 35 in FIG. 4.

Figure 12:
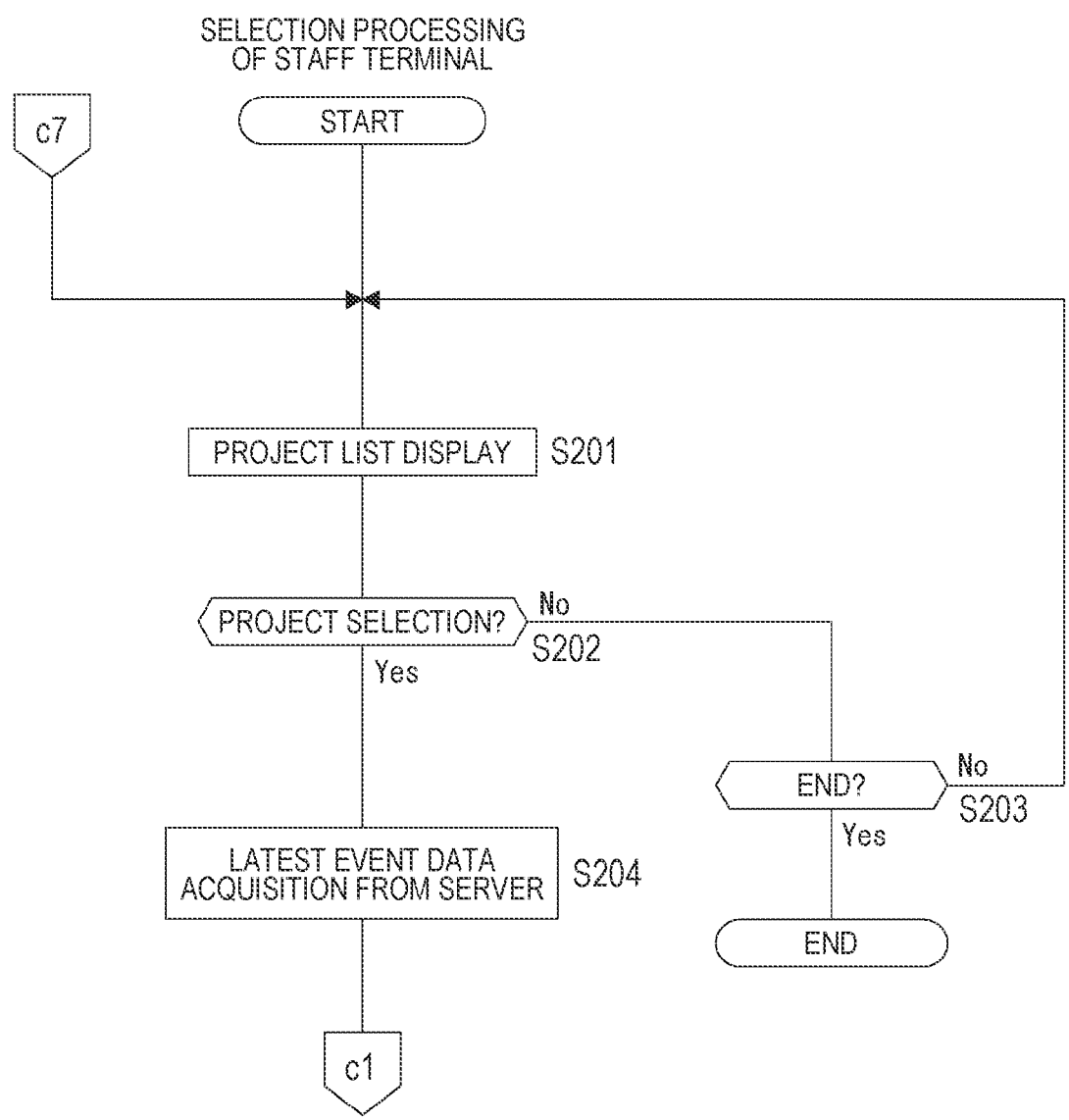
FIG. 12 is a flowchart of selection support processing of the terminal device according to the embodiment.

Step S201 in FIG. 12 illustrates processing of displaying a list of projects (event names and the like) on the project list screen 110 as illustrated in FIG. 10B.

In step S202, the staff terminal 1 monitors whether or not a project selection operation has been performed on the project list screen 110, and monitors an end operation of the application program in step S203.

When the end operation of the application program is performed, the application program is closed, and the processing is ended.

For example, in a case where selection is performed in the middle or immediately after a wedding, the camera staff performs an operation of selecting a target project on the project list screen 110. For example, an operation such as tapping one of the projects displayed in the list area Ill or the like is performed.

When detecting such an operation, the staff terminal 1 advances the processing from step S202 to step S204, and acquires the latest event data for the selected project. For example, the staff terminal 1 requests the server device 4 for the event data 90 of the selected project, and takes in the transmitted event data 90. Then, it is compared with the event data 60 held by itself and updated to the latest information contents. For example, some information that can be determined whether the information is old or new is compared between the event data 60 and the event data 90, such as update date and time information, version management information, and the like. If the information is different, the event data 60 is ensured to have the latest information content.

For example, assuming the terminal device 1A possessed by the camera operator, there may be a case where the assistant inputs the rating information and the selection information on the terminal device 1B side during the wedding, and these are not reflected in the event data 60 on the terminal device 1A side.

In addition, in a case where the terminal device 1B side possessed by the assistant tries to input the rating information and the selection information, it is appropriate to input with reference to the latest information on the terminal device 1A side.

Therefore, the staff terminal 1 receives the event data 90 of the server device 4 to which the latest information is transmitted from both the terminal devices 1A and 1B, and updates the information of the event data 60 if the own event data 60 is not the latest.

Note that there may be only one staff terminal 1, and the information on the staff terminal 1 is always the latest. In such a case, the processing of step S204 may be unnecessary.

Subsequently, the staff terminal 1 proceeds to step S211 in FIG. 13 and displays an event image list. For example, a time view 120 as illustrated in FIG. 19 is displayed.

The time view 120 is a list display as a simple chronological display in which images are arranged in order of imaging time in the image area 128.

The display mode of the time view 120 changes as illustrated in FIGS. 20A, 20B, and 20C according to the enlargement/reduction operation.

Figure 19:
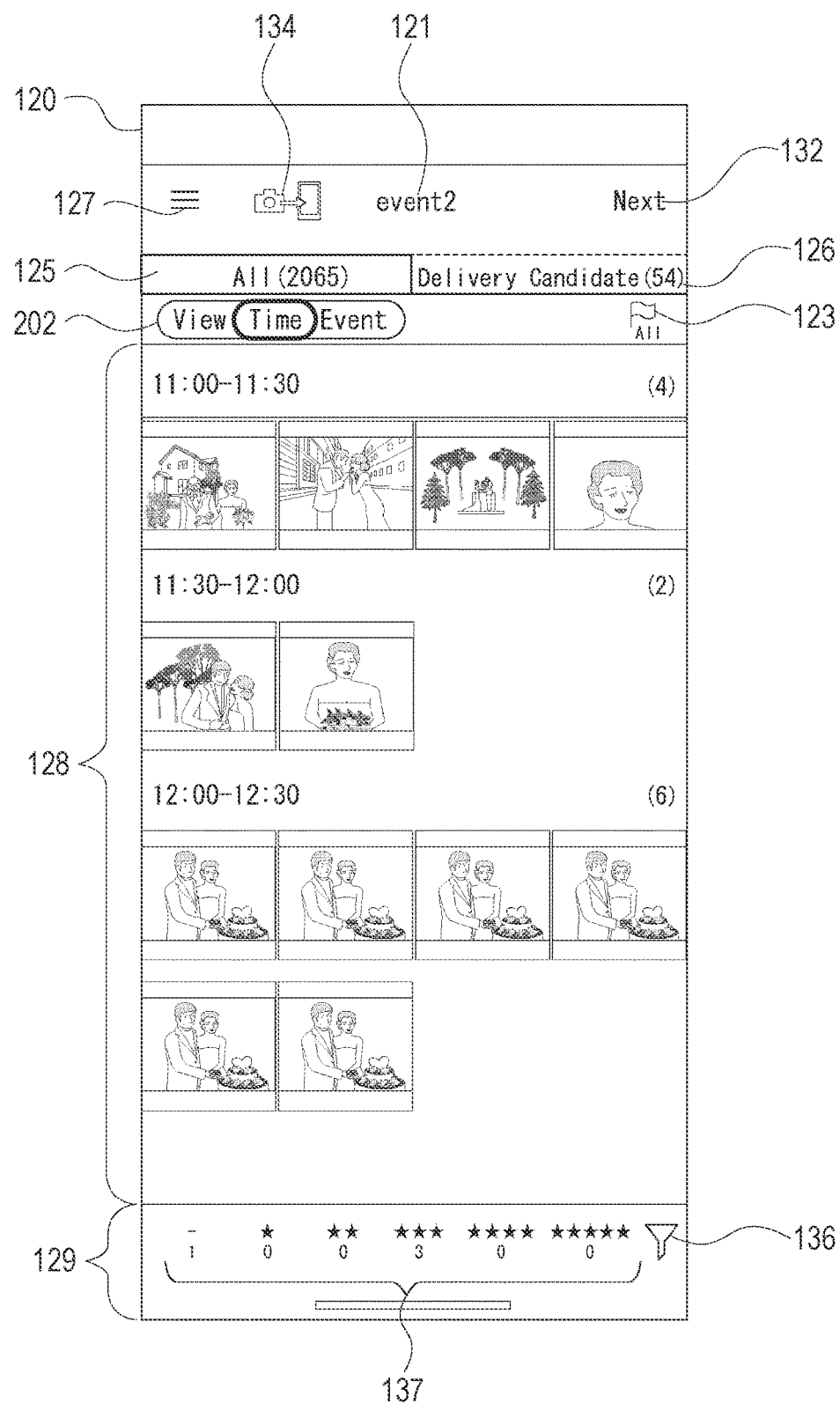
FIG. 19 is an explanatory diagram of a time view of the embodiment.
Figure 20:
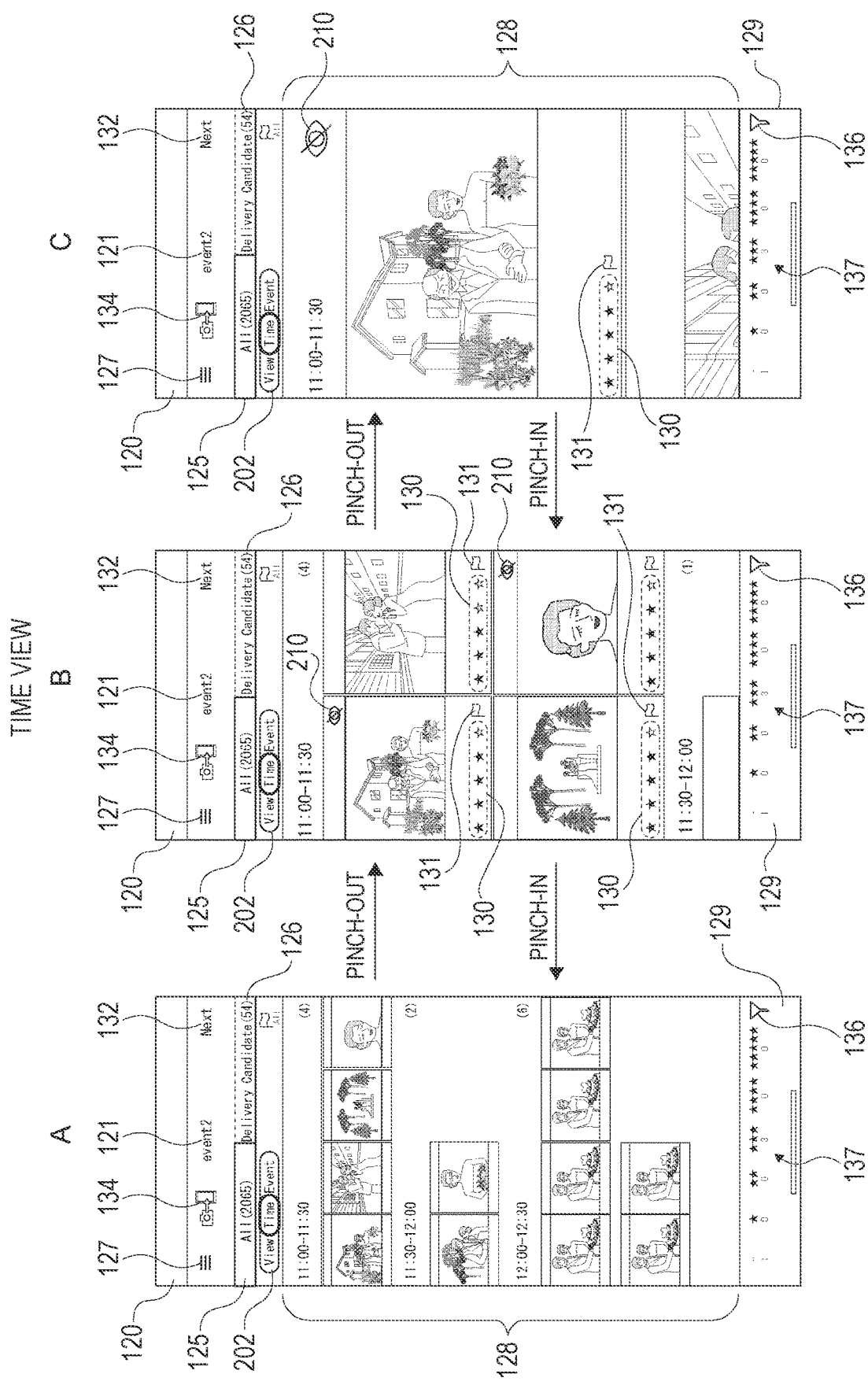
FIG. 20 is an explanatory diagram of enlargement/reduction of a time view according to the embodiment.

FIGS. 19 and 20A illustrate a state in which four images are arranged in one row in the image area 128, FIG. 20B illustrates a state in which two images are arranged in one row, and FIG. 20C illustrates a state in which one image is arranged in the vertical direction of the screen. The user can optionally adjust the image size to view the list.

Figure 13:
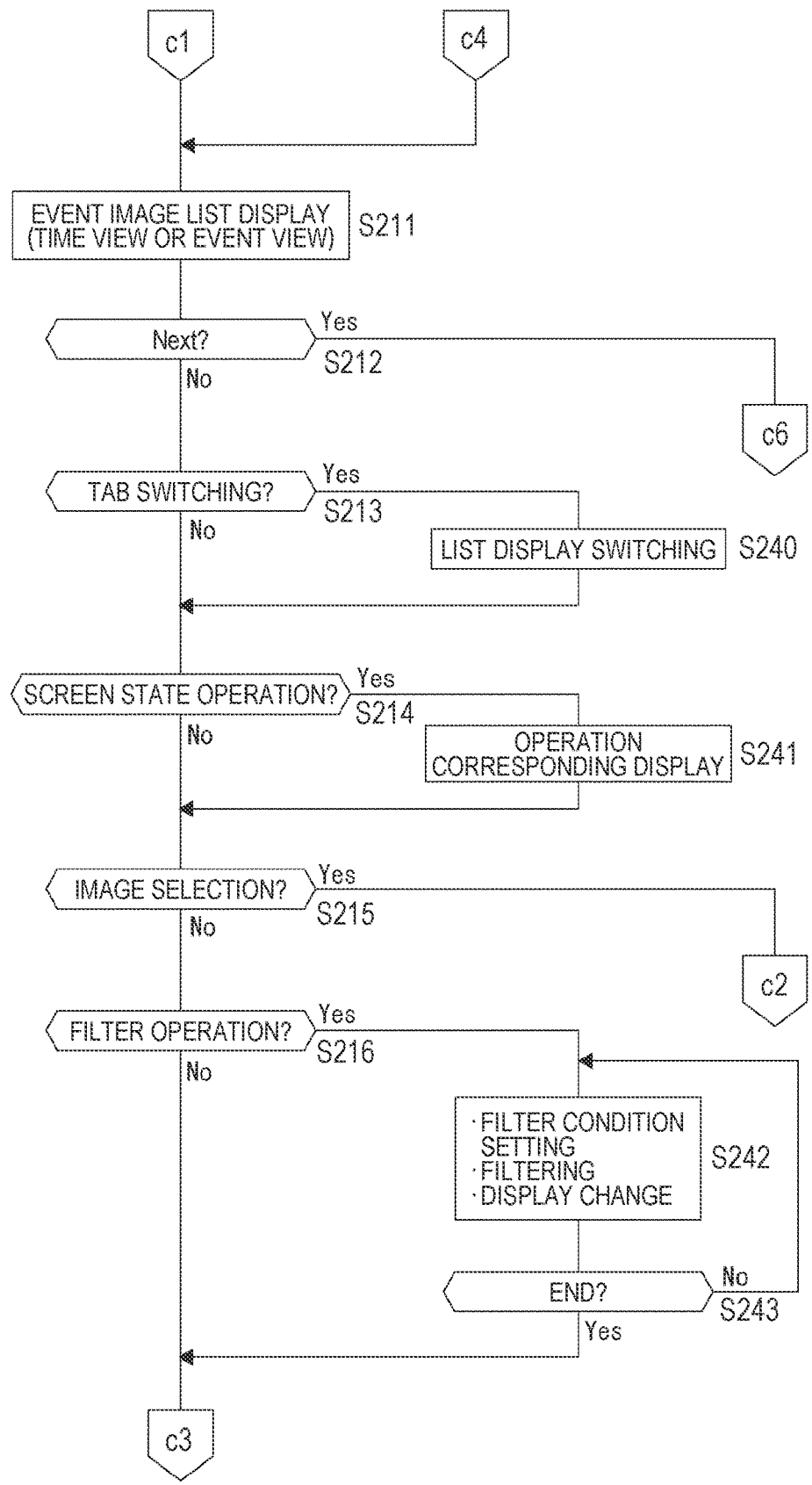
FIG. 13 is a flowchart of selection support processing of the terminal device according to the embodiment.
Figure 21:
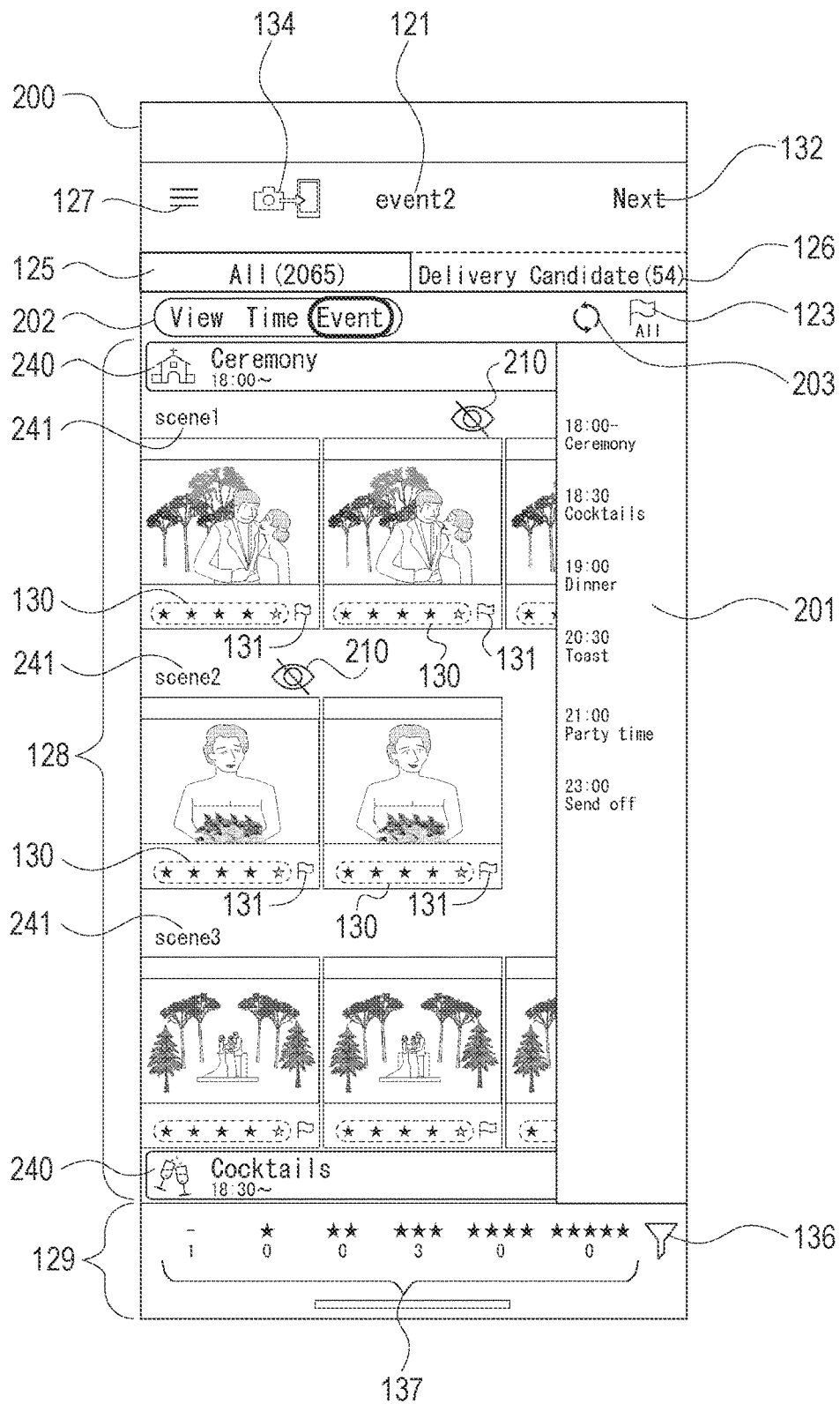
FIG. 21 is an explanatory diagram of an event view according to the embodiment.
Figure 22:
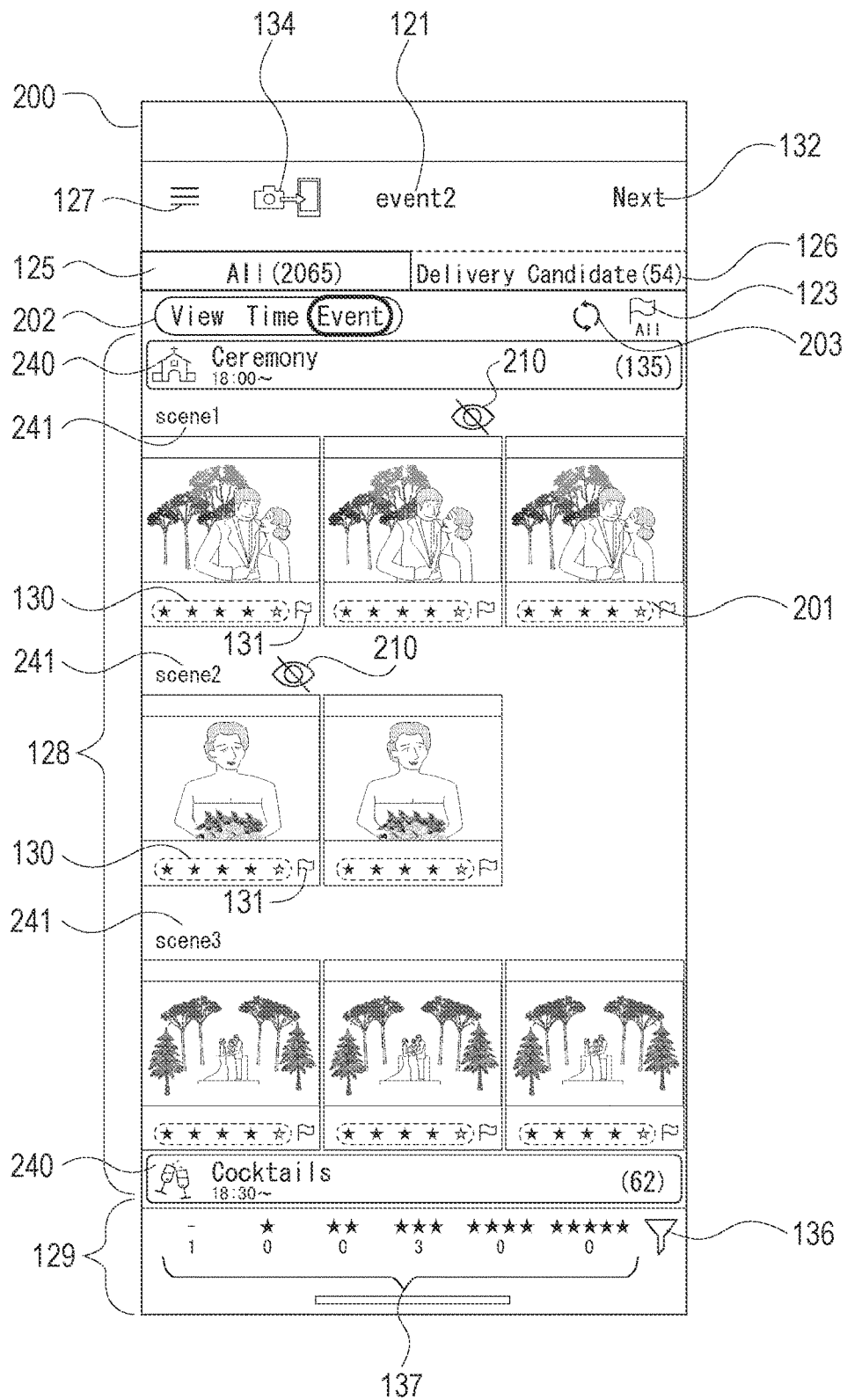
FIG. 22 is an explanatory diagram of an event view according to the embodiment.

In addition, in the event image list display in step S211 of FIG. 13, the staff terminal 1 may display an event view 200 as illustrated in FIG. 21 or 22 instead of the time view 120.

An image area 128 is also provided in the event view 200, and images are displayed in a list. In this case, a division of a sub-event or a scene is set for each image, and the list is displayed in units of sub-events or scenes.

FIG. 21 illustrates a state in which an index bar 201 is displayed in the event view 200, and FIG. 22 illustrates a state in which the index bar 201 is not displayed.

Details of event view 200 will be described later.

In the time view 120 and the event view 200, an event title 121 is displayed, and an all-flag icon 123, a next icon 132, a communication icon 134, a menu icon 127, and the like are displayed.

The menu icon 127 is an operator for displaying various menu items.

The communication icon 134 is an icon for displaying the FTP communication state with the imaging device 2 or the like.

The all-flag icon 123 is an operator for setting on/off of a selection flag indicating an image to be used for image collection for all images.

The next icon 132 is an operator for transition to the next screen.

As described above, the image area 128 is provided in the time view 120 and the event view 200, and images transferred from the imaging device 2 are displayed in a list by thumbnails. However, an all tab 125 and a candidate tab 126 are provided for display of the image area 128.

When the all tab 125 is selected, the images transferred from the imaging device 2 are displayed in the image area 128 regardless of whether the state of the selection flag is ON or OFF. For example, FIG. 19 is a list display when the all tab 125 is selected.

Figure 23:
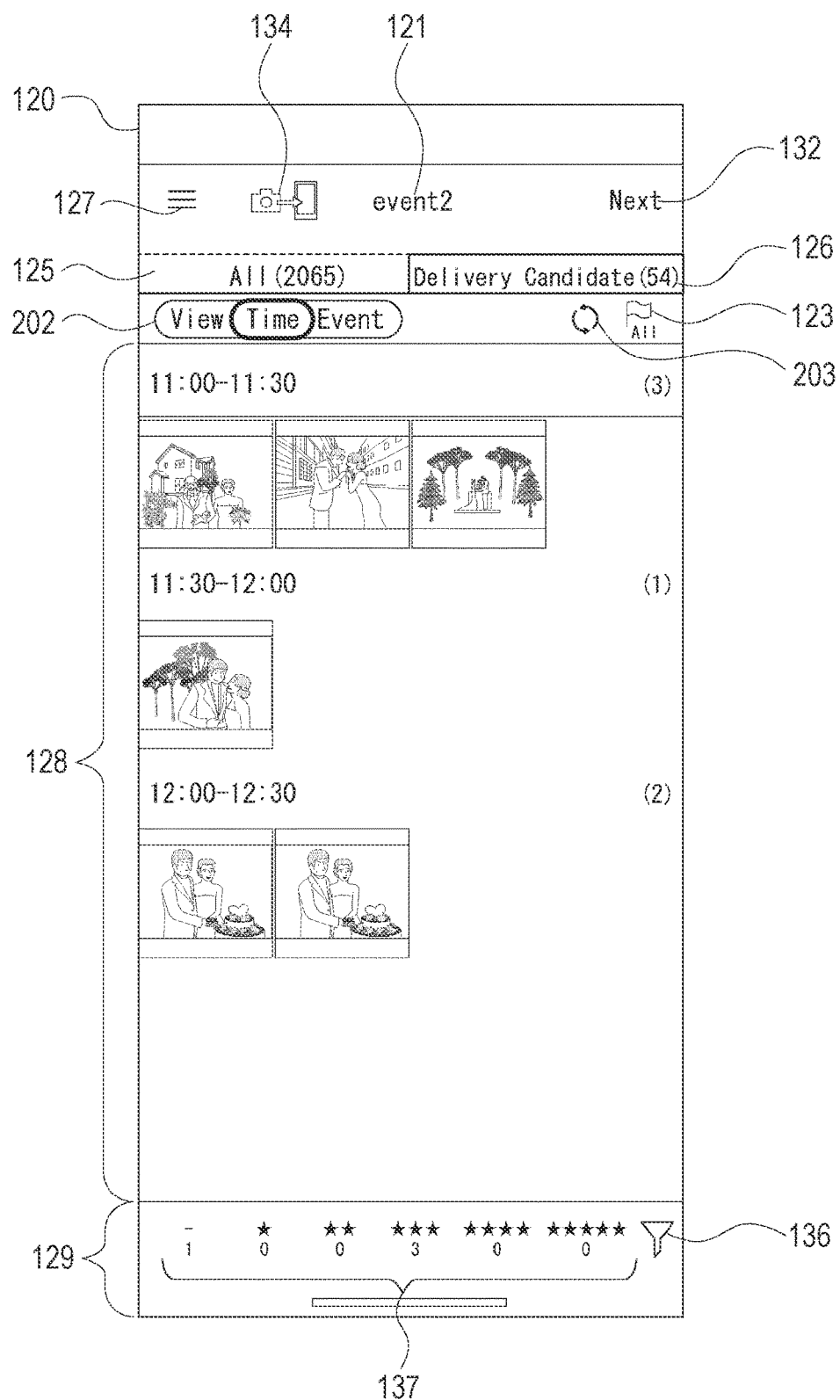
FIG. 23 is an explanatory diagram of a screen of a candidate tab of the time view according to the embodiment.

On the other hand, when the candidate tab 126 is selected, only images for which the selection flag is set to ON among all the images transferred from the imaging device 2 are listed in the image area 128. For example, FIG. 23 illustrates an example of list display when the candidate tab 126 is selected. On/off of the selection flag is set by operating the individual images depending on whether or not the images are to be adopted for the web gallery by the camera staff.

The number of corresponding images is also displayed in the all tab 125 and the candidate tab 126. "2065" in FIG. 23 indicates the number of images displayed in the all tab 125, and "54" indicates the number of images displayed in the candidate tab 126.

A view switching button 202 is displayed in the time view 120 and the event view 200. When "Time" is selected as illustrated in FIG. 19, the time view 120 is displayed. In addition, when "Event" is selected as illustrated in FIG. 21, the event view 200 is displayed.

The user may optionally switch between the time view 120 and the event view 200 for the list display. For example, the view switching button 202 alternately switches between "Time" and "Event" each time a tap operation is performed.

In addition, for each image in the image area 128 in the time view 120 and the event view 200, an eye closure icon 210 may be displayed as illustrated in FIGS. 20B, 20C, and 21. This is to present an image in which the subject person is in the eye closure state by the icon based on the above-described eye closure information.

In particular, in a case where a relatively small thumbnail image is displayed as illustrated in FIGS. 20B and 21, it may be difficult to discriminate whether or not the person is in the eye closure state. Presentation of the eye closure state by the eye closure icon 210 is useful for image confirmation.

However, in this example, the eye closure icon 210 is not displayed in FIG. 20A. This is because, in a case where thumbnail images are made extremely small and it is desired to browse a large number of images at a time, if the eye closure icon 210 is also displayed, the screen becomes complicated. Meanwhile, even in such a case, an example of displaying the eye closure icon 210 is also conceivable.

In addition, for each image in the image area 128 in the time view 120 and the event view 200, a rating icon 130 and a flag setting icon 131 are displayed corresponding to the image as illustrated in FIGS. 20B, 20C, and 21.

The rating icon 130 not only displays the rating information set by the number of stars, but also serves as an operator for changing the rating. For example, the number of stars can be changed by tapping or sliding a portion of the rating icon 130, which is the rating change operation.

In addition, the flag setting icon 131 represents on/off of the selection flag by, for example, a change in a color or luminance of the icon, or the like. In addition, the flag setting icon 131 is also used as an operator for switching on/off of the selection flag. For example, the selection flag is switched on/off by a tap operation.

Note that In FIG. 20A, the rating icon 130 and the flag setting icon 131 are not displayed. This is because the rating icon 130 and the flag setting icon 131 are displayed when the display corresponding to the images becomes an easily viewable size or an easily operable size as illustrated in FIG. 20B.

Note that, as a matter of course, the rating icon 130 and the flag setting icon 131 may be displayed corresponding to the images even in the state of FIG. 20A.

In addition, a filter designation area 129 is provided in the time view 120 and the event view 200. The rate designation icon 137 of the filter designation area 129 enables narrowing of images by, for example, six-stage rating. For example, operators as the number of stars are provided, filtering is performed according to the designated operators, and the extracted images are displayed in a list in the image area 128.

For example, in a case where an operator of three stars is operated, images with rating information of "three stars" or more (that is, images corresponding to any one of "three stars", "four stars", and "five stars") are extracted and displayed in a list. Alternatively, in this case, only images whose rating information is "three stars" may be extracted and displayed in a list.

In addition, in the filter designation area 129, the number of images for which the rating is set is also indicated together with the rate designation icon 137 represented by the number of stars.

Furthermore, a filter operation icon 136 is displayed in the filter designation area 129. Setting of filter conditions other than the rating and filtering of the display images are enabled by operating the filter operation icon 136.

Figure 15:
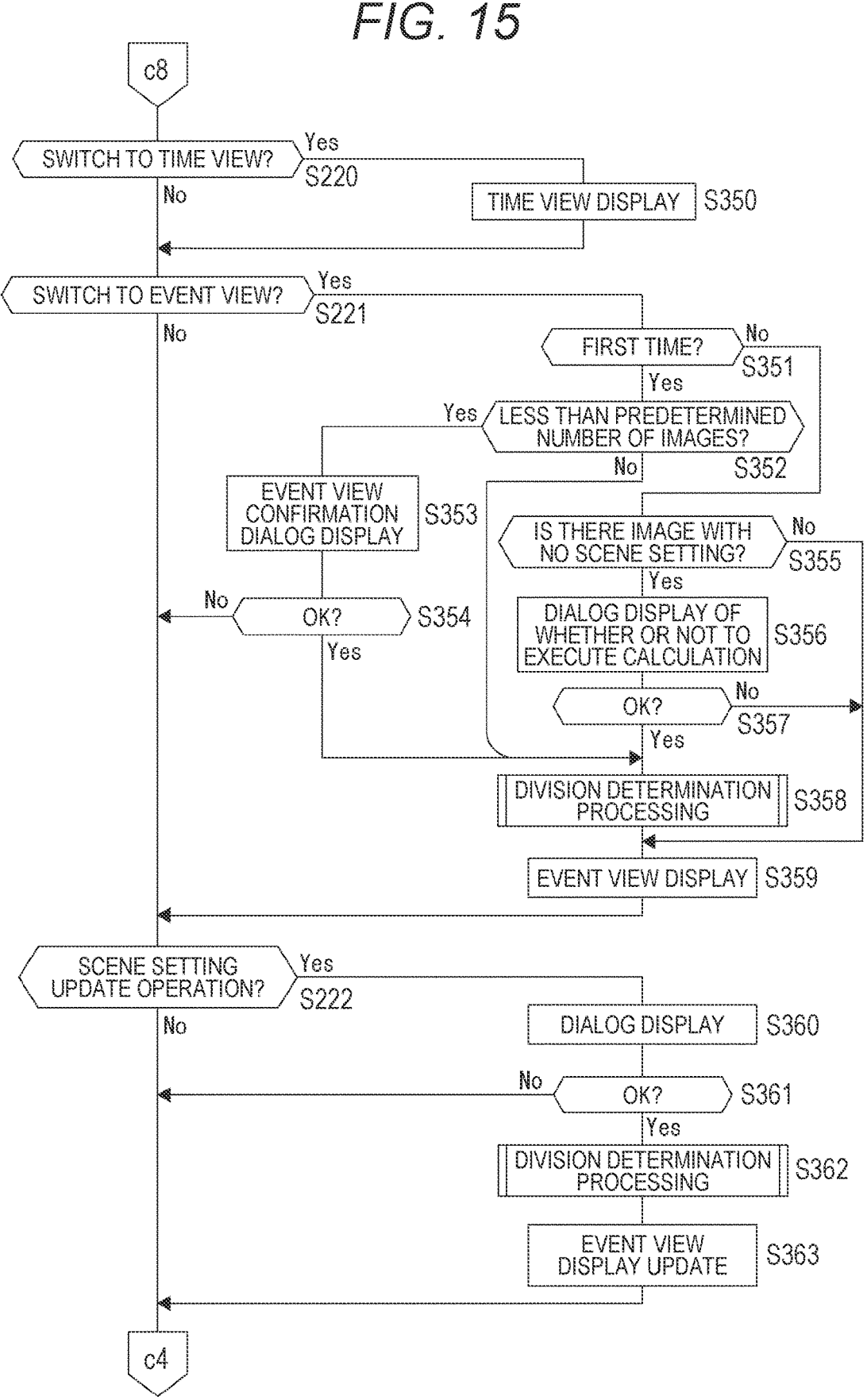
FIG. 15 is a flowchart of selection support processing of the terminal device according to the embodiment.

In a state where the time view 120 or the event view 200 is displayed as described above in step S211 of FIG. 13, the staff terminal 1 performs a monitoring loop process from step S212 to step S222 of FIG. 15.

In step S212 of FIG. 13, the staff terminal 1 monitors the operation of the next icon 132. Processing in a case where the operation of the next icon 132 is detected will be described later.

In step S213, the staff terminal 1 monitors the tab switching operation. The tab switching operation is an operation of the candidate tab 126 during the list display of the all tab 125 or an operation of the all tab 125 during the list display of the candidate tab 126.

When detecting the tab switching operation, the staff terminal 1 performs processing of switching the list display content in the image area 128 according to the selected tab in step S240.

In step S214, the staff terminal 1 monitors the operation related to the screen state performed by the camera staff on the image area 128.

Here, the operation related to the screen state is an operation such as enlargement/reduction of images, screen scrolling, appearance/deletion of display items, and the like.

For example, the staff terminal 1 monitors a pinch operation. The pinch operation here is a pinch-out operation for enlarging images and a pinch-in operation for reducing images.

When the pinch operation is detected, the staff terminal 1 enlarges or reduces the display state in the image area 128 in step S241.

FIGS. 20A, 20B, and 20C illustrate examples of display changes of the image area 128 according to pinch-in/pinch-out.

FIG. 20A illustrates a display state in which the thumbnail images are the smallest. When the pinch-out operation is performed, the images displayed in the list are enlarged as illustrated in FIG. 20B. The images are enlarged as illustrated in FIG. 20C by further pinch-out operation.

In addition, when the pinch-in operation is performed, the state in FIG. 20C is reduced to the state in FIG. 20B, and the state returns to the state in FIG. 20A by further pinch-in operation.

In addition, as described above, the presence or absence of display of the eye closure icon 210, the rating icon 130, the flag setting icon 131, and the like is also switched according to the enlargement/reduction.

In addition, in step S214, the staff terminal 1 also monitors the swipe operation. For example, in the time view 120 as illustrated in FIG. 19 or the event view 200 in FIG. 21, the up-down swipe operation is recognized as a scroll operation in the up-down direction, and the display is vertically scrolled in step S241.

In addition, the left-right swipe operation in the event view 200 is recognized as a scroll operation in the left-right direction, and the staff terminal 1 horizontally scrolls the display in step S241.

In addition, the staff terminal 1 recognizes, for example, a swipe operation to the right on the index bar 201 in the event view 200 of FIG. 21 as an operation of deleting the index bar 201, and recognizes a swipe operation to the left from the right end of the screen in the state of FIG. 22 as an operation of calling the index bar 201. Then, in step S241, display control of closing or making the index bar 201 appear is performed.

In step S215 of FIG. 13, the staff terminal 1 monitors whether or not an operation for selecting one of the images displayed in the image area 128 has been performed. For example, the operation is such that one thumbnail image is tapped. Processing in a case where this selection operation is detected will be described later.

In step S216, the staff terminal 1 monitors the filter operation. That is, the operation is an operation of the rate designation icon 137 or an operation of the filter operation icon 136 in the filter designation area 129.

In a case where the operation of any operator in the filter designation area 129 is detected, the staff terminal 1 proceeds to step S242, sets and stores a filter condition according to the operation, performs filtering processing according to the filter condition, and extracts corresponding images. Then, extracted images as filtering results are displayed in a list in the image area 128.

When the end of the filter processing is detected in step S243, the process returns to the monitoring loop.

Note that a specific example of the processing in steps S242 and S243 when the filter operation icon 136 is operated will be described later.

Figure 14:
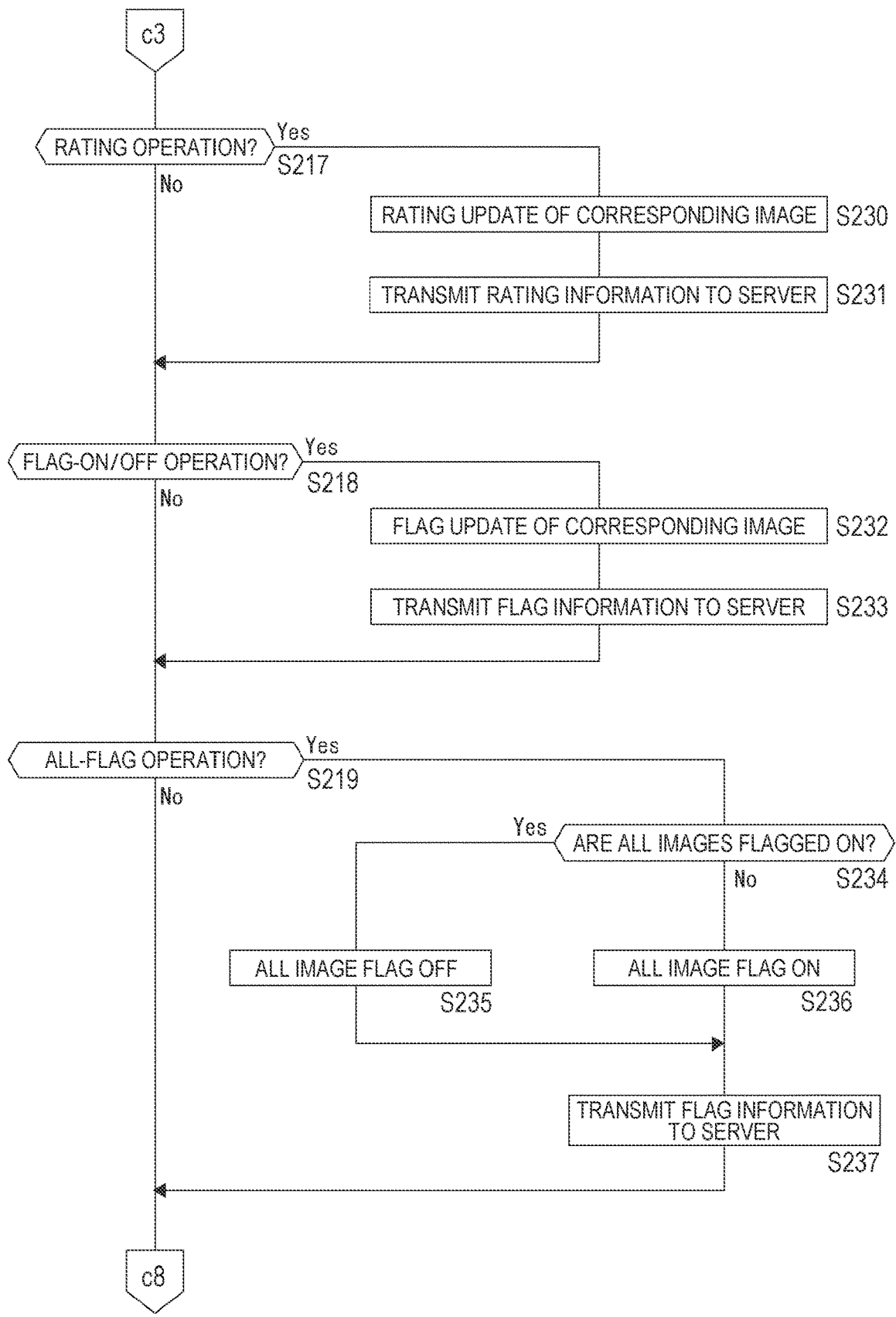
FIG. 14 is a flowchart of selection support processing of the terminal device according to the embodiment.

Subsequently, in step S217 of FIG. 14, the staff terminal 1 monitors the rating operation. For example, the operation is performed on the rating icon 130 as illustrated in FIGS. 20B, 20C, and 21.

In a case where the operation on the rating icon 130 is detected, the staff terminal 1 proceeds to step S230 and updates the event data 60 so that the rating information of the image corresponding to the rating icon 130 becomes a value corresponding to the operation.

In addition, in step S231, the staff terminal 1 transmits the updated rating information to the server device 4, and the event data 90 is updated on the server device 4 side. That is, the synchronization state is maintained.

In step S218, the staff terminal 1 monitors the flag-on/off operation. For example, the operation is performed on the flag setting icon 131 as illustrated in FIGS. 20B, 20C, and 21.

In a case where the operation on the flag setting icon 131 is detected, the staff terminal 1 proceeds to step S232 and updates the event data 60 so that the selection flag is switched on/off as the selection information of the image corresponding to the flag setting icon 131.

In addition, in step S233, the staff terminal 1 transmits the updated flag information to the server device 4, and the event data 90 is updated on the server device 4 side. That is, the synchronization state is maintained.

In step S219, the staff terminal 1 monitors the operation of the all-flag icon 123.

In a case where the operation on the all-flag icon 123 is detected, the staff terminal 1 proceeds to step S234 and branches the processing depending on whether or not the selection flag of all the images is currently on. When some images are in the flag-on state or all the images are in the flag-off state and not all the images are in the flag-on state, the staff terminal 1 proceeds to step S236 and updates the event data 60 so as to set the flag-on state for all the images.

On the other hand, if the all-flag icon 123 is operated when all the images are in the flag-on state, the staff terminal 1 proceeds to step S235 and updates the event data 60 so that all the images are in the flag-off state.

In addition, in step S237, the staff terminal 1 transmits the updated flag information to the server device 4, and the event data 90 is updated on the server device 4 side. That is, the synchronization state is maintained.

In step S220 of FIG. 15, the staff terminal 1 monitors the switching operation to the time view 120. That is a case where, in the display state of the event view 200, an instruction on the display of the time view 120 is given by the operation of the view switching button 202.

In this case, the staff terminal 1 proceeds to step S350 and performs processing of switching to the display of the time view 120.

In step S221, the staff terminal 1 monitors the switching operation to the event view 200. That is a case where, in the display state of the time view 120, an instruction on the display of the event view 200 is given by the operation of the view switching button 202.

In this case, the staff terminal 1 performs the processing from step S351 to step S359. Details of these processes will be described later together with a description of the image transitions regarding the event view 200.

In step S222, the staff terminal 1 monitors the update operation for the scene setting. The scene setting is a setting of division of sub-events and scenes in the event view 200, and the update referred to here is recalculation of the division determination processing. The staff terminal 1 performs processing from step S360 to step S363 in response to the update operation, and this processing will also be described later as processing related to the event view 200.

After the monitoring processing up to step S222 described above, the staff terminal 1 returns to step S211 in FIG. 13 and repeats the monitoring processing.

Next, processing in a case where an image selection operation is detected in step S215 of FIG. 13 will be described.

That is a case where, in the time view 120 or the event view 200, the user performs an operation to select one image in the list.

Figure 16:
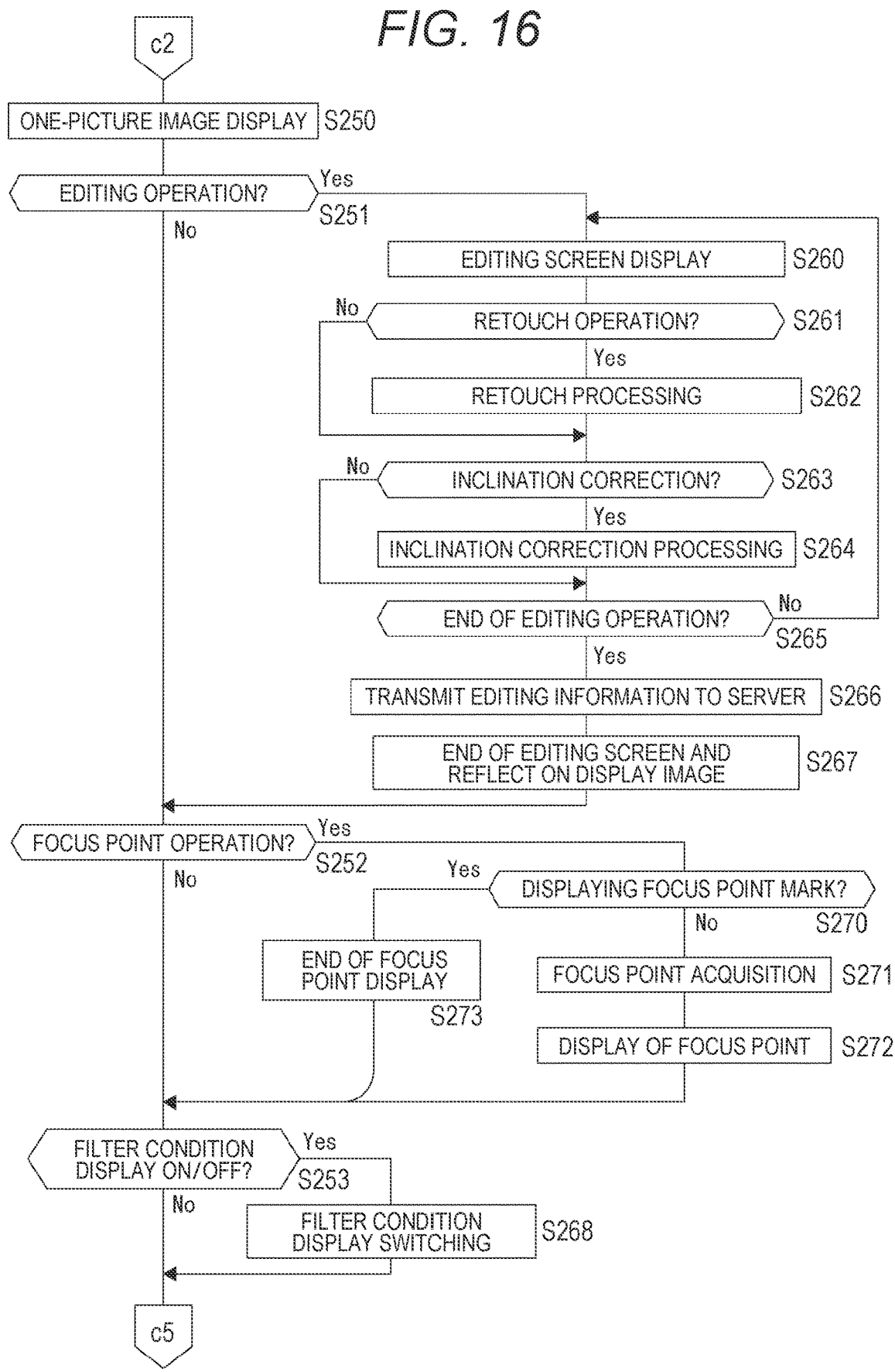
FIG. 16 is a flowchart of selection support processing of the terminal device according to the embodiment.
Figure 24:
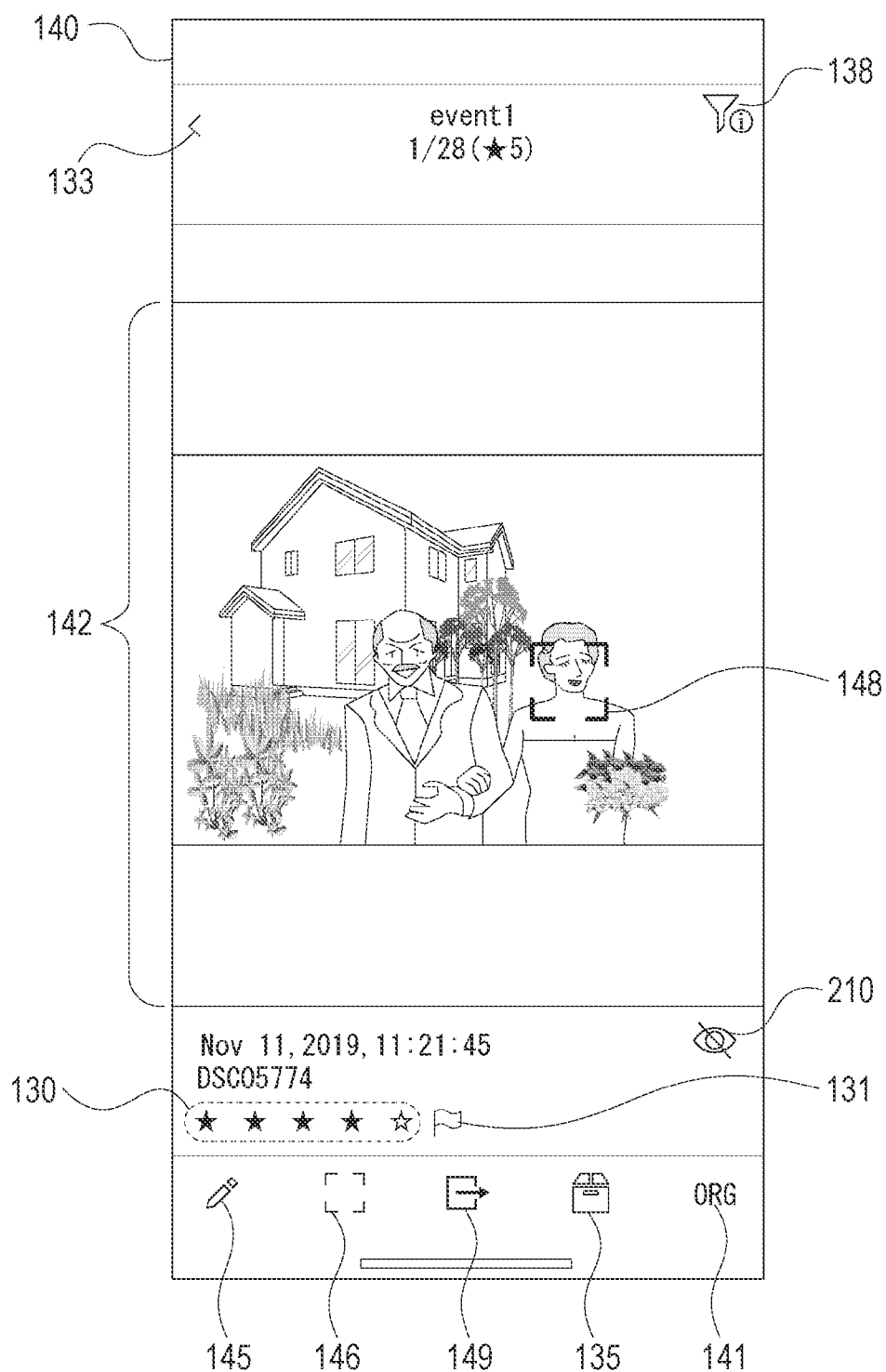
FIG. 24 is an explanatory diagram of a one-picture display screen according to the embodiment.

In this case, the processing of the staff terminal 1 proceeds to step S250 of FIG. 16, and a one-picture display screen 140 as illustrated in FIG. 24 is displayed.

A one-picture display area 142 is provided on the one-picture display screen 140, and the selected image is displayed in a large size.

The image displayed in the one-picture display area 142 is, for example, an image based on edited image data managed by the event data 60. That is, it is a reproduced image of the edited image data generated by the auto retouch application processing in step S107 in FIG. 11, in which the retouch parameter in the presetting information 61 is reflected.

In addition, a focus point mark 148 indicating a focus position in the image may be displayed on the image.

In addition, a return icon 133 which is an operator for returning the display to the time view 120 or the event view 200, a filter condition icon 138 for displaying the filter condition, a rating icon 130 for the displayed image, and a flag setting icon 131 are displayed on the one-picture display screen 140.

In addition, in a case where the eye closure state of the image is indicated by the eye closure information, an eye closure icon 210 is displayed.

Further, on the one-picture display screen 140, an edit icon 145, a focus point operation icon 146, an export icon 149, an archive icon 135, and an original icon 141 for operation related to the displayed image are displayed.

Figure 17:
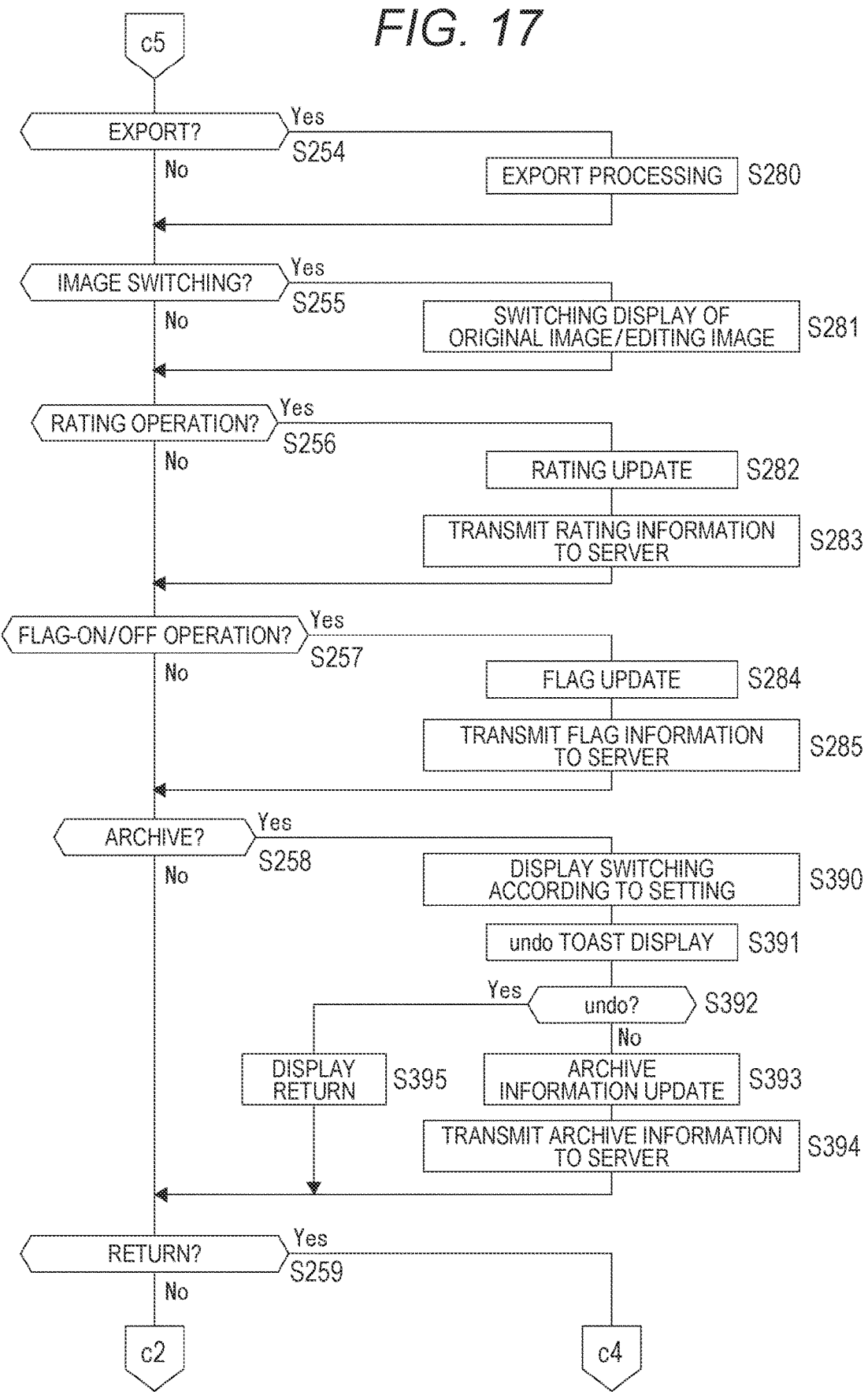
FIG. 17 is a flowchart of selection support processing of the terminal device according to the embodiment.

In a state where such a one-picture display screen 140 is displayed, the staff terminal 1 performs the monitoring loop processing from step S251 to step S259 in FIGS. 16 and 17.

In step S251, the staff terminal 1 monitors the operation of the edit icon 145.

In a case where the operation of the operator of the edit icon 145 is detected, the staff terminal 1 proceeds to step S260 and displays an editing screen (not illustrated). On the editing screen, for example, a user interface capable of retouch operation and inclination correction operation is prepared, and the camera staff can perform image editing operation through the user interface.

As the retouch operation, for example, a luminance adjustment value, a color adjustment value, a contrast adjustment value, a sharpness adjustment value, and the like can be set as retouch parameters.

As the inclination correction operation, for example, an operator for adjusting the angle of the image is prepared.

Note that the editing screen may be a screen different from the one-picture display screen 140, or may be a screen superimposed on the one-picture display screen 140 to display various operators.

In a case where the staff terminal 1 detects the retouch operation, the process proceeds from step S261 to step S262, and the staff terminal 1 performs the retouch processing. This is processing of further editing the edited image data by the retouch parameter input by the operation of the camera staff. In addition, the retouch parameter input in this case is stored in the event data 60 as editing information for individual image data.

In a case where the staff terminal 1 has detected the inclination correction operation, the process proceeds from step S263 to step S264, and the staff terminal 1 performs the inclination correction processing of the image. This is processing of editing the edited image data by the inclination correction parameter input by the operation of the camera staff. In addition, the inclination correction parameter input in this case is stored in the event data 60 as editing information for individual image data.

When the end of the editing operation is detected in step S265, the staff terminal 1 transmits the editing information of the event data 60 updated in accordance with the editing processing to the server device 4 in step S266, and the event data 90 is updated on the server device 4 side. That is, the synchronization state is maintained.

In step S267, the staff terminal 1 ends the editing screen and returns to the normal one-picture display screen 140. The image displayed at this time reflects the editing result.

In this manner, the camera staff can perform retouch and inclination correction of an arbitrary image by the operation from the edit icon 145.

In the display state of the one-picture display screen 140, the staff terminal 1 monitors the operation of the focus point operation icon 146 in step S252.

In a case where the operation of the focus point operation icon 146 is detected, the staff terminal 1 proceeds to step S270 and branches the processing depending on whether or not the focus point mark 148 is currently displayed on the image in the one-picture display area 142.

If the focus point mark 148 is not currently displayed, the staff terminal 1 proceeds to step S271 and acquires focus point information on the image being displayed. The focus point is information indicating a position at which the imaging device 2 is brought into focus in an image at the time of imaging, and is described in metadata. For example, the focus point is described by coordinate information of one point in the image.

The staff terminal 1 acquires focus point information from the metadata of the displayed image, and displays a focus point mark 148 on the displayed image according to the information as illustrated in FIG. 24. For example, the focus point mark 148 is displayed as an area having a predetermined spread around coordinate information of one point in an image stored as a focus point. As a result, the user can confirm the subject in focus at the time of imaging.

Note that the display mode of the focus point mark 148 is a mark (square expressed by parentheses) displaying four corners in FIG. 24, but may be another display mode such as a square frame, a circular frame, or the like. In addition, a plurality of focus point marks 148 may be displayed.

In addition, as illustrated in FIG. 24, the focus point mark 148 is displayed on the one-picture display screen, but for example, the focus point mark 148 may be displayed on an image displayed in a list in the image area 128 of the time view 120 or the event view 200.

In a case where the operation of the focus point operation icon 146 is detected in step S252 while the focus point mark 148 is displayed, the staff terminal 1 proceeds from step S270 to step S273 and ends the display of the focus point mark 148.

Therefore, the camera staff can turn on/off the display of the focus point mark 148 by the focus point operation icon 146.

In step S253, the staff terminal 1 monitors on/off operation of the filter condition display. That is, an operation on the filter condition icon 138 is monitored. In this case, the staff terminal 1 proceeds to step S268 and controls the display related to the setting of the filter condition as described later with reference to FIG. 33.

The staff terminal 1 monitors the operation of the export icon 149 in step S254 of FIG. 17 in the display state of the one-picture display screen 140.

In a case where the operation of the export icon 149 is detected, the staff terminal 1 proceeds to step S280 and performs the export processing. That is, the export processing is performed on the information regarding the displayed image data.

In step S255, the staff terminal 1 monitors the image switching operation. The image switching operation in this case is an operation of the original icon 141.

In a case where the operation of the original icon 141 is detected, the staff terminal 1 proceeds to step S281 and switches between the image based on the original image data and the image based on the edited image data. That is, if the reproduced image based on the edited image data is displayed at that time, the reproduced image based on the original image data is displayed. In addition, if the reproduced image based on the original image data is displayed at that time, the reproduced image based on the edited image data is displayed.

Therefore, the camera staff can arbitrarily compare the edited image with the original image by operating the original icon 141.

On the one-picture display screen 140, the rating icon 130 for the image being displayed is displayed.

In step S256, the staff terminal 1 monitors the rating operation.

In a case where the operation on the rating icon 130 is detected, the staff terminal 1 proceeds to step S282 and updates the event data 60 so that the rating information of the displayed image has a value corresponding to the operation.

In addition, in step S283, the staff terminal 1 transmits the updated rating information to the server device 4, and the event data 90 is updated on the server device 4 side. That is, the synchronization state is maintained.

On the one-picture display screen 140, the flag setting icon 131 for the image being displayed is displayed.

In step S257, the staff terminal 1 monitors the flag-on/off operation, that is, the operation of the flag setting icon 131.

In a case where the operation on the flag setting icon 131 is detected, the staff terminal 1 proceeds to step S284 and updates the event data 60 so that on/off of the flag in the selection information of the displayed image is switched.

In addition, in step S285, the staff terminal 1 transmits the updated flag information to the server device 4, and the event data 90 is updated on the server device 4 side. That is, the synchronization state is maintained.

In step S258, the staff terminal 1 monitors the archive operation on the image. In a case where the archive operation is detected, the staff terminal 1 performs processing from step S390 to step S395. The processing related to archive will be described later.

In step S259, the staff terminal 1 monitors the operation of the return icon 133.

When detecting the operation of the return icon 133, the staff terminal 1 proceeds to step S211 in FIG. 13, ends the one-picture display screen 140, and returns to a state in which the time view 120 or the event view 200 is displayed.

Note that, although not illustrated in the flowchart, for example, on the one-picture display screen 140, it is also possible to switch the image to a previous image or a subsequent image by a swipe operation in the left-right direction.

[5-2 Filter Processing Based on Archive and Eye Closure]

Here, the processing related to archive, the processing according to the eye closure information, and the filter processing using them described above will be described in detail.

First, the archive operation detected by the staff terminal 1 in step S258 in FIG. 17 will be described.

FIG. 25A illustrates an example of an archive operation on the one-picture display screen 140.

One is an operation of an archive icon 135.

The other is a swipe operation to the screen upper side with respect to the image indicated by an arrow UP.

The user can set an archive of the displayed image on the one-picture display screen 140 by, for example, these two operations.

Note that, in the present embodiment, as described above, the archive operation can be performed on the one-picture display screen 140, and the archive operation cannot be performed on the list display of the time view 120 or the event view 200. However, when one image is displayed in a large size as illustrated in FIG. 20C in the time view 120, the archive icon 135 may be displayed to enable an archive operation.

In a case where the staff terminal 1 detects the archive operation in step S258 of FIG. 17, the process proceeds to step S390, and the display is switched according to the display setting at that time. The display setting in this case is a setting as to whether or not to display archived images. This can be selected by the filtering setting.

In the case of the setting to display the archived images, the image is not switched according to the archive operation of FIG. 26A as illustrated in FIG. 26B.

In this case, the display color of the archive icon 135 is changed to present that the displayed image is archived. Therefore, on the one-picture display screen 140, the archive icon 135 also has a function of indicating whether or not the image being displayed is archived.

In the case of the setting not to display the archived images, the image is immediately switched to another image as illustrated in FIG. 27B in response to the archive operation in FIG. 27A. The image to be switched is the next image in chronological order. In a case where there is no next image, the previous image in chronological order is set. In addition, in a case where there is no image that can be displayed, it is notified that there is no image to be displayed as illustrated in FIG. 27C.

As in the above example, the staff terminal 1 switches the image according to the display setting in step S390, and performs the toast display for a predetermined time (for example, about 5 seconds) for undo on the screen in step S391. FIG. 25B illustrates an example of the toast display 220.

In the toast display 220, a notification of archiving is provided, and an operation of "restore" is enabled.

If the user does not perform an operation of "restore", that is, undo operation, the staff terminal 1 proceeds from step S392 to step S393 in FIG. 17 and updates the archive information. That is, the staff terminal 1 updates the archive information of the event data 60 so that the displayed image is set to be archived.

In addition, in step S394, the staff terminal 1 transmits the updated archive information to the server device 4, and the event data 90 is updated on the server device 4 side. That is, the synchronization state is maintained.

On the other hand, in a case where the user selects the "restore" operation, that is, undo for the toast display 220 in step S391, the staff terminal 1 proceeds from step S392 to step S395 in FIG. 17 and restore the display. That is, in a case where the display is switched as illustrated in FIG. 27B in step S390, the display is returned to the state of FIG. 27A. In addition, in a case where archive icon 135 is changed as illustrated in FIG. 26B, the state returns to the state shown in FIG. 26A.

Then, the process proceeds to step S259. That is, in this case, the archive setting processing in steps S393 and S394 is not performed.

Note that, as a processing example, it is also conceivable to perform update of the archive information in steps S393 and S394 while performing the toast display 220, and to return the archive information to the original state if the undo operation is performed.

By enabling archiving of images as described above, the camera staff can archive images that are not required to be displayed, thereby reducing the number of images to be displayed in a list or individually, in accordance with filtering to be described next. This can reduce the population parameter of selection tasks and improve the efficiency of the selection.

In particular, an image that is determined not to be adopted for image collection immediately by the camera staff is archived, which is suitable for improving selection efficiency.

Furthermore, the image with the selection flag turned on is archived so as not to be displayed in accordance with the filter processing, whereby the population parameter of images at the time of selection can be reduced. Since the archive information is treated as information separate from the selection information in the event data 60, archiving does not affect the selection flag.

Note that it is also possible to unarchive the image that has been archived once.

For example, when the archive icon 135 indicating that the image is archived by a color change is operated, the image is unarchived.

As the processing of the staff terminal 1, regarding the archive operation detected in step S258, in the case of the archive cancellation (that is, in the case of the archive operation on the archived image), a dialog for the archive cancellation is displayed in step S390, the archive cancellation is updated in step S393, and the processing in step S394 is performed accordingly.

The eye closure information will also be mentioned.

As described in step S104 of FIG. 11, the staff terminal 1 performs the eye closure determination on the image received from the imaging device 2 and sets the eye closure information. Then, as described above, in the time view 120, the event view 200, and the one-picture display screen 140, the eye closure icon 210 is displayed for the image in which the subject person is in the eye closure state on the basis of the eye closure information.

By combining the eye closure information and the filtering, the number of images to be displayed in the list or individually can be reduced, and the population parameter of selection tasks can be reduced to improve the efficiency of the selection.

Furthermore, since the eye closure information is treated as information separate from the selection information in the event data 60, the eye closure information does not affect the selection flag. In other words, even an image determined to be in the eye closure state can be adopted for image collection with the selection flag turned on.

Filtering using the above eye closure information and archive information will be described.

As described above, in the time view 120 and the event view 200, the filter operation icon 136 is displayed.

FIG. 28A illustrates a state in which the filter operation icon 136 is operated. With this operation, the processing of the staff terminal 1 proceeds from step S216 to step S242 in FIG. 13, sets the filter condition according to the operation, and performs filtering and display change according to the filtering as follows.

First, a display example for filter condition setting is illustrated in FIG. 28B. A filter condition setting unit 221 is displayed on the screen and can be operated by the user.

In the filter condition setting unit 221, a close button 222, a camera condition button 223, an archive condition button 224, an eye closure condition switch 225, and information buttons 226, 227 are prepared.

The eye closure condition switch 225 is a switch for selecting whether or not to display the eye closure images, and the user can arbitrarily select display on/off of the eye closure images.

When the archive condition button 224 is operated, an archive condition setting unit 230 is displayed as illustrated in FIG. 28D, and the user can select an archive condition.

For example, check boxes 232 for "display archive images" and "display non-archive images" are prepared.

In addition, the number of archive images (80) and the number of non-archive images (123) are also displayed.

This allows the user to select to:
display only archive images;
display only non-archive images; or
display archive images and non-archive images.

Note that, instead of the display of the archive condition button 224 (and the archive condition setting unit 230 corresponding thereto) described above, an archive condition switch may be provided similarly to the eye closure condition switch 225 so that the on/off of the filter condition of the archive image can be simply selected. In that case, it is conceivable that the selectable condition is any one of:
display only non-archive images; or
display archive images and non-archive images.

When the camera condition button 223 is operated, the camera condition setting unit 235 is displayed as illustrated in FIG. 28C, and the user can select the camera condition.

The camera condition is a condition for designating the imaged imaging device 2. Model information and a serial number of the imaging device 2 are added to each image in metadata. In the camera condition setting unit 235, information of the imaging device and a check box 232 are displayed for all images of the event to be processed. For example, in this case, the model name and the serial number are displayed. For the imaging device 2 whose serial number is unknown, only the model name is displayed.

In addition, the number of images is also displayed for each imaging device 2. For example, in this drawing, the number of images is displayed as "80", "123", and "333".

In this example, three imaging devices 2 are displayed, but in a case where three or more imaging devices 2 are present, the imaging devices 2 are displayed by a scroll operation.

The user can specify the imaged imaging device 2 by checking the check box 232 and set the filter condition so as to display the images of the imaging device 2.

Every time a condition is changed by any one of the filter condition setting unit 221, the camera condition setting unit 235, and the archive condition setting unit 230, the staff terminal 1 performs filtering under a new condition, and performs image display and other display changes as a result.

That is, as the processing in step S242 in FIG. 13, filtering is performed on the basis of condition settings in the eye closure condition switch 225, the archive condition setting unit 230, and the camera condition setting unit 235 at that time. Then, extracted images as filtering results are displayed in a list in the image area 128.

Note that, when the return icon 228 is operated in the camera condition setting unit 235 of FIG. 28C and the archive condition setting unit 230 of FIG. 28D, the display returns to the display of the filter condition setting unit 221 of FIG. 28B.

In addition, when the close button 222 is operated in any one of FIGS. 28B, 28C, and 28D, the filter condition setting unit 221, the camera condition setting unit 235, or the archive condition setting unit 230 is closed, and the state returns to the state of FIG. 28A. This is a case where it is determined in step S243 of FIG. 13 that the change of the filter setting is ended, and the process returns to the monitoring loop. Note that, in addition to the close button 222, in a case where an area other than the area of the filter condition setting unit 221, the camera condition setting unit 235, or the archive condition setting unit 230 is tapped on the screen, it is also possible to similarly end the filter setting change and return from step S243 to the monitoring loop.

The display change according to the filtering is performed on not only the displayed images but also the display mode of the filter operation icon 136 and the number of images.

FIG. 29A illustrates a state before filtering is performed, and FIG. 29B illustrates a state after filtering is performed. For example, it is assumed that the display of the eye closure images is turned off by the eye closure condition switch 225, and the images displayed in the list in the image area 128 include the eye closure images in FIG. 29A, but the eye closure images are not displayed in FIG. 29B.

In addition, the color of the filter operation icon 136 is changed in the state of FIG. 29B where filtering has been performed. Therefore, it presents that it is the list display after filtering.

In addition, the number of images displayed in the all tab 125 is changed from "2065" to "2010". This represents a decrease in the number of images in response to the fact that the eye closure images are no longer displayed by filtering.

Note that the display of the number of images is changed immediately when the filter condition is changed.

In FIG. 30A, all the three imaging devices 2 are selected by the camera condition setting unit 235, the number of images of each imaging device 2 is "100", "1000", and "1065", and the number of images displayed in the all tab 125, that is, the total number is "2165".

A state in which the user unchecks the first imaging device 2 from this state is illustrated in FIG. 30B, and the number of images displayed in the all tab 125 becomes "2065" in response to the 100 images being hidden by the filtering.

In a case where the information button 226 is tapped as illustrated in FIG. 31A, the guidance display in FIG. 31B is performed. Here, a setting guide in the imaging device 2 for performing filtering for each model is displayed.

In a case where the information button 227 is tapped as illustrated in FIG. 32A, the guidance display in FIG. 32B is performed. Here, it is displayed that image archiving can be executed on the one-picture display screen 140.

The guidance display in FIGS. 31B and 32B is closed by an OK operation.

Each processing such as filter condition setting, filtering, display change, guidance display, and the like described above is performed in step S242 in FIG. 13.

According to this filtering, display of the archived image, the eye closure image, and the image for each model of the imaging device 2 can be turned on/off. This makes selection by the user efficient.

Note that the filter processing merely sets whether to display on the screen. The non-display due to the filter processing does not affect the adoption/rejection to the image collection. That is, it does not affect the setting of the selection flag.

The non-display of the image by the filtering is also effective when the candidate tab 126 is displayed, that is, even when the selection flag is turned on, there may be images that are not displayed in the candidate tab 126. This can be used to reduce the population parameter in a case of reviewing ones whose selection flag is turned on once in the candidate tab 126 or the like.

For example, if the transition from the candidate tab 126 to the one-picture display screen 140 is made, the images to be delivered are archived, and then the archive images are hidden in the candidate tab 126, the population parameter of selection can be reduced when an image whose selection flag is to be removed is selected.

Meanwhile, when the images extracted under the selected filter condition are displayed, it is desirable to clearly indicate to the user that not all the images are displayed. Therefore, the display mode of the filter operation icon 136 is changed as illustrated in FIG. 29B. For example, the color is changed. Therefore, even if the user selects the all tab 125, the user can recognize that the images are not all images.

Meanwhile, in the case of the one-picture display screen 140, it is convenient to know the current filter condition. Therefore, on the one-picture display screen 140, as illustrated in FIG. 33A, the filtering condition display in FIG. 33B is performed by operating the filter condition icon 138. That is, a rating condition, a model condition of the imaging device, a setting state for displaying the archive images/non-archive images, and the eye closure images are illustrated. This is the processing of steps S253 and S268 of FIG. 16.

When the current filtering condition is indicated, it is possible to recognize what kind of condition the current image corresponds to and is displayed.

Note that the OK operation performed in the filtering condition display in FIG. 33B corresponds to the OFF operation of the filtering condition display in step S253 in FIG. 16. In this case, in step S268, the filter condition display in FIG. 33B is ended.

[5-3 Cover and Highlight Selection]

Next, processing in a case where the operation of the next icon 132 is detected in step S212 of FIG. 13 will be described.

Figure 18:
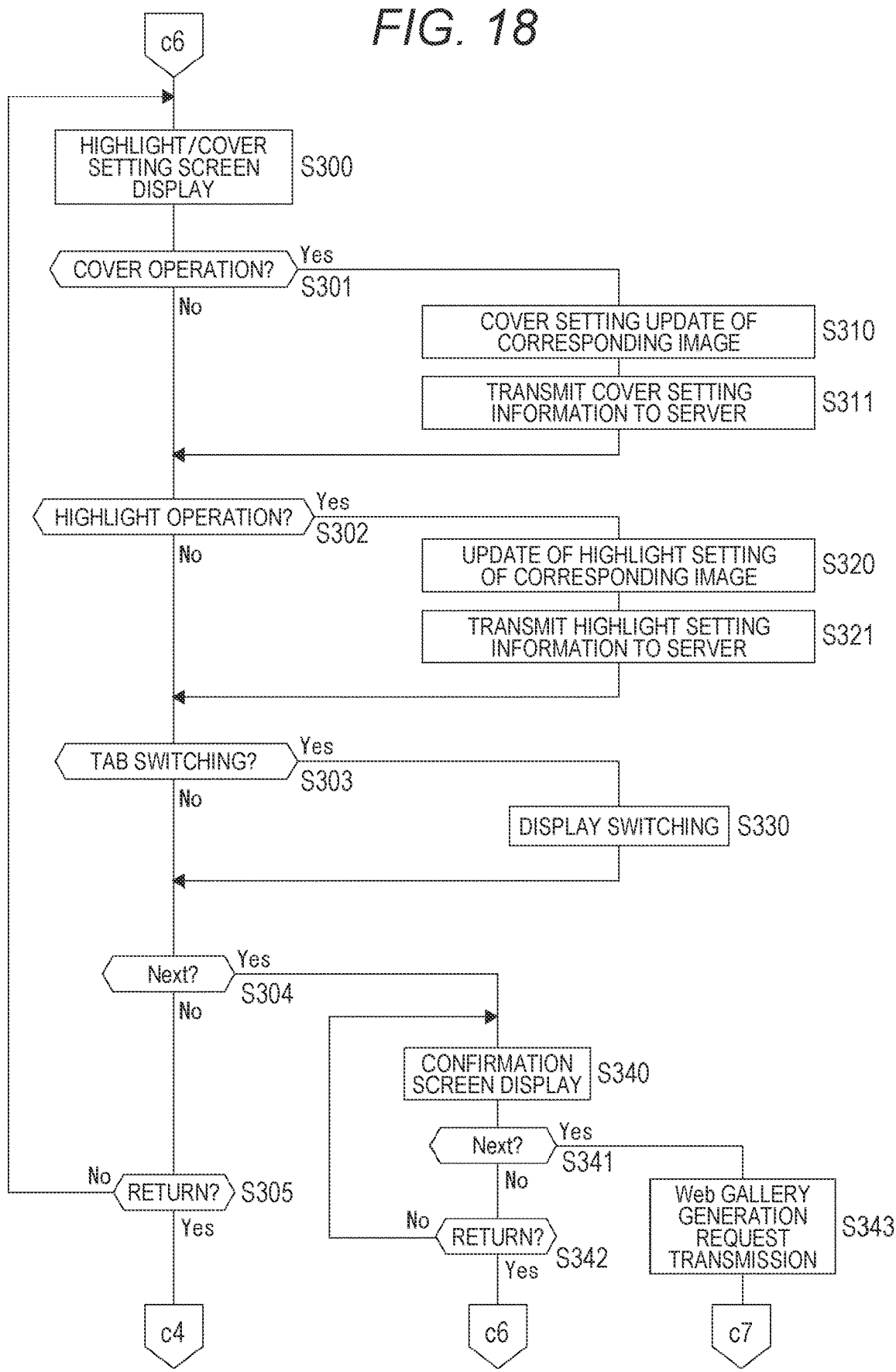
FIG. 18 is a flowchart of selection support processing of the terminal device according to the embodiment.
Figure 34:
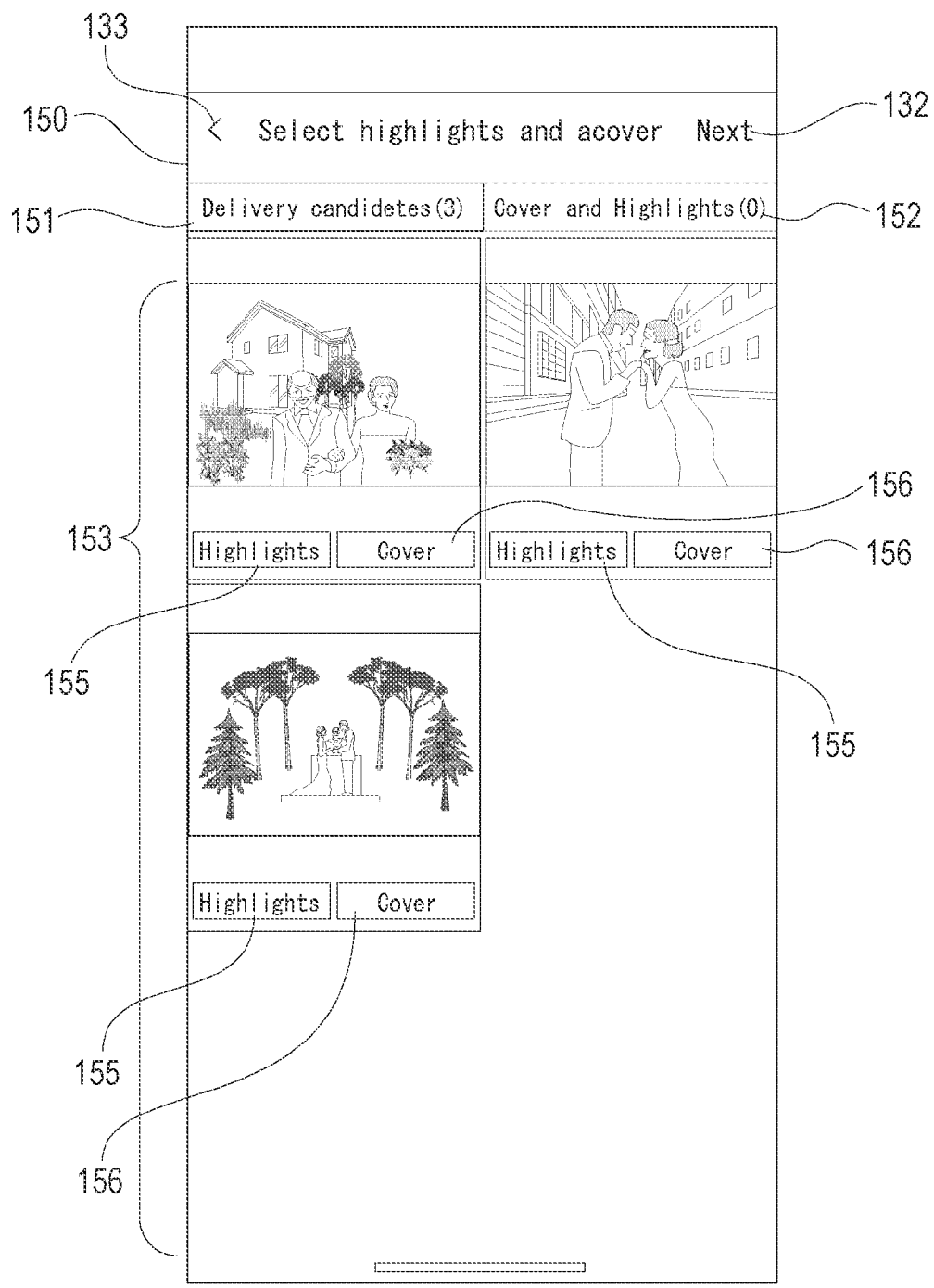
FIG. 34 is an explanatory diagram of a cover/highlight selection screen according to the embodiment.

In this case, the processing of the staff terminal 1 proceeds to step S300 of FIG. 18, and the cover/highlight selection screen 150 as illustrated in FIG. 34 is displayed.

The cover/highlight selection screen 150 is a screen for the camera staff to perform an operation of selecting images to be a cover (front cover) or images to be highlighted (emphasized) in the web gallery.

On the cover/highlight selection screen 150, a return icon 133 and a next icon 132 are displayed.

In addition, a list designation area 153 is provided on the cover/highlight selection screen 150, and a candidate tab 151 and a selection tab 152 are prepared.

When the candidate tab 151 is selected, the list designation area 153 displays a list of the images that are selected as the flag-on images (that is, the images selected as the images to be used in the web gallery).

In addition, a highlight button 155 and a cover button 156 are displayed for each image. The highlight button 155 is an operator for designating an image as a highlight, and the cover button 156 is an operator for designating an image as a cover.

Note that the highlight button 155 may also express the presence or absence of the current highlight setting according to the display mode, and the cover button 156 may express the current cover setting state according to the display mode.

When the selection tab 152 is selected, images for which cover designation or highlight designation has been made are listed in the list designation area 153.

The camera staff operates such a cover/highlight selection screen 150 to select images to be used as a cover or images to be highlighted.

In a state where the cover/highlight selection screen 150 is displayed in step S300 of FIG. 18, the staff terminal 1 performs the monitoring loop processing from step S301 to step S305.

In step S301, the staff terminal 1 monitors the operation of the cover button 156.

In a case where the operation on the cover button 156 is detected, the staff terminal 1 proceeds to step S310, sets the front cover image information in the selection information so as to set the corresponding image as the cover image, and updates the event data 60.

In addition, in step S311, the staff terminal 1 transmits the updated selection information to the server device 4, and the event data 90 is updated on the server device 4 side. That is, the synchronization state is maintained.

In step S302, the staff terminal 1 monitors the operation of the highlight button 155.

In a case where the operation on the highlight button 155 is detected, the staff terminal 1 proceeds to step S320, sets the emphasized display image information in the selection information so as to set the corresponding image as a highlight image, and updates the event data 60.

In addition, in step S321, the staff terminal 1 transmits the updated selection information to the server device 4, and the event data 90 is updated on the server device 4 side. That is, the synchronization state is maintained.

In step S303, the staff terminal 1 monitors the tab switching operation. The tab switching operation in this case is an operation of the selection tab 152 displayed during the list display of the candidate tab 151 or an operation of the candidate tab 151 displayed during the list display of selection tab 152.

When detecting the tab switching operation, the staff terminal 1 performs processing of switching the list display content in the list designation area 153 according to the selected tab in step S330.

In step S305, the staff terminal 1 monitors the operation of the return icon 133. When detecting the operation of the return icon 133, the staff terminal 1 proceeds to step S211 of FIG. 13 and returns to the display state of the time view 120 or the event view 200.

As a result, the camera staff can interrupt the cover/highlight designation or redo the selection from the flag setting.

When the operation on the cover/highlight selection screen 150 is completed, the camera staff operates the next icon 132.

In step S304 of FIG. 18, the staff terminal 1 monitors the operation of the next icon 132. When detecting the operation of the next icon 132, the staff terminal 1 proceeds to step S340 and displays a confirmation screen.

Figure 35:
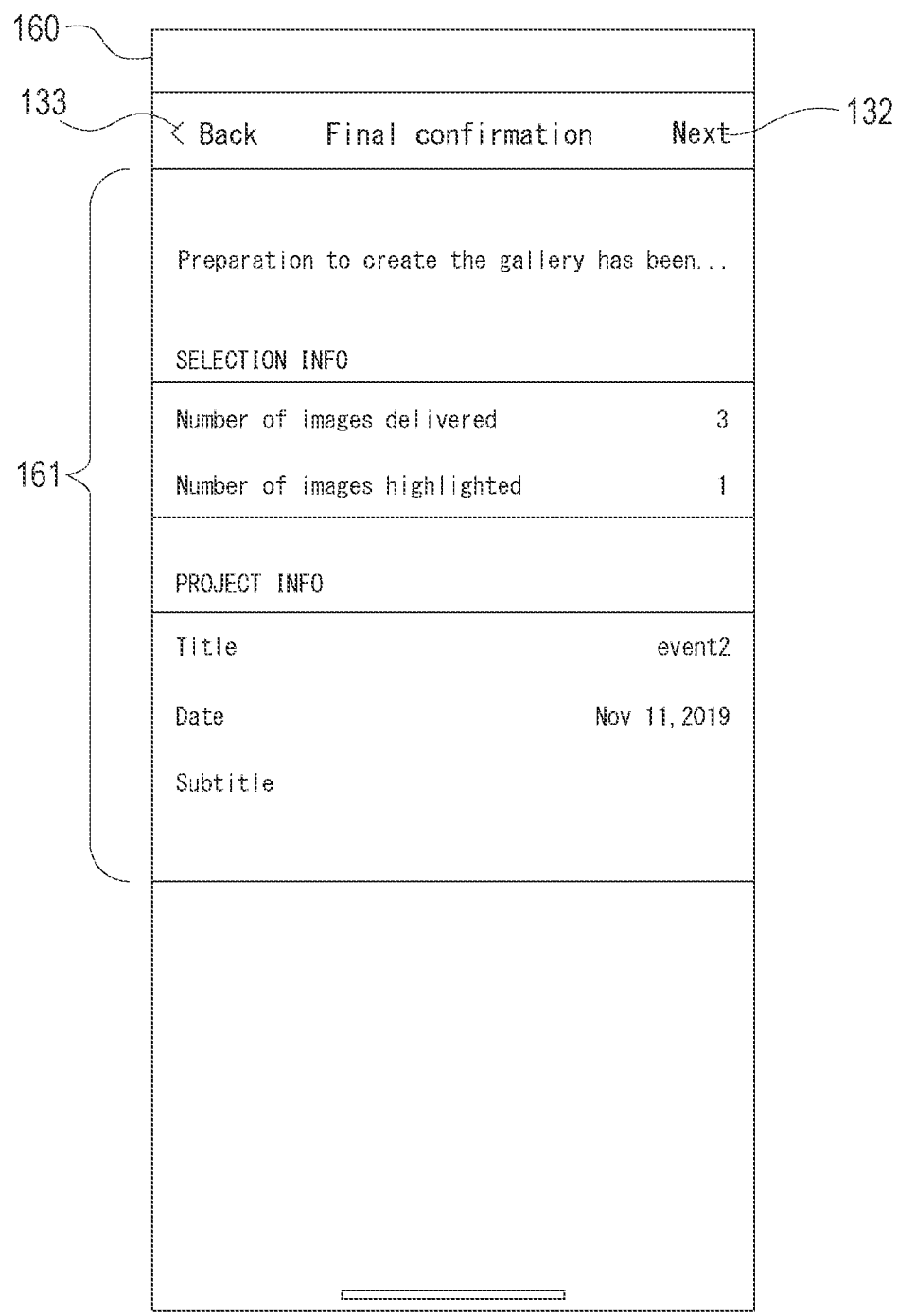
FIG. 35 is an explanatory diagram of a confirmation screen according to the embodiment.

FIG. 35 illustrates an example of the confirmation screen 160. On the confirmation screen 160, a return icon 133 and a next icon 132 are prepared, a detail area 161 is prepared, and the final confirmation content is displayed. For example, detailed information such as the number of flagged images to be adopted for the web gallery, the number of images to be highlighted, a title, a date, and the like is displayed.

The staff terminal 1 monitors the operation of the next icon 132 in step S341 of FIG. 18 and monitors the operation of the return icon 133 in step S342.

When detecting the operation of the return icon 133, the staff terminal 1 returns to step S300 and returns to the display state of the cover/highlight selection screen 150.

When detecting the operation of the next icon 132, the staff terminal 1 proceeds to step S343 and transmits a web gallery generation request to the server device 4.

Then, the process proceeds to step S201 in FIG. 12, and returns to the display state of the project list screen 110. Note that, in this case, the processing may proceed to step S211 in FIG. 13 and return to the time view 120 or the event view 200.

<6. Server Processing>

Although the processing of the staff terminal 1 up to the selection stage of step S3 in FIG. 2 has been described above, the processing on the server device 4 side will be described here.

Figure 36:
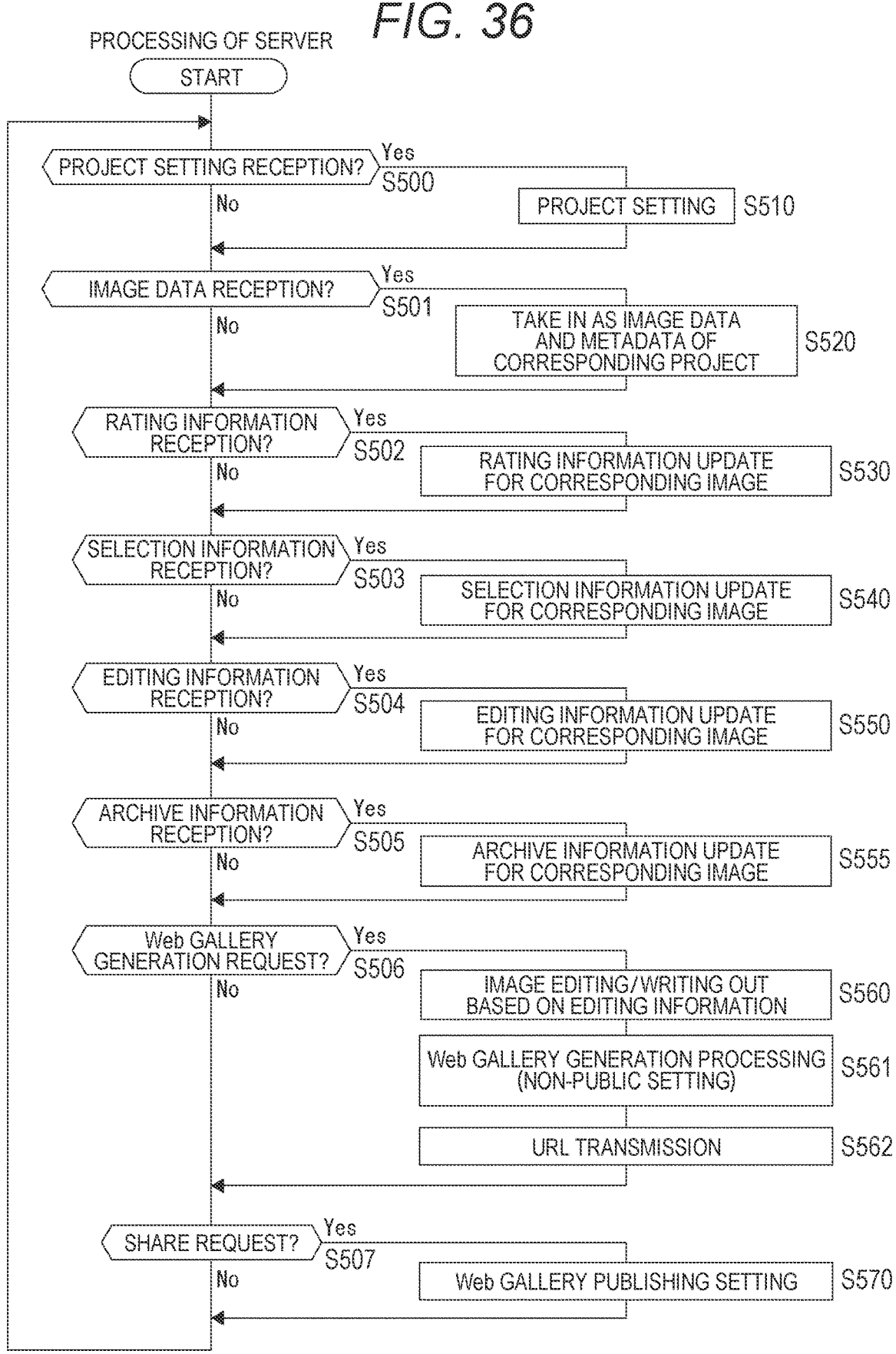
FIG. 36 is a flowchart of processing of the server device according to the embodiment.

FIG. 36 illustrates processing of the server device 4 corresponding to communication from the staff terminal 1. Note that the processing of the server device 4 described below is processing performed by the CPU 71 of the information processing device 70 having the function of FIG. 6. In FIG. 36, processing is mainly executed by the functions of the event data management unit 40 and the image collection generation unit 41.

At the stage of step S1 in FIG. 2, presetting information is transmitted from the staff terminal 1 to the server device 4.

After receiving the information regarding the project setting from the staff terminal 1, the server device 4 proceeds from step S500 to step S510, and performs the project setting processing in the server device 4.

The project setting communication from the staff terminal 1 is communication performed by the staff terminal 1 to the server in the processing from step S10 to step S13 in FIG. 9. For example, information such as an event name, a date and time, a place, and the like of the created project is transmitted. The server device 4 sets a new project on the basis of these pieces of information, and sets the event data 90.

In addition, on the staff terminal 1 side, not only setting of the project itself but also auto retouch setting, watermark setting, and the like are performed, and sequential setting information is transmitted to the server device 4. The server device 4 describes these pieces of information as the presetting information 91 of the event data 90, thereby synchronizing the event data 90 with the event data 60 in the presetting state.

At the stage of step S2 in FIG. 2, the metadata including the images and the rating information, the eye closure information, and the like transferred from the imaging device 2 are transmitted to the server device 4 by the processing of step S105 in FIG. 11 of the staff terminal 1.

After receiving the images and the metadata from the staff terminal 1, the server device 4 proceeds from step S501 to step S520 in FIG. 36, and takes in the images and the metadata as information of the event data 90 of the corresponding project. Rating information in the metadata is extracted from the metadata and managed in an updatable state thereafter in the event data 90.

At the stage of step S3 of FIG. 2, in the process of the processing of FIGS. 12 to 18 of the staff terminal 1, various types of information for maintaining synchronization with the imaging device 2 are transmitted from the staff terminal 1 to the server device 4.

After receiving the rating information from the staff terminal 1, the server device 4 proceeds from step S502 to step S530 in FIG. 36, and updates the rating information for the corresponding image in the event data 90 of the corresponding project.

After receiving the selection information from the staff terminal 1, the server device 4 proceeds from step S503 to step S540, and updates the selection information for the corresponding image in the event data 90 of the corresponding project.

That is, updating of the used image information by flag setting, the front cover image information as a cover, the emphasized display image information by highlight setting, and the like is sequentially performed on the server device 4 side.

After receiving the editing information from the staff terminal 1, the server device 4 proceeds from step S504 to step S550, and updates the editing information for the corresponding image in the event data 90 of the corresponding project.

After receiving the archive information from the staff terminal 1, the server device 4 proceeds from step S505 to step S555, and updates the archive information on the corresponding image in the event data 90 of the corresponding project.

After receiving the web gallery editing information from the staff terminal 1, the server device 4 proceeds from step S506 to step S560. This is information transmitted by the staff terminal 1 in step S343 of FIG. 18.

In step S560 of FIG. 36, the server device 4 first performs image editing processing using the parameter as the editing information (including the editing information by the presetting information 61) on each image that is set as the flag-on image as the used image information, and writes out the image as an image for the web gallery. That is, each edited image stored in the image folder 97 of FIG. 8 is generated.

In step S561 of FIG. 36, the server device 4 performs web gallery generation processing. That is, for example, the web page setting information 96 of FIG. 8 as HTML data or the like is generated, and entry is performed as a web page. This forms a web gallery.

In step S562 of FIG. 36, the server device 4 transmits a uniform resource locator (URL) of the web gallery to the staff terminal 1. As a result, the staff terminal 1 can browse the web gallery.

Note that, at this time, the web gallery is still set to be non-public, and only the staff terminal 1 of the URL transmission destination can browse.

The processing of the server device 4 corresponding to the processing of the staff terminal 1 up to step S3 in FIG. 2 has been described above.

Note that, although not illustrated in FIG. 36, processing of providing the event data 90 to the staff terminal 1 logged in to the server device 4 is performed as necessary (see the description of step S201 in FIG. 12).

After the web gallery is generated, as the stage of step S4 in FIG. 2, a share request is transmitted from the staff terminal 1 to the server device 4 (described later with reference to FIG. 37).

In this case, the staff terminal 1 proceeds from step S507 to step S570 in FIG. 36, and sets the corresponding web gallery as a publishing setting. For example, it can also be browsed from the client terminal 5.

<7. Web Gallery Delivery Processing>

The processing of the staff terminal 1 at the stage of the web gallery delivery processing in step S4 of FIG. 2 will be described with reference to FIG. 37.

When the web gallery generation request is transmitted to the server device 4 as described above, the web gallery is generated on the basis of the event data 90 in the server device 4, and the URL of the web page is transmitted. FIG. 37 illustrates processing of the staff terminal 1 after the URL is acquired.

The staff terminal 1 accesses the web page using the URL acquired in step S370. As a result, a preview of the web gallery can be browsed on the staff terminal 1.

Figure 38:
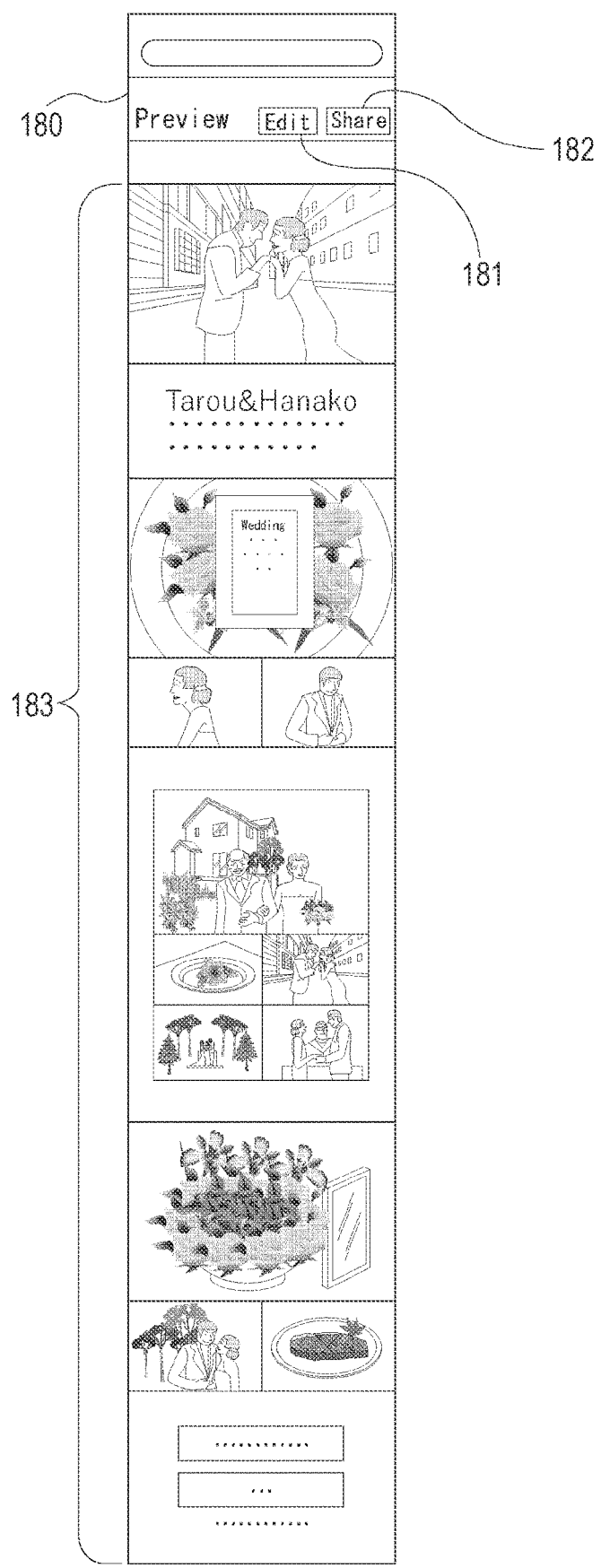
FIG. 38 is an explanatory diagram of a preview screen of a web gallery according to the embodiment.

This is a browsing for the camera staff to preview for confirmation, and the web gallery for the preview is, for example, a preview screen 180 in FIG. 38.

For example, a created web gallery is displayed in a preview area 183, and an edit button 181 and a share button 182 are prepared.

The web gallery content displayed in the preview area 183, that is, the web gallery created by the server device 4 has a configuration in which images with flags set to ON are arranged in chronological order, for example. In addition, an image to which the front cover image information is set is displayed on the top as a front cover. In addition, the images highlighted by the emphasized display image information are displayed in a larger size than the images not highlighted. Note that even an image for which highlight setting has not been performed may be automatically arranged in a large size. This is done to give balance and sharpness to the gallery as a whole.

Figure 37:
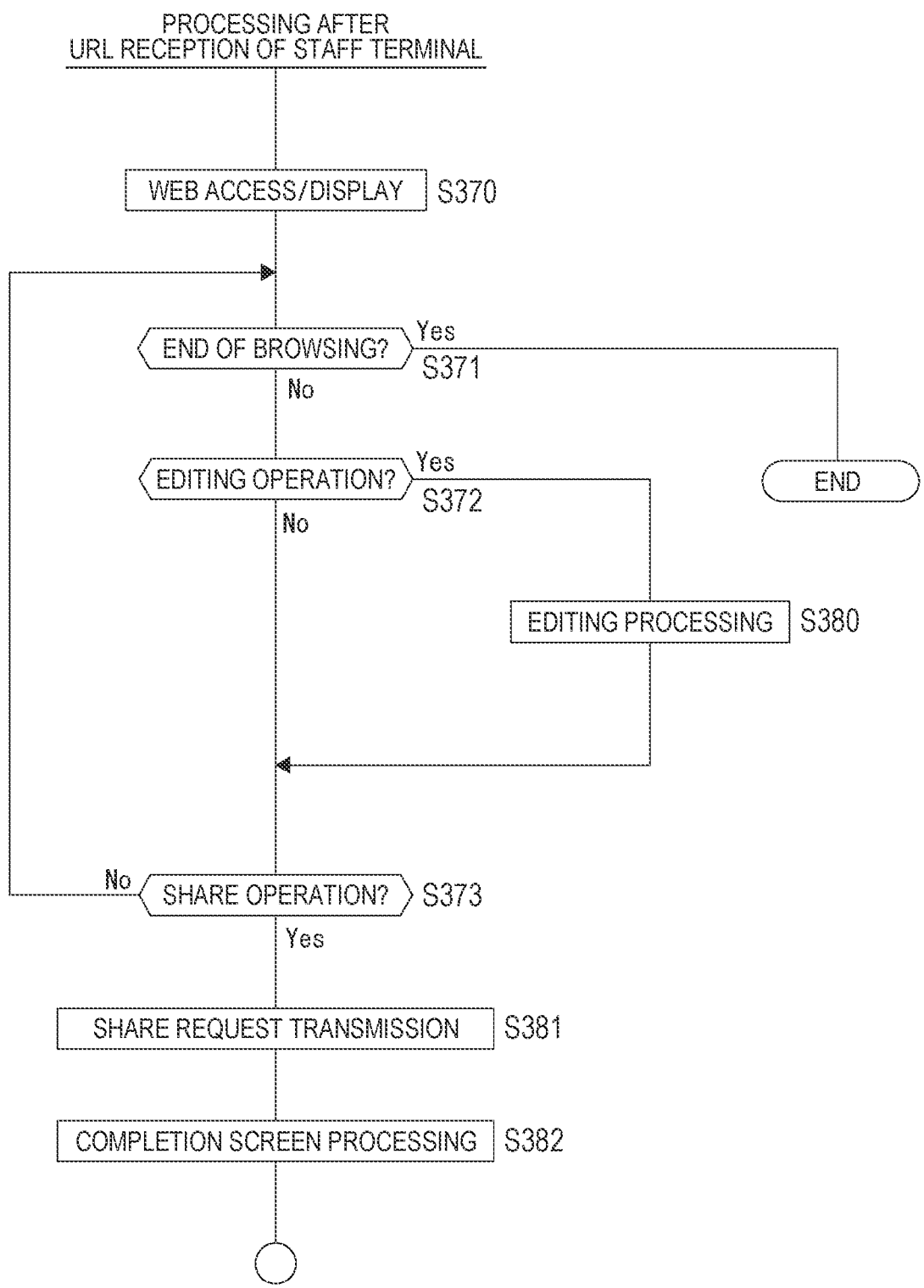
FIG. 37 is a flowchart of processing after URL reception by the terminal device according to the embodiment.

In the staff terminal 1, the browsing end operation is monitored in step S371 of FIG. 37, the operation of the edit button 181 is monitored in step S372, and the operation of the share button 182 is monitored in step S373.

When the operation of ending the browsing is detected, the web page browsing is ended.

When the operation of the edit button 181 is detected, the staff terminal 1 proceeds to step S380 and performs editing processing.

The camera staff can view the web gallery content in the preview area 183 and operate the edit button 181 as needed to further edit.

In the editing processing in step S380, the staff terminal 1 displays an interface image for editing, receives an operation of the camera staff, and edits the preview image accordingly. For example, the background color, the font of the title, the color of the title, the position of the title, the music of the slide show, and the like can be edited.

Then, in response to the editing completion operation, the editing information is transmitted to the server device 4, and the editing operation is reflected in the web gallery.

The camera staff performs an editing operation as necessary, and then operates the share button 182. In this case, the staff terminal 1 proceeds to step S381 and transmits a share request to the server device 4. As described above, the server device 4 makes the web gallery public in step S570 in FIG. 36 in response to the share request.

In step S382 of FIG. 37, the staff terminal 1 performs screen display for completion of delivery of the web gallery and processing corresponding to screen operation.

Figure 39:
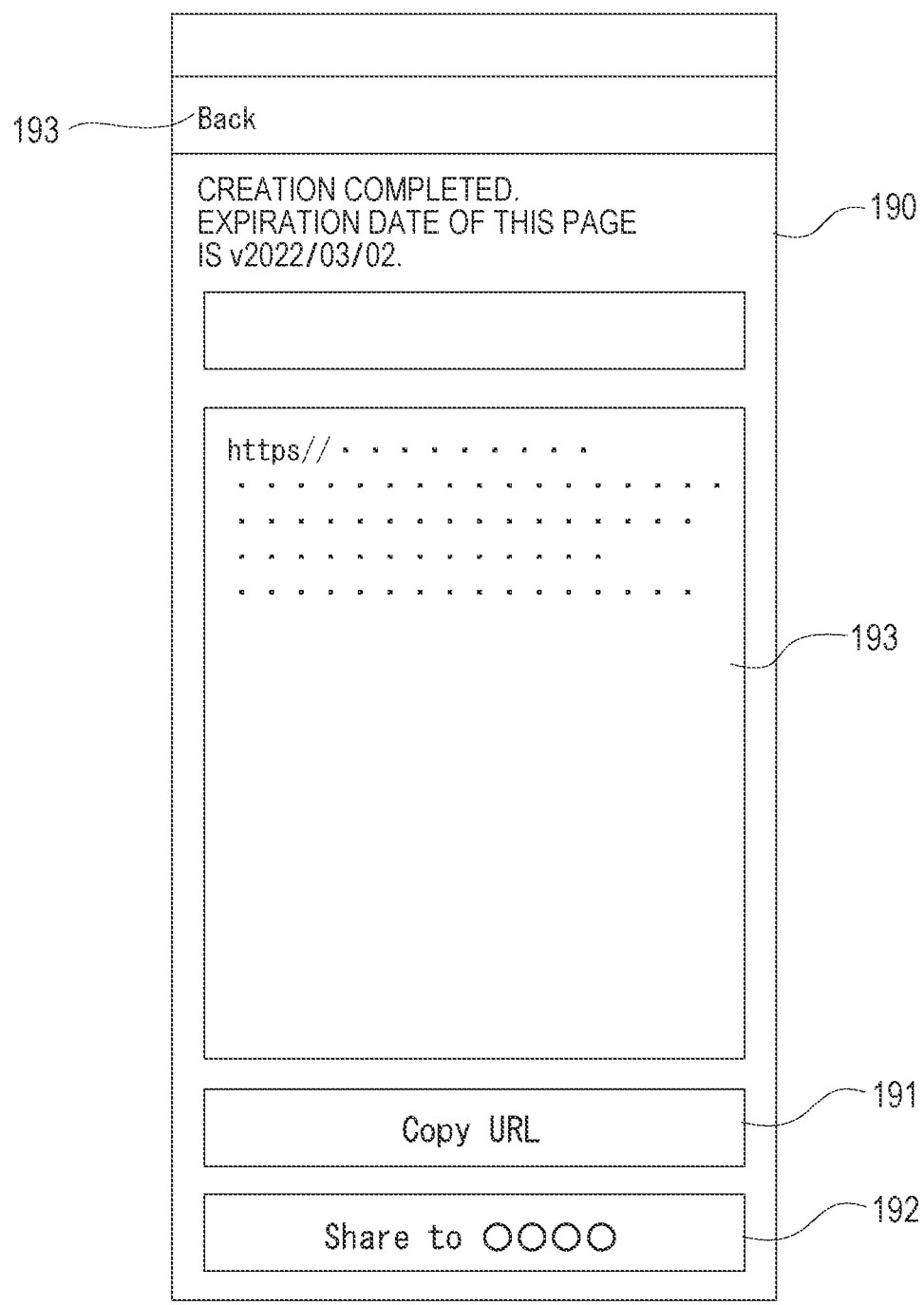
FIG. 39 is an explanatory diagram of a web gallery delivery screen according to the embodiment.

For example, the staff terminal 1 displays a web gallery delivery screen 190 of FIG. 39. The web gallery delivery screen 190 displays a notification of completion of creation of the web gallery, a valid period, and a URL 193 of the web gallery. In addition, a copy button 191 and a share button 192 are displayed.

The camera staff can copy the URL by operating the copy button 191, attach the URL to an e-mail or the like, and transmit the e-mail to the client terminal 5. In addition, the share button 192 is operated to provide a URL to an SNS or the like so that a client can browse the web gallery via the SNS.

As described above, the client can browse the web gallery at an extremely early time such as during the day after the end of the wedding or the like.

Note that distributing the URL to the client to allow the client to browse the image collection as a web gallery is an example. For example, image collection content corresponding to the web gallery described above may be created and distributed to the client as a content file.

<8. Actual Delivery Processing>

The actual delivery processing is performed at the stage of step S5 in FIG. 2.

Figure 40:
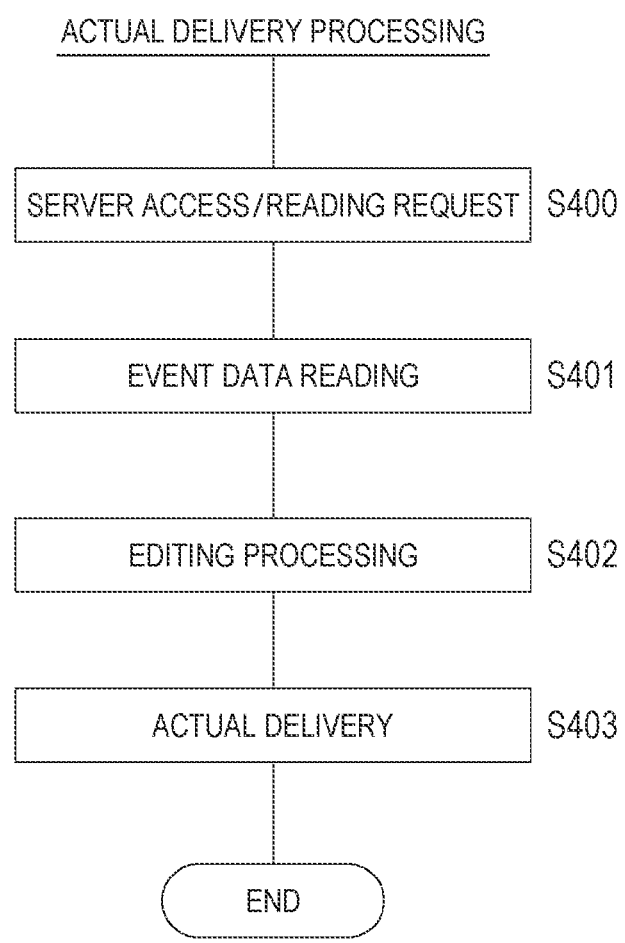
FIG. 40 is a flowchart of actual delivery processing of the terminal device of the embodiment.

FIG. 40 illustrates processing at the actual delivery stage. This is, for example, processing performed by the personal computer 3 or the staff terminal 1. Hereinafter, processing performed by the personal computer 3 will be described.

The camera staff performs an operation using the personal computer 3, accesses the server device 4 in step S400, and makes an information reading request for actual delivery.

Then, in step S401, the event data 90 is acquired from the server device 4.

For example, in this case, it is conceivable that the server device 4 causes the rating information and the selection information or the editing information to be downloaded as an XMP file so that it can be applied to the RAW image file in the personal computer 3.

That is, the personal computer 3 takes over the rating information, the used image information indicating the flag setting, the front cover image information indicating the cover image, the emphasized display image information indicating the highlight setting, and the like.

Note that all of the event data 90 may be provided to the personal computer 3.

The camera staff takes in RAW image data as image data captured by the imaging device 2 into the personal computer 3, and generates an image collection of actual delivery using the RAW image data. In this case, the creation work can be made efficient by acquiring the XMP file based on the event data 90 from the server device 4.

The personal computer 3 performs necessary editing processing in step S402 to complete the image collection of the actual delivery.

Thereafter, in step S403, processing for actual delivery is performed. For example, processing of generating content data as image collection content, electronically transmitting the content data, recording the content data on a recording medium, or using the content data as print data is performed.

Then, the created content data, a recording medium recording the content data, or an image collection by a printed paper medium is delivered to the client.

<9. Event View>

The event view 200 illustrated in FIGS. 21, 22, and the like will be described.

The event view 200 differs from the time view 120 in an arrangement manner of images in the image area 128.

A series of images in an event such as a wedding or the like is divided into sub-events and scenes, and images of one scene are arranged in the image area 128 in the horizontal direction. Then, each scene and each sub-event are arranged in the vertical direction.

An event title unit 240 is displayed for each sub-event. In the event title unit 240, for example, names of sub-events such as "Ceremony", "Cocktails", and the like are indicated. Note that the name may be more regularly "event1", "event2", . . . , or the like.

The number of images included in the sub-event, the time when the sub-event is performed, and the like are also displayed in the event title unit 240.

In addition, the sub-event is subdivided into scenes, and the name of each scene is displayed as a scene title unit 241. For example, "Scene1", "Scene2", and . . . are set.

The names of the sub-events or the scenes may be arbitrarily input by the user, or candidates may be set in advance and selected. In a case where a sub-event or a scene can be predicted for each classification of an event, a name candidate for the sub-event or the scene may be prepared and selected by the user, or the sub-event or the scene may be automatically determined from image contents.

Images of one scene are arranged in the horizontal direction. Each image appears in a horizontal scrolling operation.

In the example of FIG. 21, "Scene1", "Scene2", and "Scene3" are divided in a sub-event of "Ceremony", and then a sub-event of "Cocktails" are arranged in the vertical direction. Sub-events and scenes appear in chronological order by a vertical scroll operation.

In the event view 200, an update button 203 is displayed. This is an operator for giving an instruction to update of the division of the sub-events and scenes.

In the event view 200, the index bar 201 can be displayed. The index bar 201 displays, for example, the time and title of each sub-event.

As a result, the number and types of sub-events can be listed. When the number of sub-events is large, it is handled by scrolling the index bar 201 itself.

In addition, the index bar 201 also functions as a jump operation unit for displaying a sub-event. For example, by tapping the portion of "Party Time" of the index bar 201, the display is jumped in the vertical scroll direction, and the portion of the images of each scene of the sub-event "Party Time" is displayed.

The tap operation on the index bar 201 is detected in step S214 of FIG. 13, and the display jump is performed as the processing of step S241.

In addition, it is conceivable that the index bar 201 is automatically erased after being displayed for a predetermined time when the event view 200 is displayed. In that case, the user can call the index bar 201 by swiping from the right end of the screen. Furthermore, the index bar 201 may be closed by swiping to the right from the position of the index bar 201 while the index bar 201 is being displayed.

The processing corresponding to such swipes is also the processing of steps S214 and S241 of FIG. 13.

For each image, the eye closure icon 210, the rating icon 130, and the flag setting icon 131 are displayed, and rating and selection flag setting can be performed similarly to the time view 120.

In addition, also in the event view 200, the all tab 125 and the candidate tab 126 can be switched as in the time view 120.

In addition, also in the event view 200, the filter designation area 129 is provided, and the above-described filtering function can be implemented.

Figure 41:
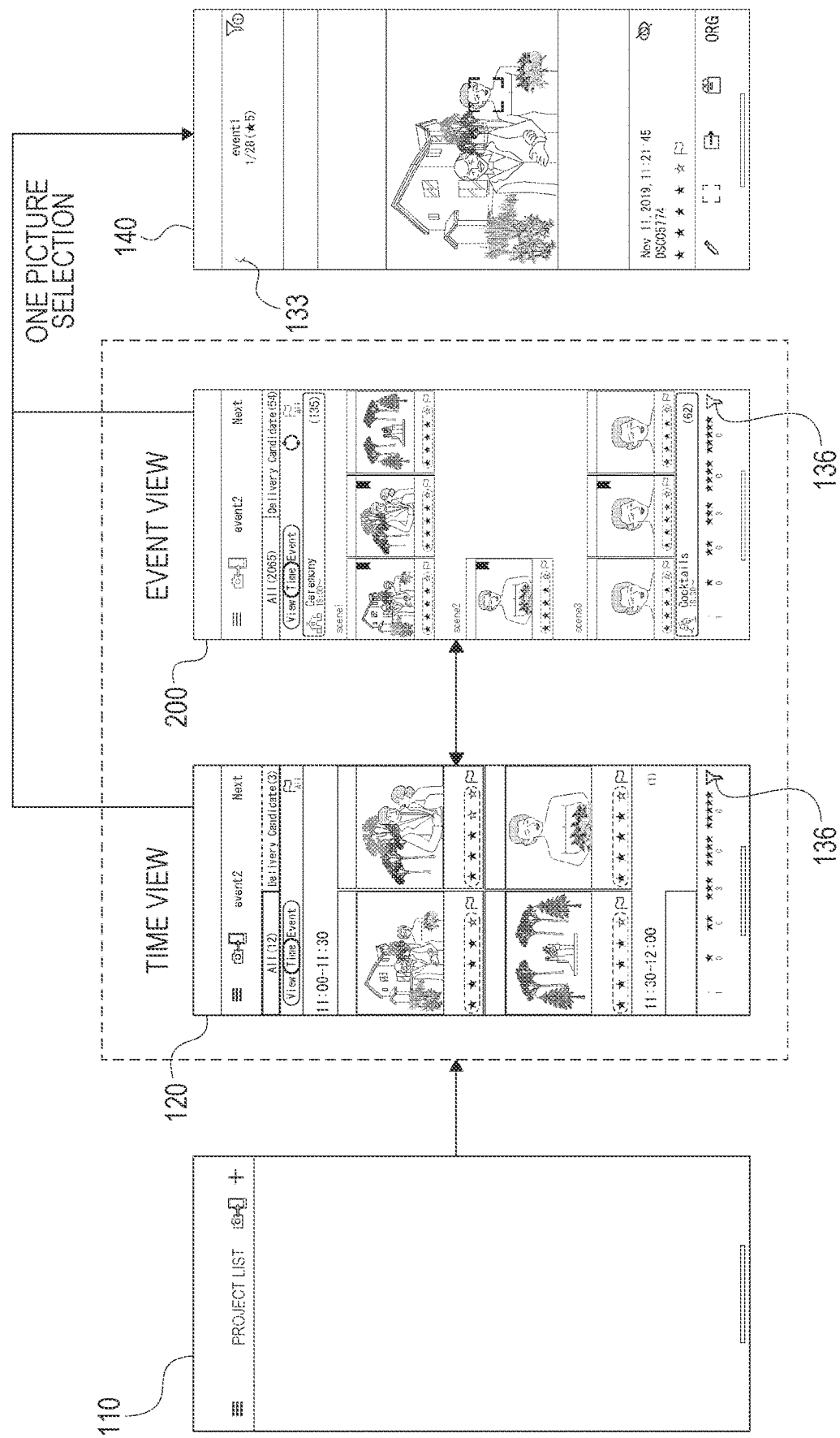
FIG. 41 is an explanatory diagram of view switching according to the embodiment.

FIG. 41 illustrates display switching.

Figure 10:
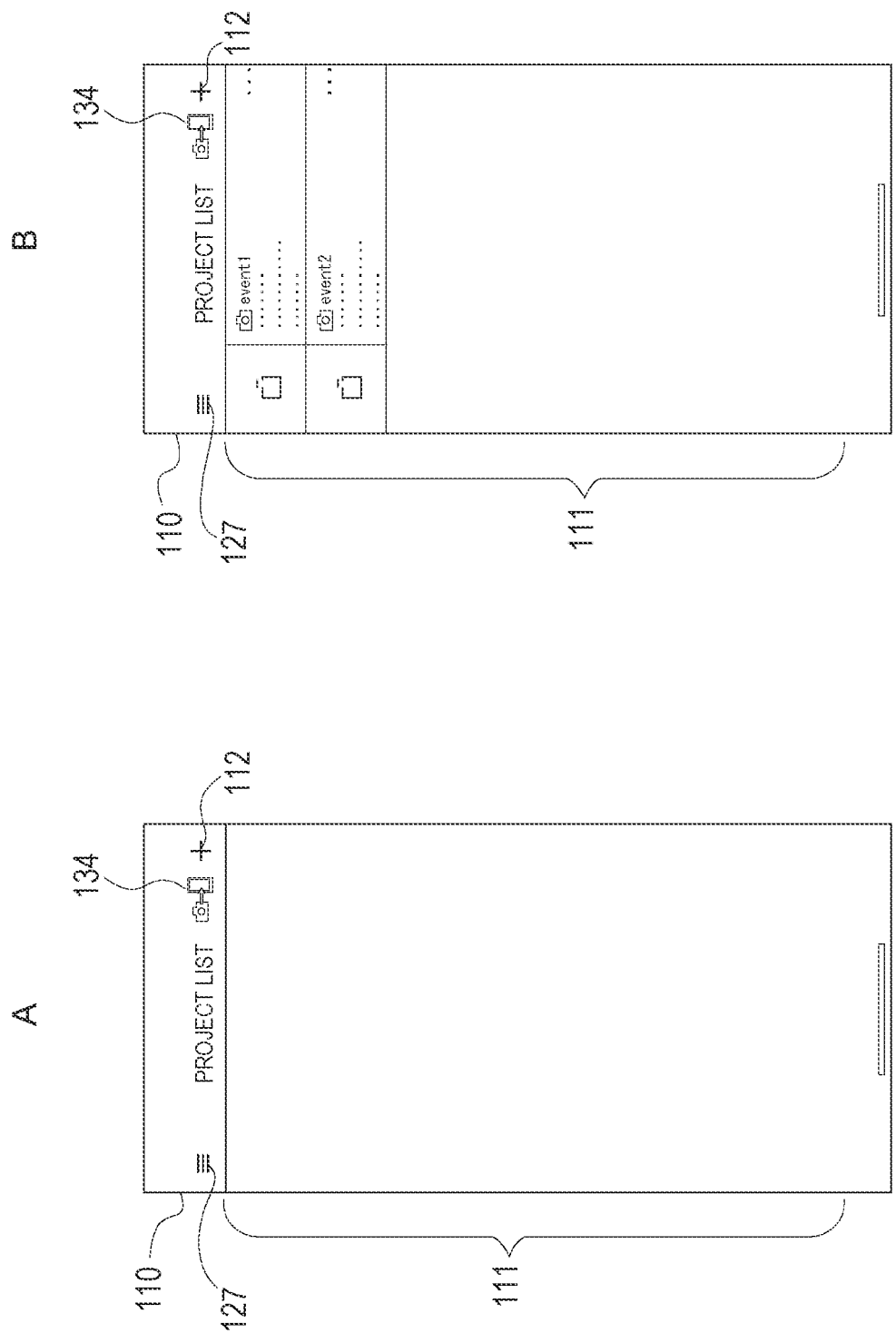
FIG. 10 is an explanatory diagram of a project list screen according to the embodiment.

In a case where the process proceeds from the project list screen 110 illustrated in FIG. 10 to step S211 in FIG. 13, the time view 120 or the event view 200 is displayed. At this time, it is conceivable that which view is displayed is, for example, the last view selected for the event at the time of the previous browsing.

As described above, the time view 120 and the event view 200 are switchable by the view switching button 202.

It is conceivable that the filtering condition is maintained even when the time view 120 is switched to the event view 200. That is, in a case where switching to the event view 200 is performed in a state where filtering is performed in the time view 120, images according to the filtering condition are also displayed in the event view 200. For example, when a filtering condition under which archived images are not displayed is set, the archive images are not displayed even if the view is switched to the event view 200. Of course, also in the event view 200, the filter condition can be changed from the filter operation icon 136.

When one image is selected from the time view 120 or the event view 200, the display transitions to the one-picture display screen 140. When the return icon 133 of the one-picture display screen 140 is operated, the display returns to the time view 120 or the event view 200 as the list state before the transition to the one-picture display screen 140.

Since such a screen transition is performed, the user can arbitrarily switch between the time view 120 and the event view 200 as a list display.

Figure 42:
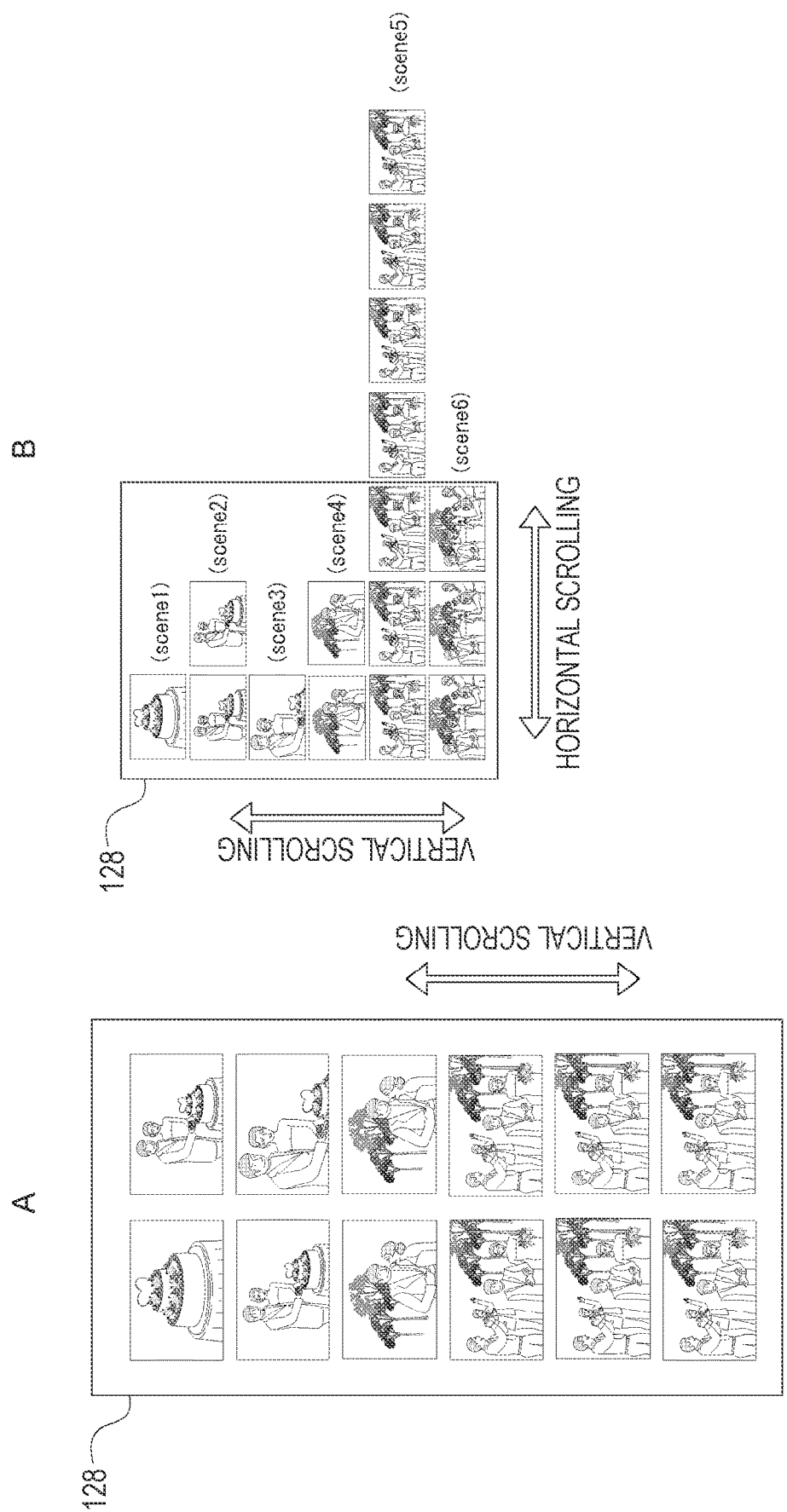
FIG. 42 is an explanatory diagram of image arrangement in an event view according to the embodiment.

Differences between the time view 120 and the event view 200 are illustrated in FIG. 42.

FIG. 42 illustrates an arrangement of images in the time view 120. For example, as illustrated in FIG. 20B, two images are displayed in the horizontal direction of the screen.

Each image is simply arranged in chronological order as the imaging time. The user can confirm each image by a vertical scroll operation. However, in other words, in a case where it is desired to confirm an image of a desired sub-event, the target image cannot be reached unless a long vertical scroll is performed with consideration of an approximate time.

On the other hand, an image arrangement of the event view 200 is as illustrated in FIG. 42B.

Each scene is arranged in a vertical direction, and a plurality of images of one scene is arranged in a horizontal direction. When searching for images in one scene, each image of the scene appears in the image area 128 by horizontal scrolling.

Since the sub-events and the scenes are arranged in the vertical direction, in a case where there is a sub-event for which an image is desired to be confirmed, the scene of the sub-event can be reached relatively quickly by scrolling in the vertical direction.

Moreover, in the scene to be confirmed, the images are arranged in the horizontal direction, and thus it is easy to compare.

From the above, the event view 200 has advantages that it is easy to access each image and it is easy to compare images of the same scene for selection as compared with the time view 120.

Note that, although a plurality of images of one scene is arranged in the horizontal direction as one row, if the number of images of the scene is excessively large, horizontal scrolling becomes long, and usability may be deteriorated. Therefore, the upper limit of the number of images arranged in the horizontal direction is set. For example, the upper limit of the number of images arranged in the horizontal direction is 30. In a case where the number of images in the scene exceeds, the next row is used to align horizontally. Therefore, images of one scene may be displayed over a plurality of lines.

In addition, when the time view 120 is switched to the event view 200, it is desirable to make the display easy for the user to understand.

Therefore, in the time view 120 immediately before the display switching, the display state in the event view 200 is set by focusing on the uppermost left image in the image area 128.

Suppose that there are six images of image pct1 to image pct6 in a certain scene.

Suppose that the image pct1 is displayed at the upper left of the image area 128 in the time view 120 immediately before switching. In this case, when the view is switched to the event view 200, as illustrated in FIG. 43A, the image pct1 is displayed at the upper left of the image area 128. An image or a portion of the image indicated by a broken line in the drawing is not displayed at that time but appears by scrolling.

In addition, suppose that the image pct3 is displayed at the upper left of the image area 128 in the time view 120 immediately before switching. In this case, when the view is switched to the event view 200, as illustrated in FIG. 43B, the image pct3 is displayed at the upper left of the image area 128.

Suppose that the image pct6 at the rear end of the scene is displayed at the upper left of the image area 128 in the time view 120 immediately before switching. In this case, it is not very appropriate to set a state in which the image pct6 is displayed at the upper left of the image area 128 when the view is switched to the event view 200. Therefore, as illustrated in FIG. 43C, at least the image pct6 is displayed.

As described above, the user will be not confused even if the display is changed as long as the upper left image in the time view 120 is arranged at the upper left even if the view is switched to the event view 200. Even in a case where the image cannot be displayed at the upper left after switching, it is desirable that at least the same image is displayed.

Figure 44:
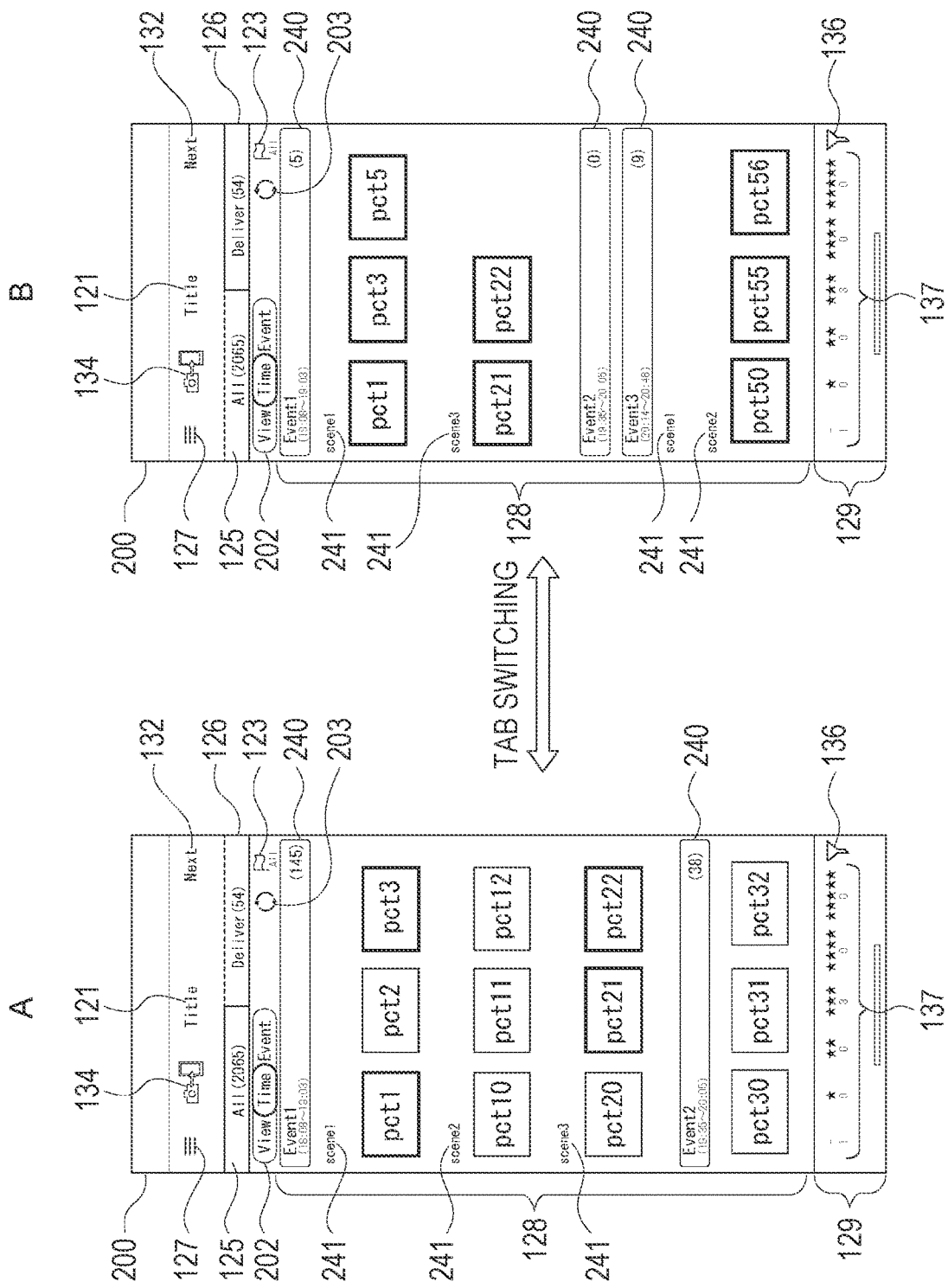
FIG. 44 is an explanatory diagram of display of a candidate tab in an event view according to the embodiment.

Next, FIG. 44 illustrates display switching of the all tab 125 and candidate tabs 126 in the event view 200.

In the display of the all tab 125 in FIG. 44A, all images are displayed for each scene.

In the display of the candidate tab 126 in FIG. 44B, images in which the selection flag is turned on are displayed for each scene.

The event title unit 240 and the scene title unit 241 are also displayed in the display of the candidate tab 126, and the images of each scene are arranged side by side in the horizontal direction.

Furthermore, in the candidate tab 126, the event title unit 240 is also displayed for a sub-event or scene for which no image is selected. For example, in the sub-event "EVENT2" in FIG. 44B, there is no image for which the selection flag is turned on, and the number of images is also "0".

In addition, there is no image for which the selection flag is turned on in the scene "SCENE1" in the sub-event "EVENT3", but the scene title unit 241 is displayed.

By browsing such a candidate tab 126, the user can confirm what kind of image is selected (selection flag is turned on) to be used for image collection, how many images are selected, or the like for each sub-event or scene, which is useful in considering the balance of image contents and the number of images in units of sub-events or in units of scenes.

With regard to the display of the event view 200 as described above, the processing from step S351 to step S359 and the processing from step S360 to step S363 in FIG. 15 are performed. These processes will be described.

In a case where the switching operation from the time view 120 to the event view 200 is detected in step S221 of FIG. 15, the staff terminal 1 proceeds to step S351 and branches the processing depending on whether or not the event view 200 is requested to be displayed for the first time for the current event (event set as one project). The first time can be said to be a state in which the division information 63 is not stored in the event data 60 of FIG. 5.

If it is not the first time, the process proceeds to step S355, but if it is the first time, it is confirmed in step S352 whether or not the number of images of the target event is less than a predetermined number. For example, it is determined whether or not the number of pictures is less than 100.

If the number of images is less than the predetermined number, the staff terminal 1 displays a dialog for confirming the event view display in step S353, and requests the user to OK or cancel.

For example, in order to accurately classify sub-events and scenes and appropriately display the event view 200, it is preferable that the number of images is large. If the number of images is small, appropriate scene determination may not be performed. In addition, if the number of images of each scene is one, or the like, there is a possibility that the display of the event view 200 is not very effective. In addition, the transition to the event view 200 requires division determination processing, and may take time such as several seconds to a maximum of about several 10 seconds or the like.

Therefore, such a description is made by a confirmation dialog, and when it is the first time and the number of images is less than a predetermined number, confirmation of the user is requested. In a case where the user performs the cancel operation, the process returns to the monitoring loop. In a case where the user performs an OK operation on the dialog display, the staff terminal 1 proceeds to step S358.

Note that the request for confirmation from the user in steps S353 and S354 has a meaning of asking the user whether or not to execute the time-consuming division determination processing in a case where the number of images is small as described above and there is a possibility that the event view 200 is not very effective (not so different from the time view).

Here, it is also assumed that the time required for the division determination processing changes due to device performance, improvement in program efficiency, or the like, and the user hardly feels the waiting time. If the division determination processing does not require time, there is no waiting time of the user even if the division determination processing is particularly performed, and thus the processing of steps S353 and S354 may not be performed.

In addition, even if the switching operation to the event view 200 is the first time, in a case where there is a predetermined number or more of images, the staff terminal 1 proceeds to step S358 without presenting the confirmation dialog described above.

In this case, since the number of images is a predetermined number or more, the event view 200 is assumed to be useful as a list, and a division determination processing is required for this display.

In the display of the event view 200, it is necessary to perform the division determination processing to determine the division of the sub-events or scenes for a series of images in chronological order.

Therefore, in a case where the process target project responds to the first switching request, the division determination processing is performed in step S358.

Note that division determination processing may be performed in advance prior to the first request for display of the event view 200. In that case, it is conceivable to proceed to step S355 even for the first time.

When the division determination processing is performed in step S358 and the division of the sub-events and the scenes for each image in chronological order is determined, the process proceeds to step S359, and the event view 200 is displayed using the information of the result of the determination processing.

In a case where the switching operation to the event view 200 is not the first time, the staff terminal 1 proceeds from step S351 to step S355 and confirms whether or not there is an image with no scene setting.

In a case where the division determination processing has been performed in the past for the images of the target event and the division of the sub-events and the scenes has been set, the event view 200 can be displayed accordingly. However, even if the division determination processing has been performed in the past, in a case where images for the target event have been newly transferred from the imaging device 2 thereafter, these images have not been targets of the division determination processing, and thus the scenes have not been set.

If there is no image for which a scene has not been set, and division of scenes has been set for all the images at the present time, the process proceeds to step S359, and the event view 200 is displayed by using the information of the result of the past division determination processing stored as the division information 63 in FIG. 5.

In a case where it is determined in step S355 that there is an image with no scene setting, the staff terminal 1 proceeds from step S355 to step S356, performs dialog display of whether or not to execute calculation as the division determination processing, and confirms to the user whether or not the division determination processing for updating the scene setting may be performed. This is because the division determination processing takes about several 10 seconds.

In a case where the user performs the OK operation, the staff terminal 1 performs the division determination processing in step S358, and determines the division of the sub-events and scenes for each image in chronological order. Then, the process proceeds to step S359, and the event view 200 is displayed using the information of the result of the determination processing.

In a case where the user has not performed the OK operation on the dialog in step S356, the staff terminal 1 proceeds to step S359 without performing new division determination processing, and displays the event view 200 using the information of the result of the past division determination processing. In this case, images (update-waiting images) not included in the scenes are also displayed.

Note that, in steps S356 and S357, the user is asked whether or not to allow the waiting time for the division determination processing. Therefore, if the division determination processing can be executed in a short time (for example, about several seconds), the processing of steps S356 and S357 may be omitted. That is, when there is an image with no scene setting, the process may unconditionally proceed from step S355 to step S358.

Alternatively, the estimated time of the division determination processing may be determined from the processing capability of the staff terminal 1, the number of images at that time, and the like, and permission may be requested from the user in the processing of steps S356 and S357 only in a case where the estimated time is long such as several 10 seconds or the like.

Moreover, in the example of FIG. 15, when the switching operation to the event view is detected in step S221, an image for which a scene is not set is determined in step S355, and the division determination processing is performed in step S358, but the present invention is not limited thereto. For example, the staff terminal 1 may sequentially confirm the presence of an image with no scene setting, and if there is an image with no scene setting, the staff terminal 1 may automatically perform division determination processing to reset the event and the scenes. In particular, in a case where the processing time of the division determination processing is extremely short or in a case where the processing load is light, it is preferable to perform the division determination processing by the background processing. In a case where the division determination processing is automatically sequentially performed in this manner, the process can immediately proceed to step S359 in response to the operation detection in step S221.

Figure 45:
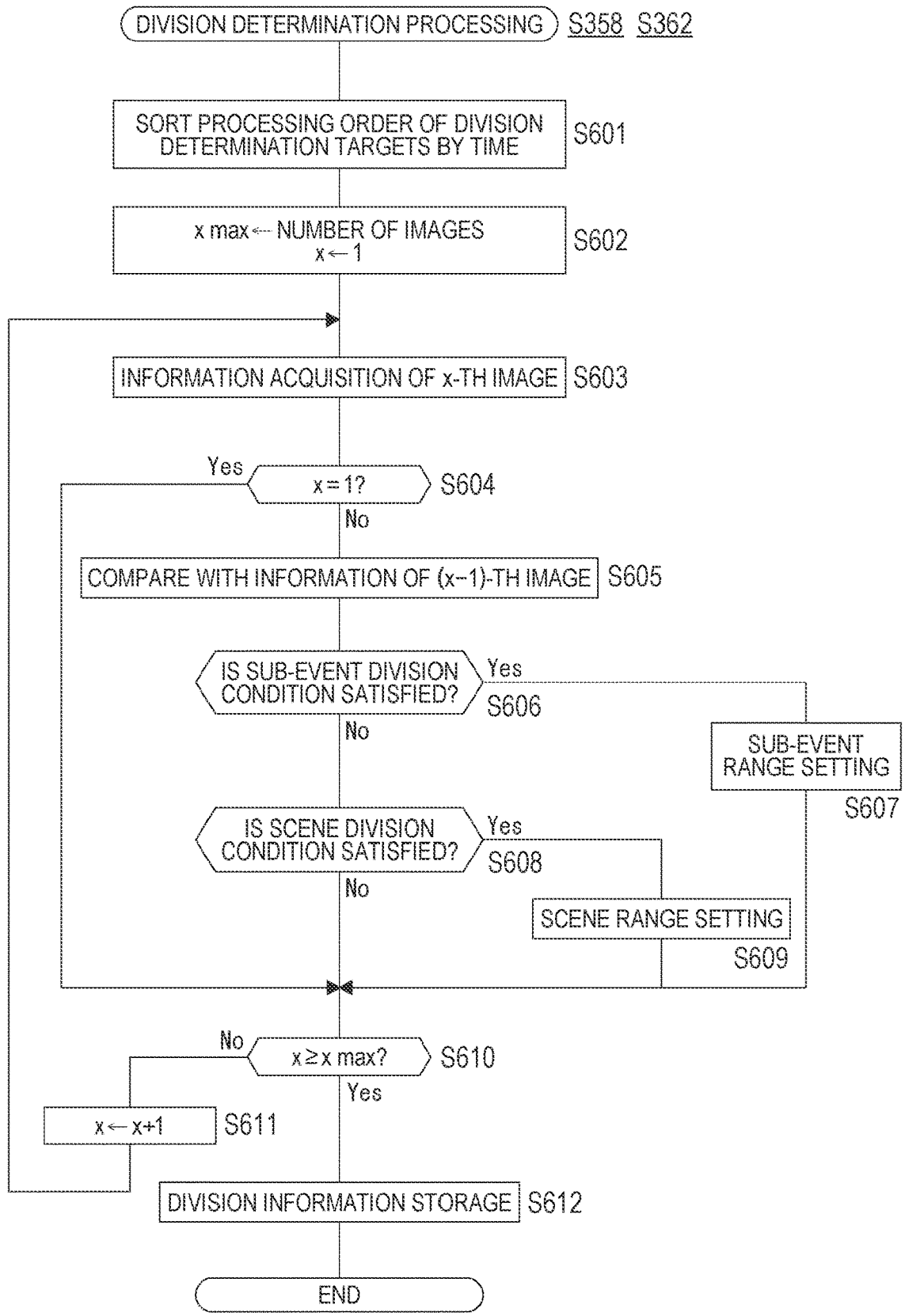
FIG. 45 is a flowchart of division determination processing according to the embodiment.

FIG. 45 illustrates an example of the division determination processing in step S358.

First, in step S601, the staff terminal 1 sorts the processing order of all the images of the event that is the project targeted for the division determination processing by the imaging time. For example, sorting is performed with reference to the imaging time in the metadata of each image. In this case, although there is a case where images are transferred from a plurality of imaging devices 2, all the images of the event are sorted in order of imaging time regardless of the type of the imaging device 2.

In step S602, the staff terminal 1 sets the total number of target images as the total number xmax and sets the variable x to 1, and thereafter, while incrementing the variable x in step S611, repeats the processing from step S603 to step S609 until the variable x reaches the total number xmax in step S610.

In step S603, the staff terminal 1 acquires information of the x-th image in the sorting order in step S601. For example, the imaging time is acquired from the metadata. In addition, if there is information as an image analysis result, it is also conceivable to acquire information of the recognized subject, for example, people, the number of people, face recognition information, personal identification information, article information, and the like. In addition, it is also conceivable to acquire various types of information at the time of imaging included in the metadata, for example, positional information, environmental information such as ambient brightness or the like, identification information of the imaging device, angle of view information at the time of imaging, exposure information, white balance information, a fixed state of the imaging device to the tripod, and the like.

When the variable x=1, that is, when the first image in chronological order is targeted, the staff terminal 1 proceeds from step S604 to steps S610 and S611, and acquires information of the next image in step S603 with x=2.

When the information is acquired for the second and subsequent images in the sorting order, the staff terminal 1 proceeds from step S604 to step S605, and compares the acquired information with the image at the imaging time one time before.

In step S606, the staff terminal 1 determines whether or not a space between the x-th image and the (x−1)-th image in the order of imaging time satisfies a division condition of sub-events.

For example, in a case where the information of the imaging time is acquired in step S603, if the difference between the times of the two images is greater than or equal to a first threshold value, it is assumed that the division condition of sub-events is satisfied. For example, the first threshold value is five minutes or the like.

In a case where the division condition of sub-events is satisfied, the staff terminal 1 sets one sub-event range in step S607 on the assumption that the space between the x-th image and the (x−1)-th image is the division of sub-events. That is, images in a range from the division of the sub-event sensed immediately before (the head time in the case of the division of the first sub-event) to the division of the current sub-event is defined as a range of one sub-event.

In a case where the division condition of sub-events is not satisfied, the staff terminal 1 proceeds from step S606 to step S608, and determines whether or not a space between the x-th image and the (x−1) th image satisfies the division of scenes.

For example, in a case where the information on the imaging time is acquired in step S603, if the difference between the times of the two images is equal to or larger than a second threshold value, it is assumed that the division condition of scenes is satisfied. For example, the second threshold value is shorter than the first threshold value. For example, the second threshold value is three minutes.

In a case where the division condition of scenes is satisfied, the staff terminal 1 sets one scene range in step S609 on the assumption that the space between the x-th image and the (x−1)-th image is division of scenes. That is, images in a range from the division of the scene or the division of the sub-event sensed immediately before to the division of the current scene is defined as one scene division.

By repeating the above processing until the variable x=xmax is satisfied in step S610, the sub-event division and the scene division are determined from all the images sorted in chronological order.

When the variable x=xmax, the staff terminal 1 proceeds from step S610 to step S612, and stores the information of the determined division of sub-events and division of scenes as the division information 63 in the event data of FIG. 5.

By performing such division determination processing in step S358 of FIG. 15, in step S359, the event view 200 as illustrated in FIG. 21 can be displayed on the basis of the division determination result.

In particular, in the division determination processing, the division of sub-events and the division of scenes are determined by the difference in time between the images arranged in order of imaging time, so that the display of each scene in the event view 200 can be implemented relatively easily. In addition, for the camera operator, the division of scenes is likely to be appropriate.

In the division determination processing of FIG. 45 described above, the determination of the sub-event division and the determination of the scene division in steps S606 and S608 are made based on the difference between the imaging times (for example, five minutes and three minutes), but other determination conditions may be used.

The following examples are conceivable.

Change in people's behavior (how much people have moved)

For example, by comparing the position information of each image, the movement of the place (ceremony hall, reception hall, outdoor, and the like) can be detected. Therefore, the division of sub-events or scenes can be determined by the change or the change amount of the position information.

Note that the position information of the staff terminal 1 possessed by the camera staff is stored for each time, and the movement trajectory can be determined, so that the position and movement of the camera staff at the time of capturing each image can be determined by collating the movement trajectory with the imaging time of each image. The division determination can also be performed on the basis of the information.

Change in zoom magnification (change in angle of view)

The angle of view information of each image is compared to determine the zoom state. The zoom magnification change can be one of determination elements of division of sub-events or scenes, as it is an operation performed by the camera operator according to a change in the subject situation.

Face recognition (the number of people whose faces are captured)

A change in the number of subjects, a change in an individual subject, or the like can also be considered as a change of scenes or a change of sub-events. By comparing the information of the result of the image analysis between the images, it is possible to determine the division of sub-events or scenes.

Note that the image analysis information may be used by storing image analysis information for eye closure determination, for example. In addition, the number of subjects and the identification information of the subject person may be acquired from the server device 4 as an image analysis result of each image.

Object Recognition

Sub-events or scenes are determined on the basis of objects included in each image. For example, it is possible to determine a section of images in which a cake is captured, a section of images in which a bouquet is captured, and the like in chronological order, and to set the division of scenes or sub-events.

Tripod Detection (Whether or not Camera is Fixed to Tripod)

Information on the fixed state of each image is compared, and a timing at which the imaging device 2 is fixed to the tripod and a timing at which the imaging device 2 is removed from the fixed state are determined as division of scenes or sub-events.

Exposure Correction and White Balance

In a case where a change in exposure correction or white balance is large, it is determined as division of scenes or sub-events.

Photometric Quantity

Since the current brightness is metered inside the imaging device 2, division of scenes or sub-events is determined with reference to the value.

Although the above is an example, it is possible to determine division of sub-events or scenes on the basis of such various criteria. Of course, the division determination may be performed by combining a plurality of determination conditions.

Next, processing in a case where the scene setting update operation is detected in step S222 of FIG. 15 will be described. This is a case where the user operates the update button 203 in the event view 200.

In step S360, the staff terminal 1 displays a dialog to confirm to the user whether or not the scene setting may be updated. This is because the update may take time for performing the above-described division determination processing.

When the user performs a cancel operation, the process returns from step S361 to the monitoring loop.

When the user performs an OK operation, the staff terminal 1 proceeds to step S362 and performs the division determination processing described in FIG. 45. Then, the staff terminal 1 updates the display of the event view 200 in step S363 on the basis of the result of the division determination.

For example, after the event view 200 is displayed, images may be newly transferred from the imaging device 2. In a case where the camera staff uses a plurality of imaging devices 2, after images of one imaging device 2 is received and the event view 200 is displayed, images from another imaging device 2 may be received. The new images cannot be reflected in sub-events or scenes in the event view 200. Therefore, it is preferable to redo the division determination processing including the new images so that the display of the event view 200 can be updated.

Note that, as described above, it is also assumed that it does not take much time for the division determination processing. In that case, the processing of steps S360 and S361 may be omitted. Furthermore, steps S360 and S361 may be performed when a relatively long time is expected to be required depending on device performance and the number of images.

Figure 46:
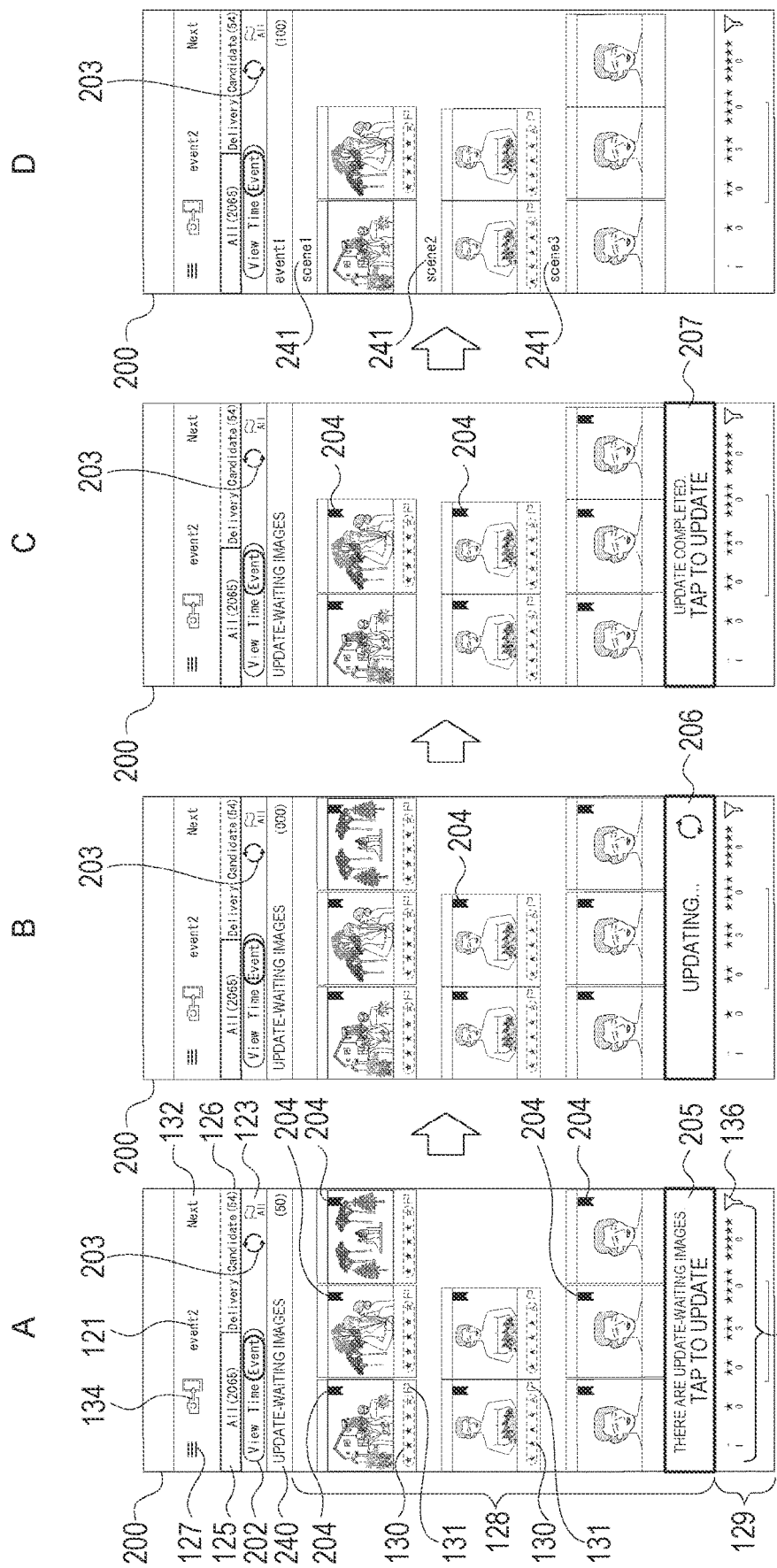
FIG. 46 is an explanatory diagram of an example of screen transition at the time of event view update according to the embodiment.
Figure 47:
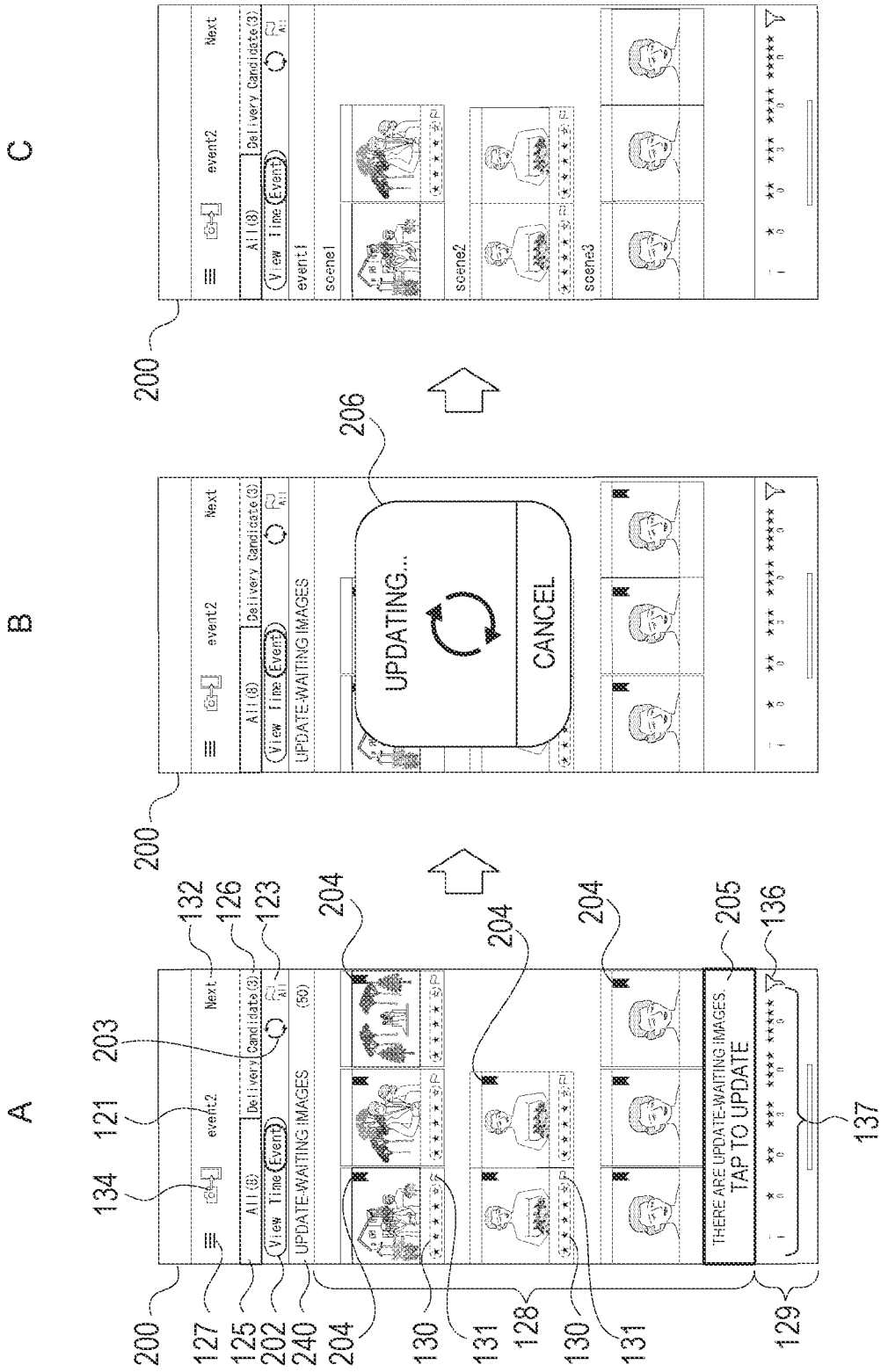
FIG. 47 is an explanatory diagram of an example of screen transition at the time of event view update according to the embodiment.

Examples of an interface for updating the event view 200 as illustrated in FIGS. 46 and 47 below are also conceivable.

FIG. 46A illustrates an example in which the update-waiting images are displayed in a frame different from the sub-events in the image area 128 of the event view 200. The update-waiting images are images that have not yet been subjected to the division determination processing, that is, images received after the latest division determination processing.

For example, the update-waiting images are collectively displayed at a position ahead of the head sub-event (above in the scroll direction) or at a position behind the last sub-event (below in the scroll direction).

Furthermore, update-waiting labels 204 are superimposed and displayed on the update-waiting images for clearly indicating the update-waiting images.

In addition, at this time, an update dialog 205 is displayed to indicate that there are update-waiting images and to function as an update operator.

With such a display, the user can recognize that the update-waiting images exist, and the update operation is recommended.

When the user performs an operation such as tapping the update dialog 205 or the like, the staff terminal 1 starts division determination processing and displays the updating dialog 206 as illustrated in FIG. 46B. Then, when the division determination processing is completed, a completion dialog 207 is displayed as illustrated in FIG. 46C. When the user taps, the display is updated as illustrated in FIG. 46D. That is, all the images of the event at that time including the images that have been waiting for update are displayed in a list on the basis of the division of sub-events and scenes.

The example of FIG. 46 is an example of a case where the user can perform another operation even during the update. Therefore, the display is updated after waiting for the tap operation of the completion dialog 207.

Other operations may be disabled during the update. An example of this case is illustrated in FIG. 47.

FIG. 47A is similar to FIG. 46A.

When the user performs an operation such as tapping the update dialog 205 or the like, the staff terminal 1 starts the division determination processing and displays the updating dialog 206 at the center of the screen as illustrated in FIG. 47B. Other images may be grayed out and made inoperable. In addition, it is possible to perform an update cancel operation.

Then, when the division determination processing is completed, the display is updated as illustrated in FIG. 47C.

<10. Conclusion and Modifications>

In the above embodiments, the following effects can be obtained.

The staff terminal 1, which is the information processing device according to the embodiment, includes the UI control unit 31 that performs processing of executing list display and individual display as display in which an image can be selected from an image group captured in a specific event, and processing of detecting an archive operation on the image displayed, and the event data management unit 30 that performs processing of storing archive information indicating that an archive setting has been performed in association with the image targeted for the archive operation.

Since the archive setting can be arbitrarily set for images, the camera staff can distinguish images that are not to be delivered, images that do not require confirmation, images that have been determined to be delivered, or the like from other images. Therefore, it is also possible to reduce the population parameter of the images for considering whether or not selection is performed by selection, and it is possible to promote the efficiency of selection.

In the example described above, the staff terminal 1 according to the embodiment includes the filter processing unit 33 that performs filtering on the basis of the archive information, and the UI control unit 31 performs control such that images extracted by the filtering are displayed in a list as the list display.

Therefore, after arbitrarily setting archive, the image can be prevented from being displayed in a list or the like. For example, if an image determined not to be delivered is archived, it is possible to prevent the image from being displayed as a selection target, and it is possible to reduce the selection population parameter to promote the efficiency of selection.

In the embodiment, an example has been described in which whether or not to perform the filtering based on the archive information or a filtering condition can be selected (see FIG. 28D).

Therefore, the user can select to display images regardless of the presence or absence of the archive setting, to display only images not set with the archive setting, to display only images set for the archive setting, or the like, and can execute display according to the circumstances at that time.

In the embodiment, the UI control unit 31 performs control to provide a user interface capable of setting operation of selection information for creating an image collection by selectively using image data included in an image group of an event, and the event data management unit 30 performs processing of storing the archive information and the selection information in the imaging/editing information table 62 of the event data 60 as separate information (see FIG. 5).

Therefore, the user can perform the archive setting separately from the selection setting. For example, an archive setting can be performed for a certain image without considering whether or not the image is adopted for image collection. That is, the archive setting can be performed only from the viewpoint of whether or not to display. Therefore, for example, not only the images not to be delivered but also the images determined to be delivered can be archived to reduce the population parameter of the selection.

In the embodiment, an example has been described in which the UI control unit 31 enables the archive operation on the display image at the time of individual display as the one-picture display screen 140. Furthermore, in the embodiment, when the time view 120 or the event view 200 is displayed as a list, the archive operation for the display images is not allowed.

Therefore, the user can perform the archive operation after firmly confirming the image while displaying one image. If the icon of the archive operation is displayed for each image on the list display, the screen becomes complicated, and it is difficult to operate the icon on a small image. In addition, it is difficult to perform an operation of swiping a specific image on the list image. Under such circumstances, if the archive operation can be performed on the list image, the screen is likely to be complicated and erroneous operation is likely to occur. Therefore, the archive operation can be performed only in the case of individual image display, and prevention of erroneous operation and elimination of screen complication are realized.

Note that an example of specifying an image and enabling an archive operation at the time of the list display is also conceivable.

Figure 25:
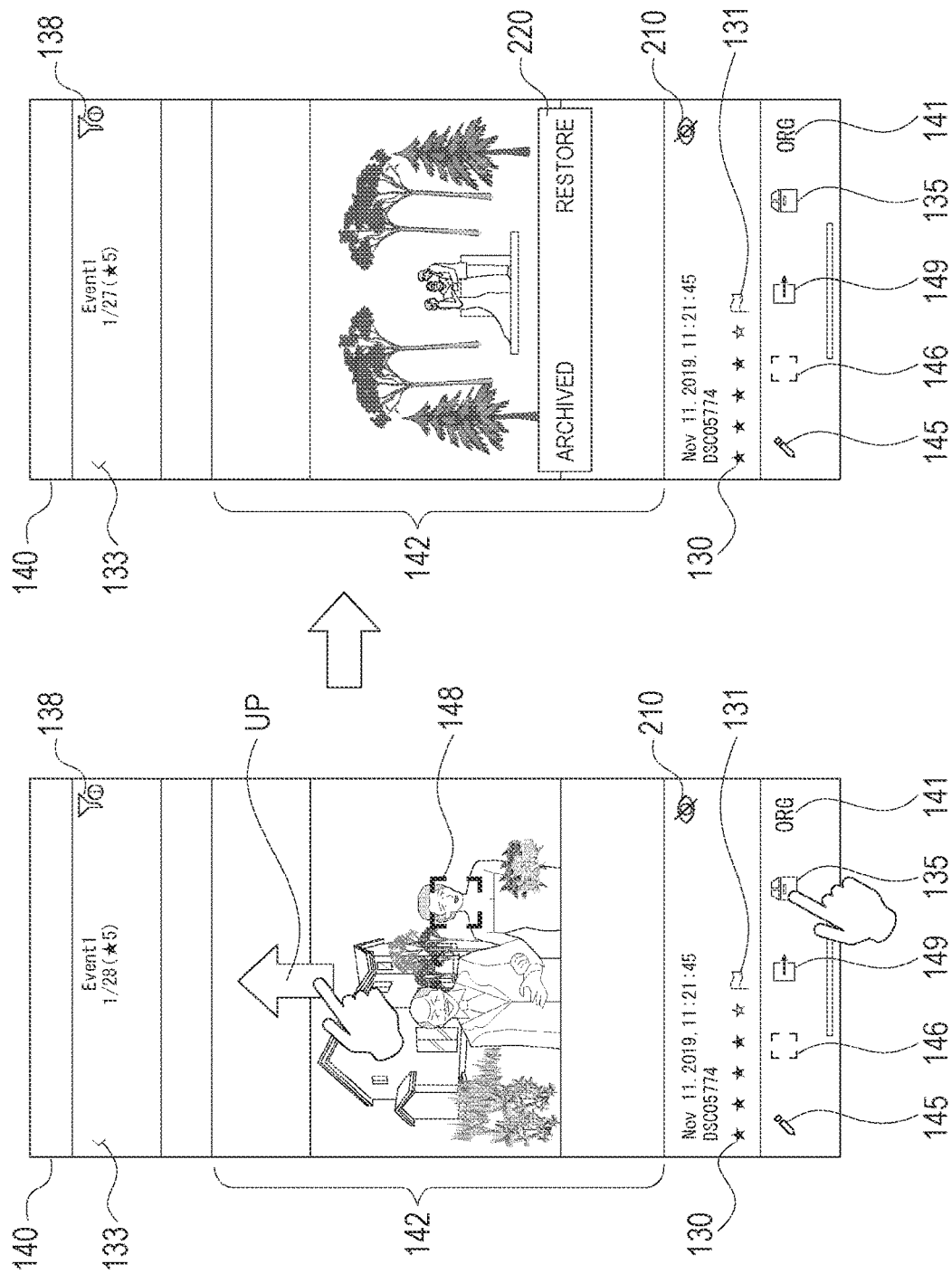
FIG. 25 is an explanatory diagram of an archive operation according to the embodiment.
Figure 26:
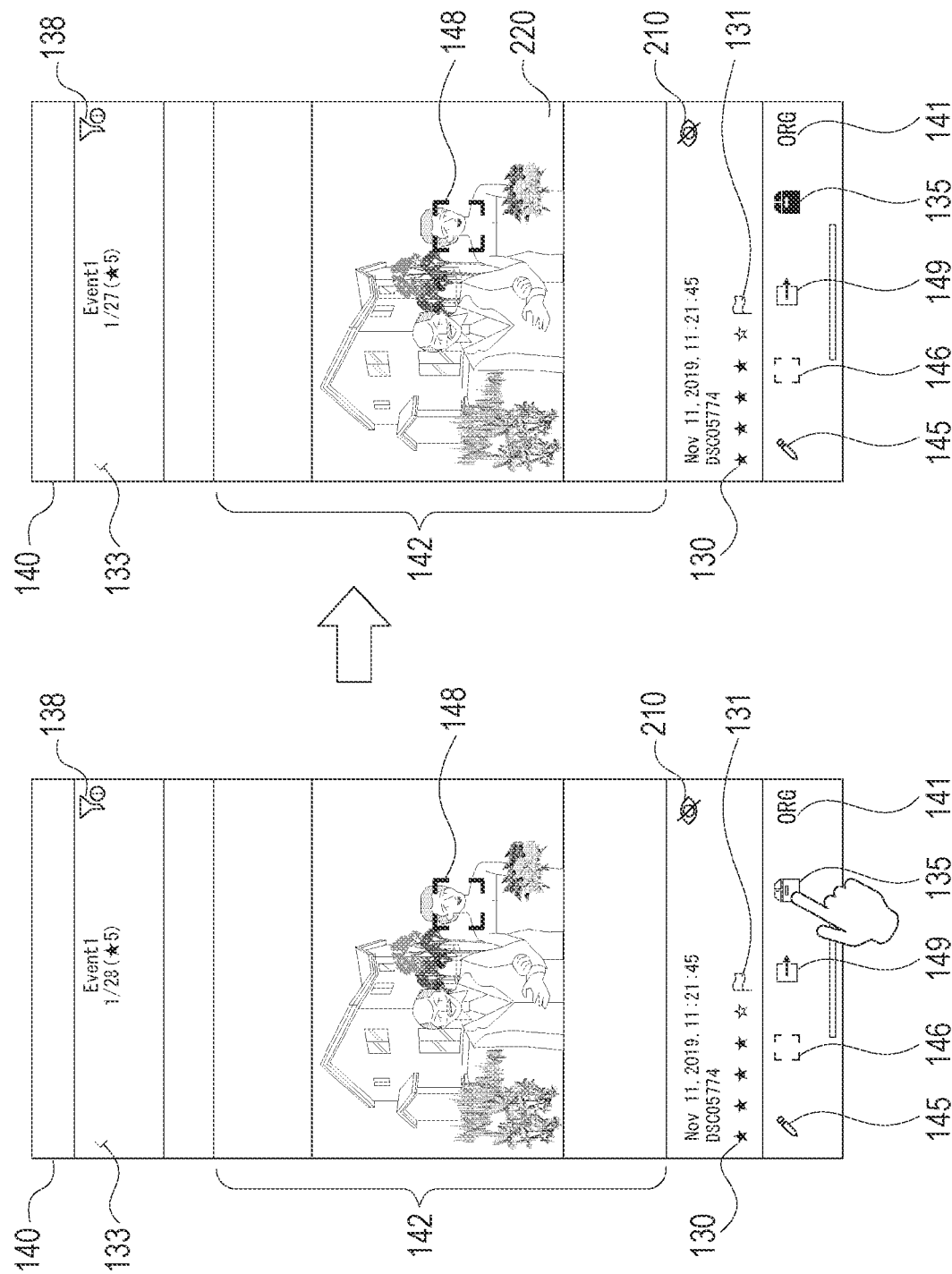
FIG. 26 is an explanatory diagram of screen transition at the time of archiving according to the embodiment.
Figure 27:
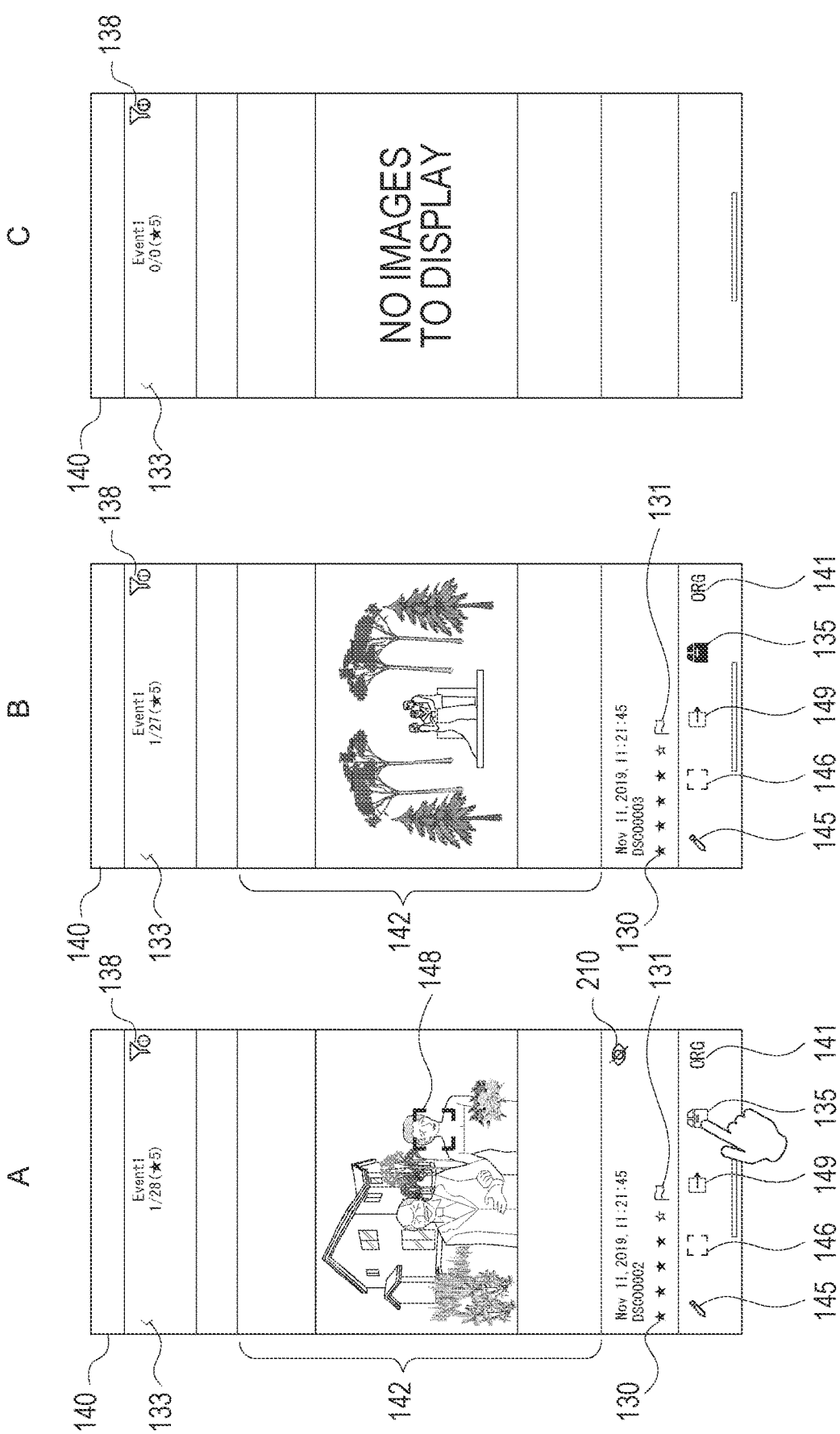
FIG. 27 is an explanatory diagram of screen transition at the time of archiving according to the embodiment.
Figure 28:
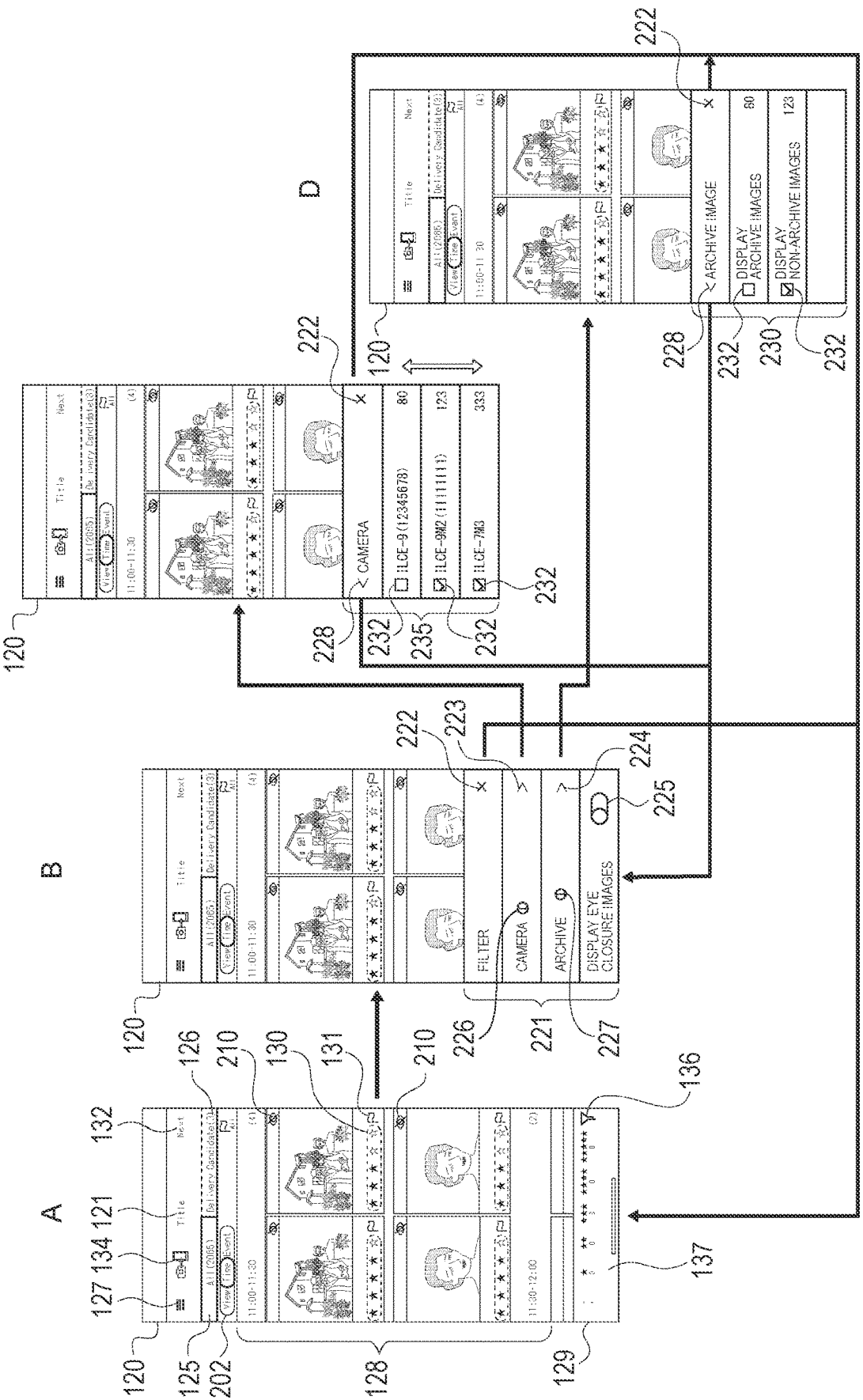
FIG. 28 is an explanatory diagram of a filter function according to the embodiment.
Figure 29:
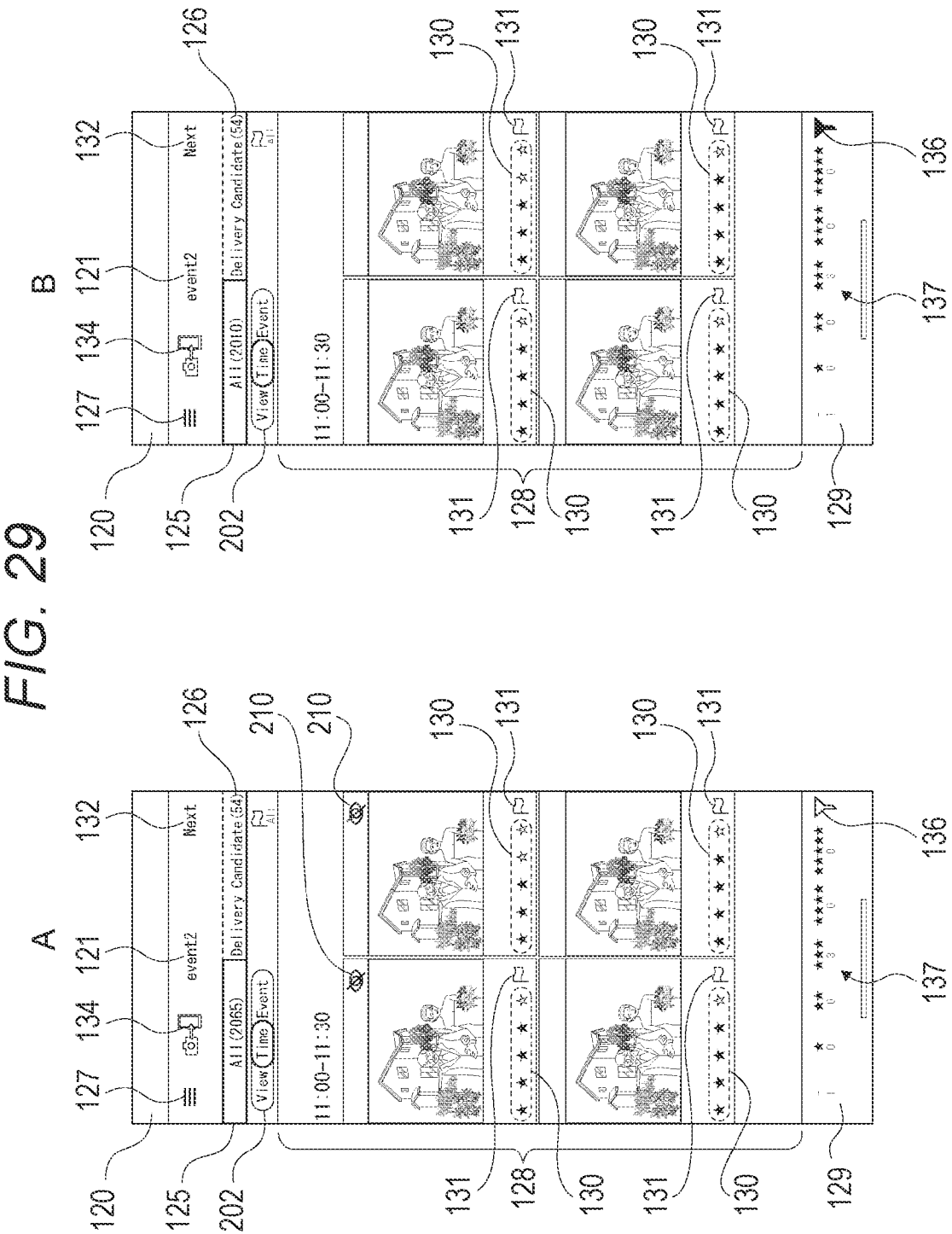
FIG. 29 is an explanatory diagram of a display mode of a filter icon according to the embodiment.
Figure 30:
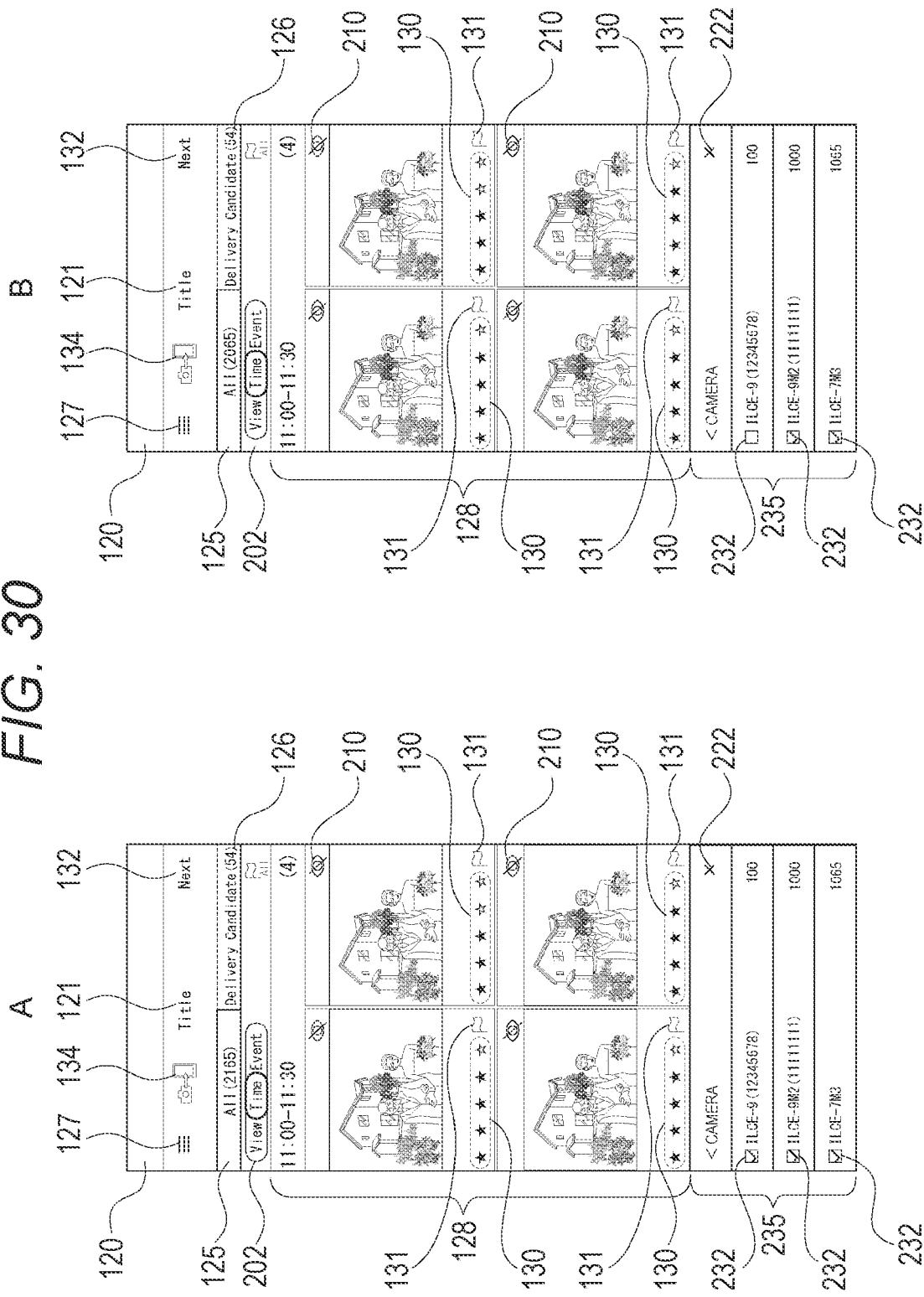
FIG. 30 is an explanatory diagram of a display mode according to a filter condition of the embodiment.
Figure 31:
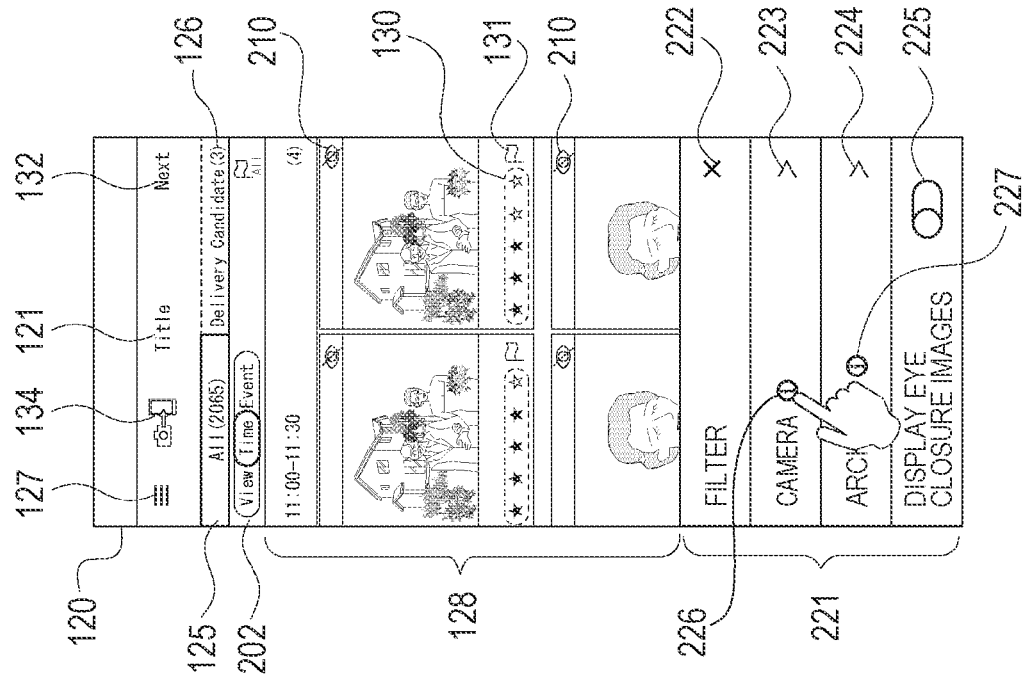
FIG. 31 is an explanatory diagram of guidance display regarding a filter function according to the embodiment.
Figure 32:
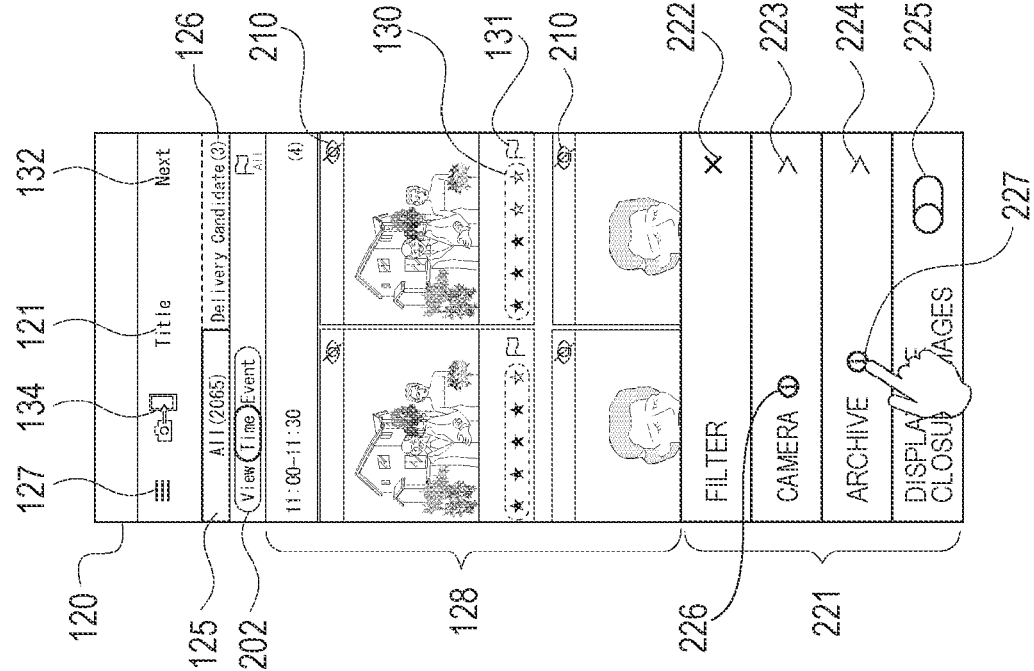
FIG. 32 is an explanatory diagram of guidance display regarding a filter function according to the embodiment.

In the embodiment, the UI control unit 31 detects a swipe operation in a predetermined direction with respect to a display image as an archive operation with respect to the image (see FIG. 25).

As a result, the user can perform archive setting on an arbitrary image by an intuitive operation of swiping the image upward on the screen.

In addition, in combination with the image switching according to the archive operation or the image switching by the swipe operation in the horizontal direction, it is possible to provide efficient operability such as archiving an arbitrary image by swiping upward while quickly confirming images one by one by swiping in the horizontal direction.

In the embodiment, the UI control unit 31 performs control to execute display that enables cancellation of the archive operation for a predetermined time when the archive operation is detected. For example, an undo instruction is enabled as a toast display at the time of the archive operation (See FIGS. 17 and 25).

For example, in a case where the archive setting can be performed by a simple operation such as swiping or the like, there is a possibility that the archive operation is performed on an image that the user does not intend to archive. Therefore, it is possible to easily cancel the archive operation and recover from an unintended operation.

The staff terminal 1 of the embodiment includes the image analysis unit 34 that performs image analysis on each image of the image group and determines eye closure of a subject person, and the event data management unit 30 performs processing of storing eye closure information in association with an image determined to be of eye closure.

By storing the eye closure information for each image, it is possible to perform processing of distinguishing between images with eyes closed and images with eyes not closed.

In the embodiment, the UI control unit 31 performs control to execute display indicating an image determined to be of eye closure on the basis of the eye closure information at the time of the list display (the time view 120 or the event view 200) or the individual display (the one-picture display screen 140). For example, the eye closure icon 210 is displayed corresponding to the image.

As a result, the camera staff can easily discriminate whether or not each image is an eye closure image. In particular, in the case of a thumbnail image or a so-called "wide shot" image, it may be difficult to know whether or not eyes are closed. Since the eye closure images are presented with the eye closure icons 210 as in the embodiment, images not adopted for the image collection or the like can be efficiently discriminated.

In the embodiment, an example has been described in which the filter processing unit 33 that performs filtering on the basis of the eye closure information is included, and the UI control unit 31 performs control such that images extracted by the filtering are displayed in a list as the list display by the time view 120 and the event view 200.

Therefore, selection can be performed in a state in which the eye closure images are removed. Since the eye closure images are usually not appropriate for posting to an image collection, it is possible to reduce the selection population parameter and promote the efficiency of selection by displaying a list excluding such images and performing selection.

In the exemplary embodiment, whether or not to perform the filtering based on the eye closure information can be selected (see FIG. 28A).

Therefore, the user can arbitrarily select to browse the display excluding the eye closure images or to browse images to which the eye closure images are added. Even the eye closure images may be suitable for image collection depending on the scene or situation. Therefore, it is desirable to be able to display the eye closure images for image collection creation.

In the embodiment, the event data management unit 30 performs processing of storing the eye closure information and the selection information as separate information in the imaging/editing information table 62 of the event data 60.

Since the eye closure information based on the image analysis is managed as information different from the selection information, the eye closure state does not affect the selection to the image collection. The camera staff can decide the images to be adopted for the image collection with his/her own will regardless of whether or not the images are of eye closure.

In the embodiment, the filter processing unit 33 that performs filtering on the basis of the information of the imaging device 2 that has captured an image is included, and the UI control unit 31 performs control such that images extracted by the filtering are displayed in a list as the list display (see FIG. 28C).

For example, images captured by the imaging device 2 of a specific model or a specific serial number are displayed in a list. Therefore, selection can be performed in a state in which captured images for each type or each model of the imaging device 2 are extracted. In a case where the camera staff distinguishes and uses imaging devices 2, it is extremely useful from the viewpoint of increasing the selection speed.

The staff terminal 1 according to the embodiment includes the division determination unit 35 that determines chronological division for an image group captured in a specific event, and the UI control unit 31 that performs control such that, for each time zone divided by the division determined by the division determination unit 35, division reflection display is presented, that is, the event view 200 is displayed in a state in which all or some of images captured within a time zone are aligned in a first direction (for example, a horizontal direction: a left-right direction) and each time zone is aligned in a second direction (for example, a vertical direction: an up-down direction).

As the event view 200, a large number of images can be arranged with different meanings in the horizontal direction (first direction) and the vertical direction (second direction), and operability for image confirmation can be better than simple display arranged in chronological order. By providing a UI that makes it easy to confirm images, it is possible to promote the efficiency of selection.

Note that the vertical direction may be the first direction, and the horizontal direction may be the second direction. That is, images in the same time zone may be arranged in the vertical direction, and sub-events and scenes may be arranged in order in the horizontal direction.

In the embodiment, the UI control unit 31 performs switching control between the time view 120 as the simple chronological display in which images are displayed side by side in the order of time of imaging without being on the basis of the division, and the event view 200 as the division reflection display.

Since the time view 120 (simple chronological display) is a simple list display, it is useful in a case where it is desired to immediately view the list. Meanwhile, since the event view 200 (division reflection display) is executed through the division determination processing, it may take some time to display, but the division of the sub-events or the scenes is reflected as the list display, so that the visibility and the searchability are improved. In addition, the balance for each scene or sub-event is easy to understand.

Therefore, by switching the time view 120 and the event view 200, a list display according to the situation is provided.

In the embodiment, the UI control unit 31 performs control to alternately switch the time view 120 and the event view 200 in accordance with the operation of the view switching button 202.

By alternately switching the time view 120 and the event view 200, the user can easily select a suitable list display mode according to the situation.

In the embodiment, in the event view 200, the UI control unit 31 performs control such that scrolling is performed such that each image in one time zone (for example, a scene) by the division moves in the left-right direction (first direction) in accordance with a first direction operation such as a swipe in the left-right direction or the like, and scrolling is performed in the up-down direction (second direction) such that each time zone by the division appears in accordance with a second direction operation such as a swipe in the up-down direction or the like.

In the event view 200, the user can view images of a scene with a horizontal scroll. In addition, a scene desired to be viewed can be quickly searched by vertical scrolling. By setting the vertical and horizontal arrangement reflecting the division in this manner, it is possible to significantly improve the operability of image browsing.

The division determination unit 35 according to the embodiment performs the division determination for sub-events performed in an event.

Since the division of sub-events is determined in the division determination processing, the camera staff can easily confirm the images for each sub-event.

In the embodiment, the example in which the images are displayed side by side in the horizontal direction in units of scenes has been described, but if the number of images is relatively small, the images may be displayed side by side in the horizontal direction in units of sub-events. This makes it suitable for image confirmation for each sub-event.

That is, the division is not hierarchized like sub-events and scenes, and may be, for example, one stage of only sub-events.

The division determination unit 35 according to the embodiment performs the division determination for sub-events performed in an event and the division determination for scenes in sub-events.

By determining the division between the sub-events and scenes in the division determination processing, the division can be performed particularly in two stages, and the list display can be provided in units of sub-events, scenes, or the like. In particular, in a case where there are a large number of images even in units of sub-events, the image list can be viewed in units of finer division by subdividing the sub-events into scenes.

Of course, division of three or more stages may be set to further subdivide scenes.

In the embodiment, the UI control unit 31 performs control such that display of arranging images in the left-right direction (first direction) is performed with a unit of scene as one time zone.

In a case where a large number of images are captured in an event, the number of images may be extremely large even in units of sub-events. In this case, it is preferable to provide the list display by further subdividing the sub-events into scenes. That is, the images are displayed to be arranged in the horizontal direction in units of scenes. As a result, it is possible to search for images in a horizontal direction in units that are easy for the camera staff to see, and it is possible to provide an interface that makes it easier to confirm or select an image.

The example in which the division determination unit 35 according to the embodiment determines a division on the basis of the time interval of each image in chronological order of the imaging time in the image group has been described (see FIG. 45).

If the time interval between the imaging time of one image and the imaging time of the next image is large, it can be determined that the subject content has been greatly changed, that is, it can be determined as a division of sub-events or scenes, and it is possible to perform the division determination with relatively simple processing and high reliability. As a result, appropriate division reflection display can be relatively easily implemented.

In the embodiment, an example has been described in which the division determination unit 35 determines a division on the basis of an image analysis result of each image in chronological order of imaging times in an image group.

Division of sub-events and scenes can be performed depending on the subject person, the number of persons, the items shown, and the like. Accordingly, it is possible to implement appropriate division reflection display.

In the embodiment, the UI control unit 31 prevents the number of images arranged in the left-right direction (first direction) from exceeding the upper limit number.

In a case where one scene is arranged in the horizontal direction without providing the upper limit number, if the number of images of the scene is extremely large, image search by horizontal scrolling is not easy. Therefore, in a case where the number of images in one time zone by the division has become large, for example, in a case where the number exceeds 30, the images are displayed in different rows. Therefore, the number of images scrolled side by side in the horizontal direction does not become an excessive number, and easiness of confirming the images can be maintained.

The division determination unit 35 according to the embodiment performs the division determination processing in a case where display of the event view 200 is requested by an operation (see FIG. 15).

In a case where the division determination processing is processing that requires a certain amount of time and has a large load, it is preferable to perform the processing only when necessary so as not to perform unnecessary processing in a situation where normal list display is required.

Of course, the processing may be performed in a case where images are collectively received or sequentially received from the imaging device 2. In particular, in a case where the processing resources are abundant or in a case where the division determination processing is performed by an algorithm with a relatively light load, it is possible to quickly cope with the display when the division reflection display is requested by the user by performing the division determination processing in advance.

In the embodiment, an example has been described in which, in a case where execution of display of the event view 200 is requested by an operation, the UI control unit 31 requests confirmation as to whether or not to execute the division determination processing.

In a case where the division determination processing is processing that requires a certain amount of time and has a large load, a user is notified of the fact and a dialog for requesting whether or not to execute is presented (see steps S356, S353, and S360 in FIG. 15). As a result, the division determination processing can be performed according to the convenience of the user. In other words, in a case where the user does not want to perform time-consuming processing, it is possible not to forcibly execute the division determination processing.

In the embodiment, it is assumed that an operation of giving an instruction on execution of the division determination processing by the division determination unit 35 is possible.

For example, an update button 203 and an update dialog 205 are prepared, and division determination processing that takes a relatively long time is executed when it is convenient for the user.

In the embodiment, title display for each sub-event is performed in the event view 200.

For example, the sub-event names such as "Ceremony", "Cocktails", "Party Time", and the like and the mechanically attached sub-event names such as "event1", "event2", and the like are displayed in units of sub-events, so that the division reflection display can be easily viewed, and it is convenient for the camera staff to search for images.

In addition, in the event view 200, title display for each scene is also performed.

For example, by displaying the names as "scene1", "scene2", and the like in units of scenes, in particular, in a case where images are arranged in the horizontal direction in units of scenes, the division reflection display is easy to see, and it is convenient for the camera staff to search for images.

In the event view 200 of the embodiment, the time zones based on the division, for example, the index bar 201 for the sub-events is displayed (see FIG. 21).

For example, by displaying the names in units of sub-events such as "Ceremony", "Cocktails", and the like, what kind of division is performed in the entire list is clearly presented.

The index bar 201 is also used as an operator for image search.

By specifying the title in the index bar 201 in the event view 200, the display jumps to the display of the images of the time zone of the sub-event (steps S214 and S241 in FIG. 13). Therefore, it is possible to extremely improve the searchability of the division reflection display.

Note that, in the embodiment, image files from the imaging device 2 are transferred to the staff terminal 1, and the staff terminal 1 uploads the image files to the server device 4. However, the imaging device 2 may directly upload the image files to the server device 4.

Although the description has been given assuming generation of an image collection of still images in the embodiment, the image collection may include moving images as a part of content, or an image collection by a plurality of moving images may be generated. In these cases, the processing described in the embodiment can be similarly applied.

The moving images in this case may be moving images with audio or moving images with only image information without audio.

In addition, the imaging device 2 may perform the processing of the staff terminal 1 described above as the information processing device of the embodiment. Alternatively, the staff terminal 1 may have an imaging function and also function as the imaging device 2.

The technology of the present disclosure is not limited to the processing related to an image group of an event related to a marriage. For example, it is also useful for selection of an image group captured in a sport event or the like.

In particular, the event view 200 is a list display mode that is extremely convenient for image confirmation and selection if sub-events and scenes in a sports event can be divided into categories such as the types of competition, players to play in order in an individual competition, and the like. In the case of sports, a more appropriate event view 200 can be implemented by changing a division condition of sub-events or scenes for each competition.

The program according to the embodiment is a program for causing, for example, a CPU, a DSP, or the like, or a device including the CPU, the DSP, or the like to execute the processing in FIGS. 12 to 18.

That is, the program according to the embodiment is a program for causing an information processing device to perform: processing of executing list display and individual display as display in which an image can be selected from an image group captured in a specific event, and processing of detecting an archive operation on the image displayed; and processing of storing archive information indicating that an archive setting has been performed in association with the image targeted for the archive operation.

In addition, another program of the embodiment is a program for causing, for example, a CPU, a DSP, or the like, or a device including the CPU, the DSP, or the like to execute the processing illustrated in FIGS. 12 to 18 and 45.

That is, the program according to the embodiment is a program for causing an information processing device to execute: division determination processing of determining chronological division for an image group captured in a specific event; and user interface control processing of performing control such that, for each time zone divided by the division determined in the division determination processing, division reflection display is performed in which all or some of images captured within a time zone are presented in a state of being aligned in a first direction and in which each time zone is aligned in a second direction.

With these programs, the staff terminal 1 suitable for increasing the selection speed can be implemented in, for example, a mobile terminal device, a personal computer, or other devices capable of executing information processing.

A program for implementing such a staff terminal 1 can be recorded in advance in an HDD as a recording medium built in a device such as a computer device or the like, a ROM in a microcomputer having a CPU, or the like.

Alternatively, the program can be temporarily or permanently stored (recorded) in a removable recording medium such as a flexible disk, a compact disc read only memory (CD-ROM), a magneto optical (MO) disk, a digital versatile disc (DVD), a Blu-ray disc (registered trademark), a magnetic disk, a semiconductor memory, a memory card, or the like. Such a removable recording medium can be provided as so-called package software.

Furthermore, such a program can be installed from a removable recording medium to a personal computer or the like, or can be downloaded from a download site via a network such as a local area network (LAN), the Internet, or the like.

In addition, such a program is suitable for providing the staff terminal 1 of the embodiment in a wide range. For example, by downloading the program to a portable terminal device such as a smartphone, a tablet, or the like, an imaging device, a mobile phone, a personal computer, a still camera, a video camera, a game device, a video device, a personal digital assistant (PDA), or the like, the smartphone or the like can be caused to function as the staff terminal 1 of the present disclosure.

Note that the effects described in the present specification are merely examples and are not limited, and other effects may be provided.

Note that the present technology can also adopt the following configurations.

(1)

An information processing device including:
  a user interface control unit that performs processing of executing list display and individual display as display in which an image can be selected from an image group captured in a specific event, and processing of detecting an archive operation on the image displayed; and
  an event data management unit that performs processing of storing archive information indicating that an archive setting has been performed in association with the image targeted for the archive operation.

(2)

The information processing device according to (1), further including
  a filter processing unit that performs filtering on the basis of the archive information,
  in which the user interface control unit performs control such that images extracted by filtering are displayed in a list as the list display.

(3)

The information processing device according to (2),
  in which whether or not to perform the filtering based on the archive information or a filtering condition can be selected.

(4)

The information processing device according to any one of (1) to (3),
  in which the user interface control unit performs control to provide a user interface capable of setting operation of selection information for creating an image collection by selectively using image data included in the image group, and
  the event data management unit performs processing of storing the archive information and the selection information as separate information.

(5)

The information processing device according to any one of (1) to (4),
  in which the user interface control unit enables the archive operation on a display image at a time of the individual display.

(6)

The information processing device according to any one of (1) to (5),
  in which the user interface control unit detects a swipe operation in a predetermined direction with respect to a display image as an archive operation with respect to the display image.

(7)

The information processing device according to any one of (1) to (6),
  in which the user interface control unit performs control to execute display that enables cancellation of the archive operation for a predetermined time when the archive operation is detected.

(8)

The information processing device according to any one of (1) to (7), further including
  an image analysis unit that performs image analysis on each image of the image group and determines eye closure of a subject person,
  in which the event data management unit performs processing of storing eye closure information in association with an image determined to be of eye closure.

(9)

The information processing device according to (8),
  in which the user interface control unit performs control to execute display indicating an image determined to be of eye closure on the basis of the eye closure information at a time of the list display or the individual display.

(10)

The information processing device according to (8) or (9), further including
  a filter processing unit that performs filtering on the basis of the eye closure information,
  in which the user interface control unit performs control such that images extracted by the filtering are displayed in a list as the list display.

(11)

The information processing device according to (10),
  in which whether or not to perform the filtering based on the eye closure information can be selected.

(12)

The information processing device according to any one of (8) to (11),
  in which the user interface control unit performs control to provide a user interface capable of setting operation of selection information for creating an image collection by selectively using image data included in the image group, and
  the event data management unit performs processing of storing the eye closure information and the selection information as separate information.

(13)

The information processing device according to any one of (1) to (12), further including
  a filter processing unit that performs filtering on the basis of information of an imaging device that has captured an image,
  in which the user interface control unit performs control such that images extracted by the filtering are displayed in a list as the list display.

(14)

An information processing method in which an information processing device performs:
  processing of executing list display and individual display as display in which an image can be selected from an image group captured in a specific event, and processing of detecting an archive operation on the image displayed; and
  processing of storing archive information indicating that an archive setting has been performed in association with the image targeted for the archive operation.

(15)

A program for causing an information processing device to perform:
  processing of executing list display and individual display as display in which an image can be selected from an image group captured in a specific event, and processing of detecting an archive operation on the image displayed; and
  processing of storing archive information indicating that an archive setting has been performed in association with the image targeted for the archive operation.

REFERENCE SIGNS LIST

1 Staff terminal
2 Imaging device
3 Personal computer
4 Server device
5 Client terminal
6 Network
30 Event data management unit
31 UI control unit
32 Communication control unit
33 Filter processing unit
34 Image analysis unit
35 Division determination unit
70 Information processing device
120 Time view
200 Event View

The invention claimed is:

1. An information processing device comprising:
a memory storing; and
an electronic processor configured to:
execute a list display and an individual display in which an image is selectable from an image group captured in a specific event,
detect an archive operation on the image displayed,
store archive information indicating that an archive setting has been performed in association with the image targeted for the archive operation,
perform image analysis on each image of the image group and determine eye closure of a subject person,
store eye closure information in association with each image determined to be of eye closure, and
display, on the list display, imaging information associated with each image of the image group, the imaging information including an identification of image data for each image, the archive information of each image, and the eye closure information for each image.

2. The information processing device according to claim 1, wherein the electronic processor is further configured to:
perform filtering on a basis of the archive information, and
perform control such that images extracted by filtering are displayed in a list as the list display.

3. The information processing device according to claim 2, wherein
the electronic processor selects whether or not to perform the filtering based on the archive information or a filtering condition can be selected.

4. The information processing device according to claim 1, wherein
the electronic processor performs control to provide a user interface capable of setting operation of selection information for creating an image collection by selectively using image data included in the image group, and
perform processing of storing the archive information and the selection information as separate information.

5. The information processing device according to claim 1, wherein
the electronic processor enables an archive operation on the display image at the time of the individual display.

6. The information processing device according to claim 1, wherein
the electronic processor detects a swipe operation in a predetermined direction with respect to the display image as an archive operation with respect to the image.

7. The information processing device according to claim 1, wherein
the electronic processor performs control to execute display that enables cancellation of the archive operation for a predetermined time when the archive operation is detected.

8. The information processing device according to claim 1, wherein
the electronic processor performs control to execute display indicating an image determined to be of eye closure on a basis of the eye closure information at a time of the list display or the individual display.

9. The information processing device according to claim 1, wherein
that the electronic processor performs filtering on a basis of the eye closure information, and
performs control such that images extracted by the filtering are displayed in a list as the list display.

10. The information processing device according to claim 9, wherein
the electronic processor selects whether to perform the filtering based on the eye closure information.

11. The information processing device according to claim 1, wherein
the imaging information further includes selection information for each image,
wherein, for a respective image in the image group, the selection information indicates a selection of the respective image to be included in an image.

12. The information processing device according to claim 1, wherein
that the electronic processor performs filtering on a basis of information of an imaging device that has captured an image, and
performs control such that images extracted by the filtering are displayed in a list as the list display.

13. An information processing method for an information processing device, the method comprising:
processing of executing a list display and an individual display as display in which an image can be selected from an image group captured in a specific event, and processing of detecting an archive operation on the image displayed; and
processing of storing archive information indicating that an archive setting has been performed in association with the image targeted for the archive operation;
performing image analysis on each image of the image group and determining eye closure of a subject person;
storing eye closure information in association with each image determined to be of eye closure; and
displaying, on the list display, imaging information associated with each image of the image group, the imaging information including an identification of image data for each image, the archive information of each image, and the eye closure information for each image.

14. A non-transitory computer readable medium storing a program for causing an information processing device to perform a set of operations comprising:
processing of executing a list display and an individual display as display in which an image can be selected from an image group captured in a specific event, and processing of detecting an archive operation on the image displayed; and processing of storing archive information indicating that an archive setting has been performed in association with the image targeted for the archive operation;

performing image analysis on each image of the image group and determining eye closure of a subject person;

storing eye closure information in association with each image determined to be of eye closure; and displaying, on the list display, imaging information associated with each image of the image group, the imaging information including an identification of image data for each image, the archive information of each image, and the eye closure information for each image.

15. The non-transitory computer readable medium according to claim 14, wherein the set of operations further comprise:

performing filtering on a basis of the archive information, and performing control such that images extracted by filtering are displayed in a list as the list display.

16. The non-transitory computer readable medium according to claim 15, wherein the set of operations further comprise selecting whether or not to perform the filtering based on the archive information or a filtering condition can be selected.

17. The non-transitory computer readable medium according to claim 14, wherein the set of operations further comprise:

performing control to provide a user interface capable of setting operation of selection information for creating an image collection by selectively using image data included in the image group, and performing processing of storing the archive information and the selection information as separate information.

18. The non-transitory computer readable medium according to claim 14, wherein the set of operations further comprise enabling an archive operation on the display image at the time of the individual display.

19. The non-transitory computer readable medium according to claim 14, wherein the set of operations further comprise detecting a swipe operation in a predetermined direction with respect to the display image as an archive operation with respect to the image.

* * * * *